United States Patent
Goda et al.

(10) Patent No.: US 10,649,519 B2
(45) Date of Patent: May 12, 2020

(54) COMPUTER SYSTEM, METHOD FOR CONSERVING POWER, AND COMPUTER

(71) Applicant: THE UNIVERSITY OF TOKYO, Tokyo (JP)

(72) Inventors: Kazuo Goda, Tokyo (JP); Masaru Kitsuregawa, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 264 days.

(21) Appl. No.: 15/755,917

(22) PCT Filed: Aug. 26, 2016

(86) PCT No.: PCT/JP2016/074893
§ 371 (c)(1),
(2) Date: Feb. 27, 2018

(87) PCT Pub. No.: WO2017/038652
PCT Pub. Date: Mar. 9, 2017

(65) Prior Publication Data
US 2018/0329477 A1 Nov. 15, 2018

(30) Foreign Application Priority Data
Aug. 28, 2015 (JP) .................. 2015-169171

(51) Int. Cl.
*G06F 1/3287* (2019.01)
*G06F 16/2453* (2019.01)
(Continued)

(52) U.S. Cl.
CPC .............. *G06F 1/3287* (2013.01); *G06F 1/28* (2013.01); *G06F 1/3221* (2013.01);
(Continued)

(58) Field of Classification Search
CPC .... G06F 1/3287; G06F 16/24542; G06F 1/28; G06F 1/3221; G06F 1/3268;
(Continued)

(56) References Cited

U.S. PATENT DOCUMENTS 8,281,068 B2 * 10/2012 Kono ..................... G06F 1/3221
711/114
8,909,825 B2 * 12/2014 Ueda ..................... G06F 3/0613
710/33
(Continued)

FOREIGN PATENT DOCUMENTS

| JP | 2003108317 A | 4/2003 |
| JP | 2005092791 A | 4/2005 |

(Continued)

OTHER PUBLICATIONS

S.W. Son, et al; Disk layout optimization for reducing energy consumption; In Proc. Int'l Conf. on Supercomputing, 2005, pp. 274-283.
(Continued)

*Primary Examiner* — Aurel Prifti
(74) *Attorney, Agent, or Firm* — Lucas & Mercanti, LLP

(57) ABSTRACT

A computer system includes: a database server configured to execute a database management system; and a storage apparatus configured to store data. The storage apparatus is configured to have a power saving function for switching between a sleep mode for reducing power consumption of the storage apparatus and an active mode for enabling read and write of the data. The database management system is configured to be executed by the arithmetic device, to thereby: receive a query for reading or writing data; analyze the received query to create an execution plan; identify a volume for reading and writing data; and select an execution plan for which power consumption satisfies a predetermined
(Continued)

threshold value based on power consumption information on the identified volume.

13 Claims, 67 Drawing Sheets

(51) Int. Cl.
    *G06F 1/3234*     (2019.01)
    *G06F 1/3221*     (2019.01)
    *G06F 3/06*     (2006.01)
    *G06F 1/28*     (2006.01)

(52) U.S. Cl.
    CPC ............ *G06F 1/3268* (2013.01); *G06F 3/067* (2013.01); *G06F 3/0625* (2013.01); *G06F 3/0634* (2013.01); *G06F 3/0635* (2013.01); *G06F 16/24542* (2019.01); *Y02D 10/13* (2018.01)

(58) Field of Classification Search
    CPC .... G06F 3/0625; G06F 3/0634; G06F 3/0635; G06F 3/067; Y02D 10/13
    See application file for complete search history.

(56) References Cited

U.S. PATENT DOCUMENTS

| | | | | |
|---|---|---|---|---|
| 2005/0193034 | A1* | 9/2005 | Kitsuregawa | G06F 11/2092 |
| 2007/0011421 | A1* | 1/2007 | Keller, Jr. | G06F 1/3225 |
| | | | | 711/165 |
| 2007/0016582 | A1* | 1/2007 | Kawamura | G06F 16/22 |
| 2007/0022100 | A1* | 1/2007 | Kitsuregawa | G06F 16/24549 |
| 2007/0079156 | A1* | 4/2007 | Fujimoto | G06F 1/3221 |
| | | | | 713/300 |
| 2007/0271426 | A1* | 11/2007 | Watanabe | G06F 11/1466 |
| | | | | 711/159 |
| 2008/0104339 | A1* | 5/2008 | Nakagawa | G06F 3/0625 |
| | | | | 711/154 |
| 2009/0077403 | A1* | 3/2009 | Hayashi | G06F 1/3203 |
| | | | | 713/320 |
| 2011/0307721 | A1* | 12/2011 | Ouchi | G06F 3/0625 |
| | | | | 713/321 |
| 2012/0209891 | A1* | 8/2012 | Kumagai | G06F 11/1448 |
| | | | | 707/809 |
| 2013/0042120 | A1* | 2/2013 | Ono | G06F 1/3225 |
| | | | | 713/300 |
| 2013/0073886 | A1* | 3/2013 | Zaarur | G06F 12/023 |
| | | | | 713/320 |
| 2015/0082062 | A1* | 3/2015 | Saraswat | G06F 1/3275 |
| | | | | 713/323 |
| 2015/0149439 | A1* | 5/2015 | Idei | G06F 16/25 |
| | | | | 707/718 |
| 2015/0169591 | A1* | 6/2015 | Yoshida | G06F 16/24532 |
| | | | | 707/769 |
| 2015/0177821 | A1* | 6/2015 | Senthinathan | G06F 9/30189 |
| | | | | 713/324 |
| 2015/0234614 | A1* | 8/2015 | Kong | G06F 3/0619 |
| | | | | 711/114 |
| 2016/0154848 | A1* | 6/2016 | Shimizu | G06F 16/24542 |
| | | | | 707/719 |
| 2016/0171048 | A1* | 6/2016 | Idei | G06F 12/0862 |
| | | | | 707/718 |
| 2016/0232206 | A1* | 8/2016 | Hayamizu | G06F 16/2455 |
| 2016/0335321 | A1* | 11/2016 | Yoshida | G06F 16/2455 |

FOREIGN PATENT DOCUMENTS

| | | |
|---|---|---|
| JP | 2007102322 A | 4/2007 |
| JP | 2008210003 A | 9/2008 |
| JP | 2009116436 A | 5/2009 |
| JP | 2011210024 A | 10/2011 |
| JP | 2013054570 A | 3/2013 |

OTHER PUBLICATIONS

J. Gray, et al; Parity Striping of Disc Arrays: Low-Cost Reliable Storage with Acceptable Throughput.; In Proceedings of the 16th Very Large Database Conference, 1990, pp. 148-160.

International Search Report dated Nov. 15, 2016 for PCT/JP2016/074893.

* cited by examiner

Fig. 10

| QUERY EXECUTION PLAN | STEP | PARAMETER | | EXECUTION COST ESTIMATION FORMULA | | | EXECUTION COST | | |
|---|---|---|---|---|---|---|---|---|---|
| | | OUT-OF-ORDER EXECUTION | TASK MULTIPLICITY | EXECUTION TIME | POWER CONSUMPTION AMOUNT | MAXIMUM POWER CONSUMPTION | EXECUTION TIME | POWER CONSUMPTION AMOUNT | MAXIMUM POWER CONSUMPTION |
| EXECUTION PLAN1 | #1 | | | | | | | | |
| | #2 | | | | | | | | |
| | TOTAL | | | | | | | | |
| EXECUTION PLAN2 | #1 | | | | | | | | |
| | #2 | | | | | | | | |
| | TOTAL | | | | | | | | |
| | | | | | | | | | |

Fig. 22(A)

| R1 | R2 | R3 |
|----|----|----|
|    |    |    |
|    |    |    |
|    |    |    |
|    |    |    |
|    |    |    |

CONFIGURATION OF TABLE R

Fig. 22(B)

| S1 | S2 | S3 |
|---|---|---|
|  |  |  |
|  |  |  |
|  |  |  |
|  |  |  |
|  |  |  |

CONFIGURATION OF TABLE S

Fig. 23

| VOLUME | PERFORMANCE CHARACTERISTICS | ELECTRIC POWER CHARACTERISTICS |
|---|---|---|
| VOLUME 1 | SEQUENTIAL ACCESS PERFORMANCE: 100MB/s <br><br> RANDOM ACCESS PERFORMANCE: 10,000IOPS(MAXIMUM) FUNCTION f(x) OF MULTIPLICITY x <br> x: MULTIPLICITY <br> f(x):THROUGHPUT <br> x=1, f(x)=100 IOPS <br> x=10, f(x)=1,000 IOPS <br> x>=100, f(x)=10,000 IOPS | POWER CONSUMPTION IN ACTIVE MODE (NO LOAD): <br> 100W <br> POWER CONSUMPTION IN ACTIVE MODE (SEQUENTIAL ACCESS): <br> 200W <br> POWER CONSUMPTION IN ACTIVE MODE (RANDOM ACCESS): <br> g(x) OF MULTIPLICITY x FOR 100 W TO 200 W <br> g(x) = 100W +(200W-100W) × f(x)/10,000IOPS <br><br> POWER CONSUMPTION IN SLEEP MODE: <br> 10W <br><br> ACTIVE → SLEEP TRANSITION TIME, POWER CONSUMPTION AMOUNT <br> 10SECONDS,500J (AVERAGE POWER IS 50 W) <br> SLEEP → ACTIVE TRANSITION TIME, POWER CONSUMPTION AMOUNT <br> 10SECONDS,500J (AVERAGE POWER IS 50 W) |
| VOLUME 2 | | |

Fig. 24(A)

SELECT R1, S3 FROM R JOIN S ON R2=S2
WHERE R1 BETWEEN x1 AND y1

Fig. 24(B)

SELECT R1, S3 FROM R JOIN S ON R2=S2

| QUERY EXECUTION PLAN | STEP | | PARAMETER | |
|---|---|---|---|---|
| | | | OUT-OF-ORDER EXECUTION | TASK MULTIPLICITY |
| EXECUTION PLAN 1 | #1 | SCAN TABLE R TO BUILD HASH TABLE. AT THIS TIME, CAUSE TABLE S TO SLEEP AFTER START OF STEP AND ACTIVATE TABLE S BEFORE END OF STEP | NO | N/A |
| | #2 | CAN TABLE S TO PROBE HASH TABLE AND OUTPUT RESULT. AT THIS TIME, CAUSE TABLE R TO SLEEP AFTER START OF STEP | NO | N/A |
| | TOTAL | | | |

| QUERY EXECUTION PLAN | STEP | | PARAMETER | |
|---|---|---|---|---|
| | | | OUT-OF-ORDER EXECUTION | TASK MULTIPLICITY |
| EXECUTION PLAN 2 | #1 | USE INDEX IS TO SEARCH TABLE S WHILE SCANNING R TO OUTPUT RESULT | NO | N/A |
| | TOTAL | | | |

| QUERY EXECUTION PLAN | STEP | | PARAMETER | |
|---|---|---|---|---|
| | | | OUT-OF-ORDER EXECUTION | TASK MULTIPLICITY |
| EXECUTION PLAN 3 | #1 | USE INDEX IS TO SEARCH TABLE S WHILE SCANNING R TO OUTPUT RESULT | YES | MULTIPLICITY X |
| | TOTAL | | | |

Fig. 28

QUERY EXECUTION PLAN (QUERY 1, THRESHOLD VALUE IS NOT SPECIFIED, REDUCTION OF EXECUTION TIME IS PRIORITIZED)

| QUERY EXECUTION PLAN | STEP | PARAMETER | | EXECUTION COST | | |
|---|---|---|---|---|---|---|
| | | OUT-OF-ORDER EXECUTION | TASK MULTIPLICITY | EXECUTION TIME (SECONDS) | POWER CONSUMPTION AMOUNT (J) | MAXIMUM POWER CONSUMPTION (W) |
| EXECUTION PLAN 1 | #1 | NO | N/A | 1000 | 210,800 | 250 |
| | #2 | NO | N/A | 100,000 | 21,000,400 | 250 |
| | TOTAL | | | 101,000 | 21,211,200 | 250 |
| EXECUTION PLAN 2 | #1 | NO | N/A | 1,010,000 | 203,010,000 | 201 |
| | TOTAL | | | 1,010,000 | 203,010,000 | 201 |
| EXECUTION PLAN 3 | #1 | YES | MULTIPLICITY X = 100 | 10,100 | 3,030,000 | 300 |
| | TOTAL | | | 10,100 | 3,030,000 | 300 |

Fig. 29

QUERY EXECUTION PLAN (QUERY 1, MAXIMUM POWER CONSUMPTION 250 W, REDUCTION OF EXECUTION TIME IS PRIORITIZED)

| QUERY EXECUTION PLAN | STEP | PARAMETER | | EXECUTION COST | | |
|---|---|---|---|---|---|---|
| | | OUT-OF-ORDER EXECUTION | TASK MULTIPLICITY | EXECUTION TIME (SECONDS) | POWER CONSUMPTION AMOUNT (J) | MAXIMUM POWER CONSUMPTION (W) |
| EXECUTION PLAN 1 | #1 | NO | N/A | 1000 | 210,800 | 250 |
| | #2 | NO | N/A | 100,000 | 21,000,400 | 250 |
| | TOTAL | | | 101,000 | 21,211,200 | 250 |
| EXECUTION PLAN 2 | #1 | NO | N/A | 1,010,000 | 203,010,000 | 201 |
| | TOTAL | | | 1,010,000 | 203,010,000 | 201 |
| EXECUTION PLAN 3 | #1 | YES | MULTIPLICITY X – 50 | 20,200 | 5,050,000 | 250 |
| | TOTAL | | | <u>20,200</u> | 5,050,000 | 250 |

Fig. 30

QUERY EXECUTION PLAN (QUERY 2, THRESHOLD VALUE IS NOT SPECIFIED, REDUCTION OF EXECUTION TIME IS PRIORITIZED)

| QUERY EXECUTION PLAN | STEP | PARAMETER | | EXECUTION COST | | |
|---|---|---|---|---|---|---|
| | | OUT-OF-ORDER EXECUTION | TASK MULTIPLICITY | EXECUTION TIME (SECONDS) | POWER CONSUMPTION AMOUNT (J) | MAXIMUM POWER CONSUMPTION (W) |
| EXECUTION PLAN 1 | #1 | NO | N/A | 1000 | 210,800 | 250 |
| | #2 | NO | N/A | 100,000 | 21,000,400 | 250 |
| | TOTAL | | | <u>101,000</u> | 21,211,200 | 250 |
| EXECUTION PLAN 2 | #1 | NO | N/A | 1,010,000,000 | 203,010,000,000 | 201 |
| | TOTAL | | | 1,010,000,000 | 203,010,000,000 | 201 |
| EXECUTION PLAN 3 | #1 | YES | MULTIPLICITY X = 100 | 10,100,000 | 3,030,000,000 | 300 |
| | TOTAL | | | 10,100,000 | 3,030,000,000 | 300 |

Fig. 36(A)

| CPU SLOT | ELECTRIC POWER MODE |
|---|---|
| CPU1 | ACTIVE |
| CPU2 | ACTIVE |
| CPU3 | ACTIVE |
| CPU4 | SLEEP |
| ... | ... |

Fig. 36(B)

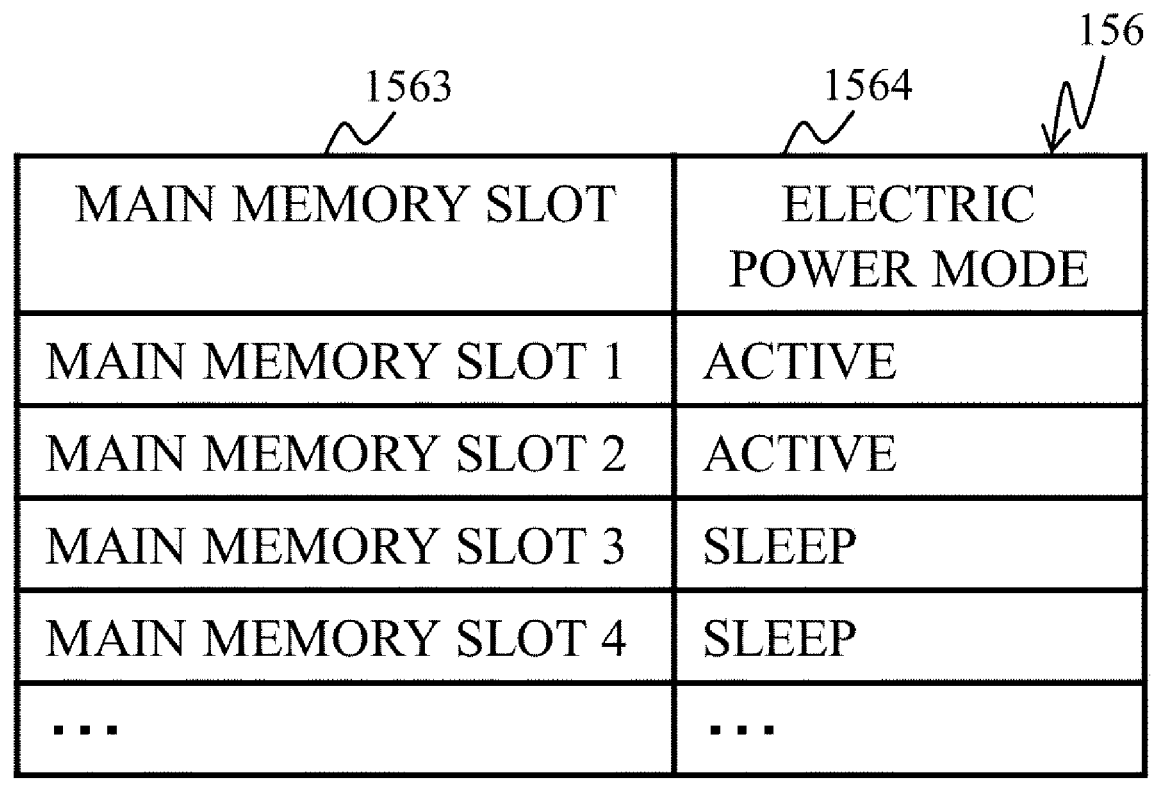

| MAIN MEMORY SLOT | ELECTRIC POWER MODE |
|---|---|
| MAIN MEMORY SLOT 1 | ACTIVE |
| MAIN MEMORY SLOT 2 | ACTIVE |
| MAIN MEMORY SLOT 3 | SLEEP |
| MAIN MEMORY SLOT 4 | SLEEP |
| ... | ... |

Fig. 39(A)

ALL CPUs ARE ACTIVE

| CPU SOCKET | MODE | NUMBER OF TASKS | USAGE | POWER CONSUMPTION |
|---|---|---|---|---|
| CPU1 | ACTIVE | 30 | 60% | 160 W |
| CPU2 | ACTIVE | 30 | 60% | 160 W |
| CPU3 | ACTIVE | 20 | 40% | 140 W |
| CPU4 | ACTIVE | 20 | 40% | 140 W |
| TOTAL | | 100 | | 600W |

Fig. 39(B)

CPUs 3 AND 4 ARE CAUSED TO SLEEP

| CPU SOCKET | MODE | NUMBER OF TASKS | USAGE | POWER CONSUMPTION |
|---|---|---|---|---|
| CPU1 | ACTIVE | 50 | 100% | 200 W |
| CPU2 | ACTIVE | 50 | 100% | 200 W |
| CPU3 | SLEEP | | | 10W |
| CPU4 | SLEEP | | | 10W |
| TOTAL | | 100 | | 420W |

Fig. 40(A)

ALL MAIN MEMORIES ARE ACTIVE

| MAIN MEMORY SLOT | MODE | USAGE | POWER CONSUMPTION |
|---|---|---|---|
| MAIN MEMORY SLOT 1 | ACTIVE | 10% | 10 W |
| MAIN MEMORY SLOT 2 | ACTIVE | 10% | 10 W |
| MAIN MEMORY SLOT 3 | ACTIVE | 10% | 10 W |
| MAIN MEMORY SLOT 4 | ACTIVE | 10% | 10 W |
| TOTAL | | | 40W |

Fig. 40(B)

MAIN MEMORY SLOTS 3 AND 4 ARE CAUSED TO SLEEP

| MAIN MEMORY SLOT | MODE | USAGE | POWER CONSUMPTION |
|---|---|---|---|
| MAIN MEMORY SLOT 1 | ACTIVE | 20% | 10 W |
| MAIN MEMORY SLOT 2 | ACTIVE | 20% | 10 W |
| MAIN MEMORY SLOT 3 | SLEEP | | 1 W |
| MAIN MEMORY SLOT 4 | SLEEP | | 1 W |
| TOTAL | | | 22W |

Fig. 46

| VOLUME/CPU | SLEEP PLAN |
|---|---|
| VOLUME 1 | ACTIVE |
| VOLUME 2 | SLEEPING ALL TIME |
| .... | .... |
| CPU 1 | ACTIVE |
| CPU 2 | SLEEPING AFTER COMPLETION OF STEP #1 |
| .... | .... |

Fig. 49
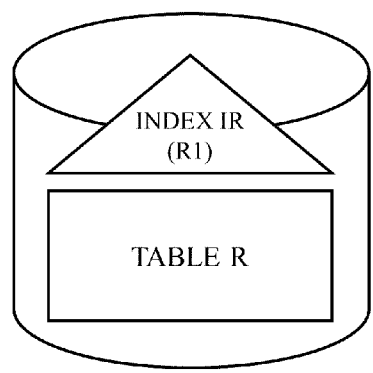
VOLUME 1
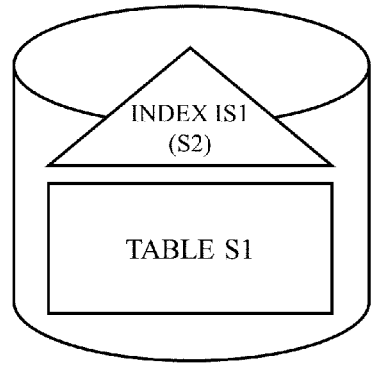 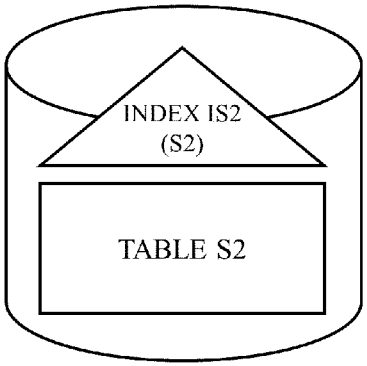 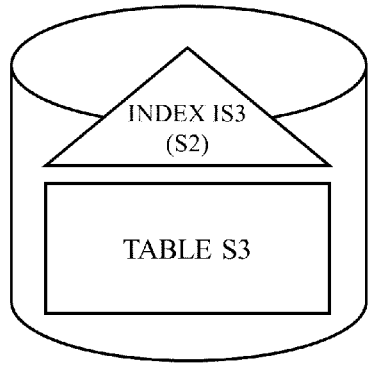
VOLUME 2    VOLUME 3    VOLUME 4

Fig. 50

| VOLUME | PERFORMANCE CHARACTERISTICS | ELECTRIC POWER CHARACTERISTICS |
|---|---|---|
| VOLUME 1 | SEQUENTIAL ACCESS PERFORMANCE: 100MB/s<br><br>RANDOM ACCESS PERFORMANCE: 10,000IOPS (MAXIMUM) FUNCTION f(x) OF MULTIPLICITY x x:MULTIPLICITY, f(x):THROUGHPUT x=1, f(x)=100 IOPS x=10, f(x)=1,000 IOPS x>=100, f(x)=10,000 IOPS | POWER CONSUMPTION IN ACTIVE MODE (NO LOAD): 100W<br>POWER CONSUMPTION IN ACTIVE MODE (SEQUENTIAL ACCESS): 200W<br>POWER CONSUMPTION IN ACTIVE MODE (RANDOM ACCESS): g(x) OF MULTIPLICITY x FOR 100 W TO 200 W WHEN MULTIPLICITY IS REPRESENTED BY x, g(x) = 100W + (200W-100W) × f(x) ÷ 10,000IOPS<br><br>POWER CONSUMPTION IN SLEEP MODE: 10W<br><br>ACTIVE → SLEEP TRANSITION TIME, POWER CONSUMPTION AMOUNT 10SECONDS,500J (AVERAGE POWER IS 50 W)<br>SLEEP → ACTIVE TRANSITION TIME, POWER CONSUMPTION AMOUNT 10SECONDS,500J (AVERAGE POWER IS 50 W) |
| VOLUME 2 | | |
| VOLUME 3 | | |
| VOLUME 4 | | |

Fig. 51

QUERY 1

SELECT R1, S3 FROM R JOIN S ON R2=S2
WHERE R1 BETWEEN x1 AND y1

Fig. 52

| QUERY EXECUTION PLAN | STEP | | PARAMETER | |
|---|---|---|---|---|
| | | | OUT-OF-ORDER EXECUTION | TASK MULTIPLICITY |
| EXECUTION PLAN 3 | #1 | USE INDEX IS TO SEARCH TABLE S WHILE SCANNING R TO OUTPUT RESULT | YES | MULTIPLICITY X |
| | TOTAL | | | |

Fig. 53(A)

| VOLUME | MODE | AVERAGE IOPS | POWER CONSUMPTION |
|---|---|---|---|
| VOLUME 1 | ACTIVE | 99 IOPS | 101 W |
| VOLUME 2 | ACTIVE | 3,300 IOPS | 133 W |
| VOLUME 3 | ACTIVE | 3,300 IOPS | 133 W |
| VOLUME 4 | ACTIVE | 3,300 IOPS | 133 W |
| TOTAL | | 9,999 IOPS | 500 W |

Fig. 53(B)
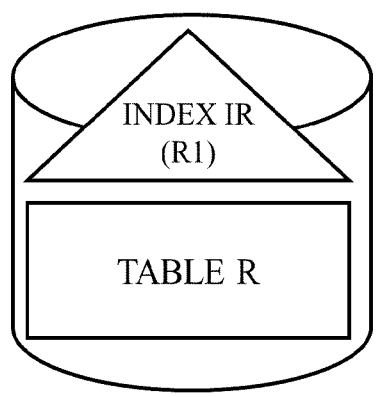
VOLUME 1
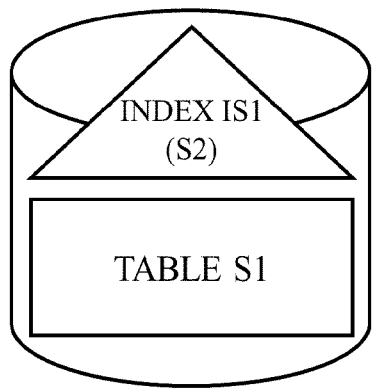
VOLUME 2
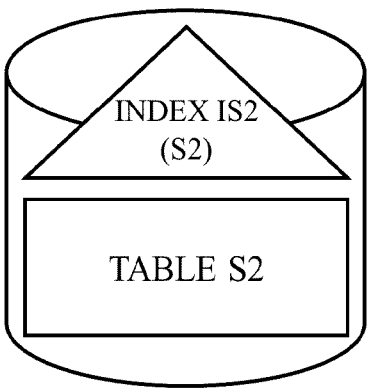
VOLUME 3
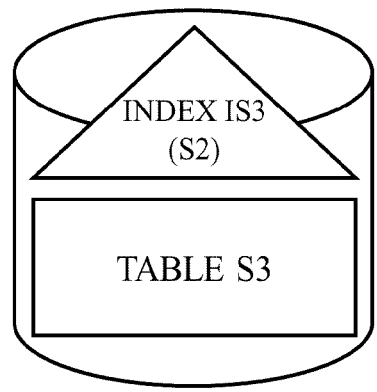
VOLUME 4

Fig. 54(A)

| VOLUME/CPU | SLEEP PLAN |
|---|---|
| VOLUME 4 | SLEEPING ALL TIME |

Fig. 54(B)

| VOLUME | MODE | AVERAGE IOPS | POWER CONSUMPTION |
|---|---|---|---|
| VOLUME 1 | ACTIVE | 99 IOPS | 101 W |
| VOLUME 2 | ACTIVE | 3,300 IOPS | 133 W |
| VOLUME 3 | ACTIVE | 3,300 IOPS | 133 W |
| VOLUME 4 | SLEEP | | 10 W |
| TOTAL | | 6,699 IOPS | 377 W |

Fig. 54(C)
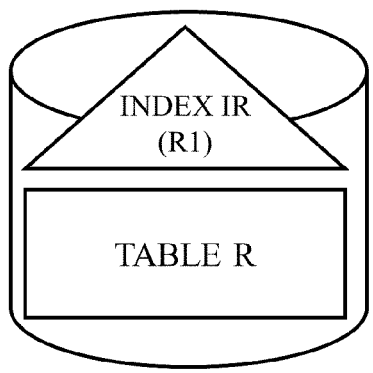
VOLUME 1
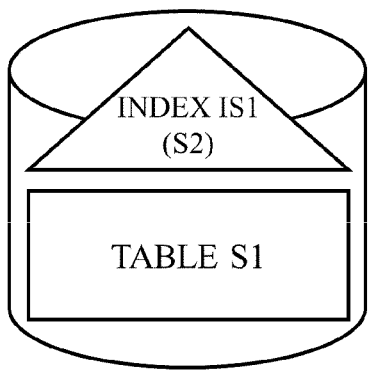
VOLUME 2
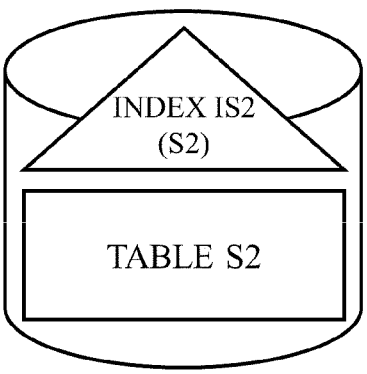
VOLUME 3
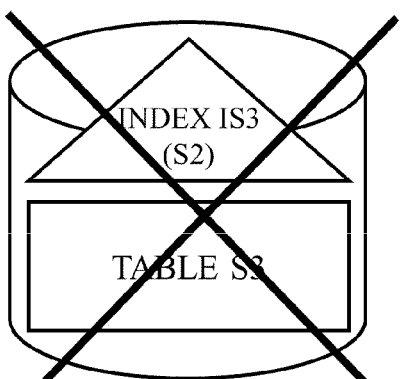
VOLUME 4

Fig. 60

| TARGET VOLUME | INPUT/ OUTPUT TYPE | ADDRESS/SIZE /DATA/ETC. | ISSUE SOURCE | ISSUE TIME |
|---|---|---|---|---|
| VOLUME V2 | INPUT | &H1F00 1024B AAAAAA | DB1 | 2015/06/25 11:48:15 |
|  |  |  |  |  |
|  |  |  |  |  |
|  |  |  |  |  |

COMPUTER SYSTEM, METHOD FOR CONSERVING POWER, AND COMPUTER

CROSS REFERENCE TO RELATED APPLICATION

This Application is a 371 of PCT/JP2016/074893 filed on Aug. 26, 2016 which, in turn, claimed the priority of Japanese Patent Application No. 2015-169171 filed on Aug. 28, 2015, both applications are incorporated herein by reference.

INCORPORATION BY REFERENCE

The present application claims priority to Japanese Patent Application No. 2015-169171 filed on Aug. 28, 2015, the content of which is incorporated herein by reference.

TECHNICAL FIELD

The present invention relates to a technology for adjusting power consumption of a computer system, and more particularly, to a technology for adjusting power consumption in a database management system.

BACKGROUND ART

In a database management system, when a request to execute a query for inputting/outputting data is received, an execution plan for the query is created, and input/output of data and other processing are executed. In the related art, a query execution plan is generated so as to maximize processing performance under limitations on available computer resources such as a main memory capacity and a secondary memory capacity.

In recent years, there has been a strong demand for reduction of power consumption in addition to improvement of the performance. Thus, an increasing number of storage apparatus have various kinds of power saving functions such as spinning down of a disk drive (refer to Patent Literature 1, Patent Literature 2, Non-Patent Literature 1, and Non-Patent Literature 2).

CITATION LIST

Patent Literature

[PTL 1] JP 2003-108317 A
[PTL 2] JP 2007-102322 A

Non-Patent Literature

[NPL 1] S. W. Son and two others, "Disk Layout Optimization for Reducing Energy Consumption.", In Proc. Int'l Conf. on Supercomputing, 2005, pp. 274-283
[NPL 2] J. Gray, and two others, "Parity Striping of Disc Arrays: Low-Cost Reliable Storage with Acceptable Throughput.", In Proceedings of the 16th Very Large Database Conference, 1990, pp. 148-160

SUMMARY OF INVENTION

Technical Problem

However, in the database management system, the query execution plan is generated without consideration of the power saving function of the computer system, resulting in insufficient reduction of power consumption.

The present invention has an object to provide a computer system capable of reducing power consumption by optimizing a query execution plan in consideration of a power saving function in a database management system.

Solution to Problem

A representative example of the invention disclosed in the present application is as follows. That is, there is provided a computer system, including: a database server configured to execute a database management system; and a storage apparatus, which is connected to the database server via a network, and is configured to store data managed by the database management system, the database server including: an interface connected to the network; an arithmetic device connected to the interface; and a main memory device connected to the arithmetic device, the main memory device being configured to store the database management system, the storage apparatus including: a storage unit configured to store data managed by the database management system; and a control unit configured to control read and write of the data stored in the storage unit, the control unit being configured to have a storage power saving function for switching between a sleep mode for reducing power consumption of the storage apparatus and an active mode for enabling read and write of the data, the storage unit being configured to have a volume to be created and provided to the database server as a storage area for reading and writing the data, the main memory device being configured to hold power consumption information on the volume created in the storage unit, the database management system being configured to be executed by the arithmetic device, to thereby: receive a query for reading or writing data stored in the storage apparatus; analyze the received query to create one or more execution plans; identify a volume for reading and writing data based on the created one or more execution plans; calculate power consumption for each of the created one or more execution plans based on power consumption information on the identified volume; select an execution plan for which the calculated power consumption satisfies a predetermined threshold value from the created one or more execution plans; and instruct the control unit to read or write data based on the selected execution plan.

Advantageous Effects of Invention

According to the representative embodiment of the present invention, it is possible to reduce power consumption by generating an execution plan such that the power saving function of the computer system functions effectively.

BRIEF DESCRIPTION OF DRAWINGS

FIG. 10 is a diagram for illustrating an example of a query execution plan management table according to the first embodiment of the present invention.

FIG. 22(A) is a diagram for illustrating configuration of a table of the database according to the first embodiment of the present invention.

FIG. 22(B) is a diagram for illustrating configuration of a table of the database according to the first embodiment of the present invention.

FIG. 23 is a diagram for illustrating storage electric power characteristics information on an external storage apparatus according to the first embodiment of the present invention.

FIG. 24(A) is a diagram for illustrating an example of a query for acquiring data from an external storage apparatus, which is executed by a database server according to the first embodiment of the present invention.

FIG. 24(B) is a diagram for illustrating an example of a query for acquiring data from an external storage apparatus, which is executed by a database server according to the first embodiment of the present invention.

FIG. 28 is a diagram for illustrating an example of a query execution plan table when a threshold value is not specified and reduction of an execution time is prioritized to process the query 1 according to the first embodiment of the present invention.

FIG. 29 is a diagram for illustrating an example of the query execution plan table when the threshold value for maximum power consumption is specified as 250 W and reduction of the execution time is prioritized to process the query 1 according to the first embodiment of the present invention.

FIG. 30 is a diagram for illustrating an example of the query execution plan table when the threshold value is not specified and reduction of the execution time is prioritized to process a query 2 according to the first embodiment of the present invention.

FIG. 36(A) is a table for showing an example of CPU/main memory mode information according to the second embodiment of the present invention, representing modes of the CPU.

FIG. 36(B) is a table for showing an example of CPU/main memory mode information according to the second embodiment of the present invention, representing the main memory.

FIG. 39(A) is a table for showing reduction of power consumption through electric power control of the CPU in the database server according to the second embodiment of the present invention, representing states before execution of electric power control.

FIG. 39(B) is a table for showing reduction of power consumption through electric power control of the CPU in the database server according to the second embodiment of the present invention, representing states after execution of electric power control.

FIG. 40(A) is a table for showing reduction of power consumption through electric power control of the main memory in the database server according to the second embodiment of the present invention, representing states before execution of electric power control.

FIG. 40(B) is a table for showing reduction of power consumption through electric power control of the main memory in the database server according to the second embodiment of the present invention, representing states after execution of electric power control.

FIG. 46 is a table for showing an example of a sleep planning table of a volume and the CPU according to the third embodiment of the present invention.

FIG. 49 is a diagram for illustrating a configuration of a database according to the third embodiment of the present invention.

FIG. 50 is a diagram for illustrating storage electric power characteristics information on an external storage apparatus according to the third embodiment of the present invention.

FIG. 51 is a diagram for illustrating an example of a query to be executed in a database server according to the third embodiment of the present invention.

FIG. 52 is a diagram for illustrating a query execution plan 3 for processing the query 1 by index join (out-of-order execution) according to the third embodiment of the present invention.

FIG. 53(A) is a diagram for illustrating processing performance achieved by the query execution plan 3 when partial execution is not performed in the third embodiment of the present invention, representing performance information of each volume.

FIG. 53(B) is a diagram for illustrating processing performance achieved by the query execution plan 3 when partial execution is not performed in the third embodiment of the present invention, representing a state of each volume.

FIG. 54(A) is a diagram for illustrating processing performance achieved by the query execution plan 3 when partial execution is performed in the third embodiment of the present invention, representing the sleep planning table.

FIG. 54(B) is a diagram for illustrating processing performance achieved by the query execution plan 3 when partial execution is performed in the third embodiment of the present invention, representing performance information on each volume.

FIG. 54(C) is a diagram for illustrating processing performance achieved by the query execution plan 3 when partial execution is performed in the third embodiment of the present invention, representing a state of each volume.

FIG. 60 is a table for showing an example of held input/output information according to the fourth embodiment of the present invention.

DESCRIPTION OF EMBODIMENTS

First Embodiment

A database system (computer system 10) according to a first embodiment of the present invention is configured to execute task processing in accordance with an application program 130, and read/write data stored in an external storage apparatus 200 via a database server 100. In the following, a configuration of the computer system. 10 according to the first embodiment of the present invention is described.

Figure 1:
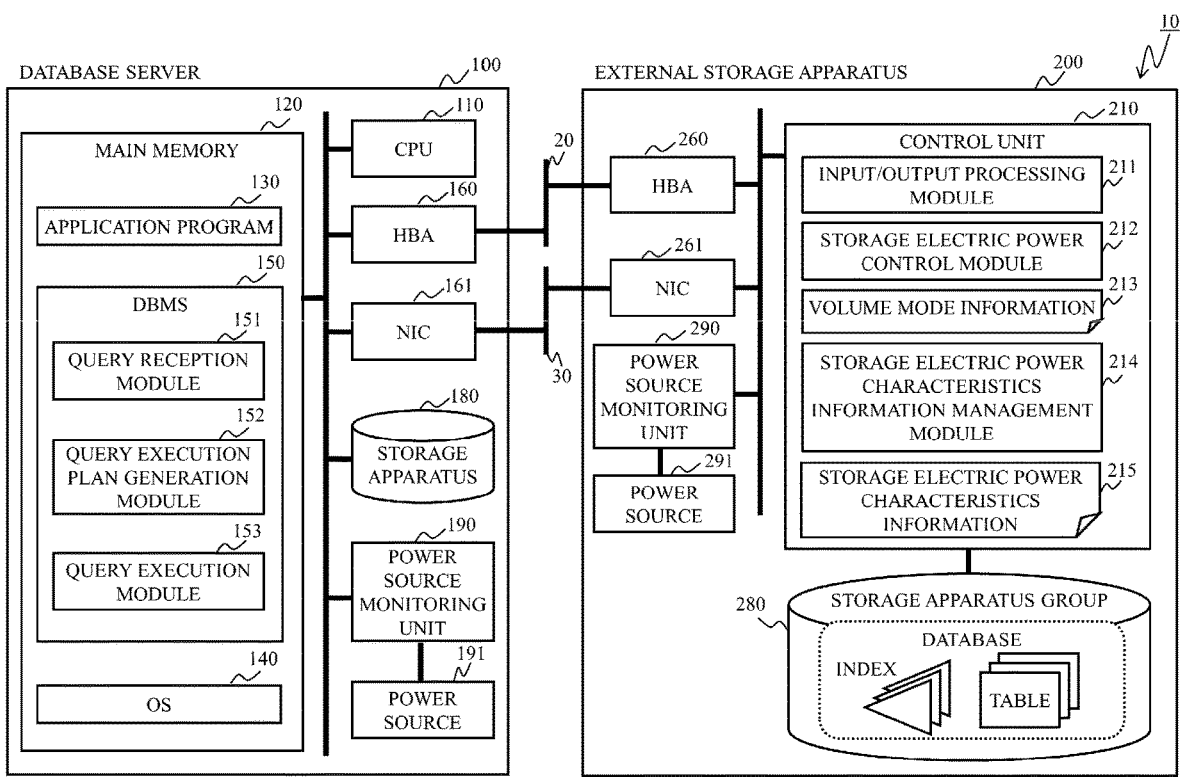
FIG. 1 is a diagram for illustrating a configuration of a computer system according to a first embodiment of the present invention.

FIG. 1 is a diagram for illustrating a configuration of the computer system 10 according to the first embodiment of the present invention. The computer system 10 according to the first embodiment of the present invention includes the database server 100 and the external storage apparatus 200. A plurality of database servers 100 and external storage apparatus 200 may be included. The database server 100 and the external storage apparatus 200 may be housed separately or in the same housing. Further, the database server 100 and the external storage apparatus 200 may be a virtual computer and storage configured on a computer system or a cloud server, respectively.

The database server 100 and the external storage apparatus 200 are connected to each other via two types of networks, namely, a network 20 and a network 30. The network 20 is a network for transmitting/receiving data, and is a storage area network (SAN) adequate for transmission/reception of a large volume of data in the first embodiment. The network 30 is a network through which control information, for example, commands is transmitted/received, and is, for example, an internet protocol (IP) network. The network 20 and the network 30 may be a single network having both functions. Further, the network 20 and the network 30 may be a wired network or a wireless network. The network 20 and the network 30 may each be a bus, for example, a small computer system interface (SCSI) bus.

The database server 100 receives a data input/output request (query), and reads/writes data stored in the external storage apparatus 200. The request for input/output of data may be input from another computer connected via a network, or may be input from an application program executed on the database server 100.

The database server 100 includes a CPU (arithmetic device) 110, a main memory (main memory device) 120, a host bus adaptor (HBA) 160, a network interface card (NIC) 161, a storage apparatus 180, a power source monitoring unit 190, and a power source 191.

The CPU 110 is configured to execute various kinds of processing by executing programs stored in the main memory 120. The main memory 120 is configured to store programs to be executed by the CPU 110. The programs may be stored in the main memory 120 by, for example, reading programs stored in the storage apparatus 180 or reading programs stored in a read-only memory (ROM) (not shown). In the first embodiment, as illustrated in FIG. 1, the main memory 120 stores the application program 130, the operating system (OS) 140, and the database management system (DBMS) 150. Further, the main memory 120 temporarily stores data necessary for execution of each program.

The application program 130 is executed by the CPU 110 to cause the database server 100 to execute task processing. The application program 130 is, for example, a Web application. The application program 130 may not be stored in the database server 100. Instead, a computer (application server) for executing the application program 130 may be provided to transmit an input/output request to the database server 100 and read/write data stored in the external storage apparatus 200 via the database server 100.

The operating system (OS) 140 is configured to provide an interface for the application program 130 to use various kinds of resources, and manage those resources.

The DBMS 150 is configured to manage data stored in the external storage apparatus 200. Further, the DBMS 150 may manage data not only stored in the external storage apparatus 200 but also stored in the storage apparatus 180 included in the database server 100, or may manage data stored in another external storage apparatus (not shown).

The DBMS 150 includes a query reception module 151, a query execution plan generation module 152, and a query execution module 153. The query reception module 151, the query execution plan generation module 152, and the query execution module 153 include programs to be executed by the CPU 110.

The query reception module 151 is configured to receive an input/output request for data, which is input from an external computer or through execution of the application program 130, cause the query execution plan generation module 152 and the query execution module 153 to execute a query, and transmit a result of executing the query to the requestor. The query is, for example, described in SQL.

The query execution plan generation module 152 is configured to analyze the query received by the query reception module 151 to generate a procedure (query execution plan) of accessing data stored in the external storage apparatus 200. In the first embodiment, the query execution plan generation module 152 generates a query execution plan based on the specified policy. The processing to be performed by the query execution plan generation module 152 is described in detail later with reference to FIG. 4 to FIG. 11.

The query execution module 153 is configured to acquire data from the external storage apparatus 200 based on the query execution plan generated by the query execution plan generation module 152. The processing to be performed by the query execution module 153 is described in detail later with reference to FIG. 12 to FIG. 16.

The host bus adaptor (HBA) 160 is an interface for connecting to the network 20. The network interface card (NIC) 161 is an interface for connecting to the network 30.

The storage apparatus 180 is a storage apparatus included in the database server 100. The storage apparatus 180 is a non-volatile storage medium, and stores a program, for example, the application program 130 to be loaded into the main memory 120 for execution, control information necessary to execute the program, and other information. Further, the storage apparatus 180 may store data to be managed by the application program 130, the OS 140, and the DBMS 150.

The power source monitoring unit 190 is configured to monitor a state of supply of power from the power source 191. For example, when cut off of power supply from the power source 191 is detected, processing of turning off (shutting down) the power source of the database server 100 is executed. The cut off of power supply is detected, for example, when a state of a predetermined voltage or less has continued for a predetermined period of time. The power source 191 is formed of, for example, a plurality of power source modules. Further, the power source 191 includes a backup power source, for example, an uninterruptible power supply (UPS), and is capable of continuing power supply for a predetermined period of time after power supply from outside is cut off. With this, it is possible to safely cut off the power source of the database server 100 while power supply is continued by the backup power supply after the power supply is cut off. Further, the power source monitoring unit 190 measures the state of power supply from the power source 191. Items to be measured by the power source monitoring unit 190 include power consumption for power supply and a (cumulative) amount of power. The power source monitoring unit 190 and the power source 191 may be constructed in a housing of the database server 100, or may be constructed in another housing, for example, a power distribution unit (PDU).

The external storage apparatus 200 is configured to store data to be read/written by the database server 100. The external storage apparatus 200 includes a control unit 210, a host bus adaptor (HBA) 260, a network interface card (NIC) 261, a storage apparatus group 280, a power source monitoring unit 290, and a power source 291. Further, the external storage apparatus 200 includes a cooling unit (not shown). The cooling unit is, for example, formed of a plurality of cooling fans. The external storage apparatus 200 may store data other than data read/written by the database server 100.

The control unit 210 is configured to read/write data stored in the storage apparatus group 280 based on an input/output request for data transmitted by the database server 100. The control unit 210 controls the external storage apparatus 200, and is formed of hardware such as an arithmetic device and a storage apparatus, and software, for example, a program to be executed by the arithmetic device.

Further, the control unit 210 provides one ora plurality of storage areas provided by the storage apparatus group 280 to an external computer, for example, the database server 100, as logically one volume. The external storage apparatus 200 provides one or a plurality of volumes. The database server 100 reads/writes data for each volume.

The control unit 210 includes an input/output processing module 211, a storage electric power control module 212, volume mode information 213, a storage electric power characteristics information management module 214, and storage electric power characteristics information 215.

The input/output processing module 211 is configured to receive an input/output request for data stored in the storage apparatus group 280, which is transmitted by, for example, the database server 100. Further, the input/output processing module 211 is configured to transmit the result of the input/output request for data to the requestor of the data.

The storage electric power control module 212 is configured to mainly control power consumption of the storage apparatus group 280. For example, the storage electric power control module 212 reduces power consumption by decelerating or stopping rotation of a disk drive of a storage apparatus that has not been accessed for a predetermined period of time (power saving function).

The volume mode information 213 is configured to store information on volumes provided by the storage apparatus group 280. The volume mode information 213 contains, for example, electric power information representing whether or not the power saving function is being executed. The volume mode information 213 is described in detail later with reference to FIG. 18.

The storage electric power characteristics information management module 214 is configured to manage electric power characteristics information on each volume provided by the storage apparatus group 280. Specifically, the storage electric power characteristics information management module 214 acquires the electric power characteristics information, for example, power consumption for each volume at a predetermined timing, and records the information as the storage electric power characteristics information 215. Processing to be executed by the storage electric power characteristics information management module 214 is described in detail later with reference to FIG. 19 and FIG. 20. The storage electric power characteristics information 215 is described in detail later with reference to FIG. 23.

The host bus adaptor (HBA) 260 is an interface for connecting to the network 20. The network interface card (NIC) 261 is an interface for connecting to the network 30.

The storage apparatus group 280 is formed of a plurality of storage apparatus for which large-volume storage resources are used. In the first embodiment, a magnetic disk apparatus, for example, a hard disk drive (HDD) is used as the storage apparatus, but a non-volatile storage medium such as an optical disc drive, or a semiconductor storage apparatus (solid state drive (SSD)) may be used. Further, redundancy may be secured by a plurality of storage apparatus in order to improve reliability (fault tolerance). Volumes provided by the storage apparatus group 280 store objects constructing a database such as a table (relational table) and an index. The database objects may be stored in one volume, or may be stored in a distributed manner across a plurality of volumes.

Further, the storage apparatus group 280 may include an auxiliary storage device (cache memory) for temporarily storing data in order to make read/write of data stored in each volume faster. For example, it is possible to provide required data quickly without directly acquiring data from storage apparatus constructing the storage apparatus group 280 by predicting data highly likely to be accessed and storing the data into the auxiliary storage device in advance.

The power source monitoring unit 290 is configured to monitor the state of power supply from the power source 291 similarly to the power source monitoring unit 190 of the database server 100. For example, when cut off of power supply is detected, cut-off processing of safely cutting off the power source is executed to prevent breakage of database objects stored in the storage apparatus group 280. Further, the power source monitoring unit 290 measures the state of power supply from the power source 291. Items to be measured by the power source monitoring unit 290 include power consumption for power supply and a (cumulative) amount of power. The power source monitoring unit 290 and the power source 291 may be constructed in a housing of the external storage apparatus 200, or may be constructed in another housing, for example, a power distribution unit (PDU). Further, the power source monitoring unit 290 and the power source 291 may be shared by the power source monitoring unit 190 and the power source 191.

Figure 2:
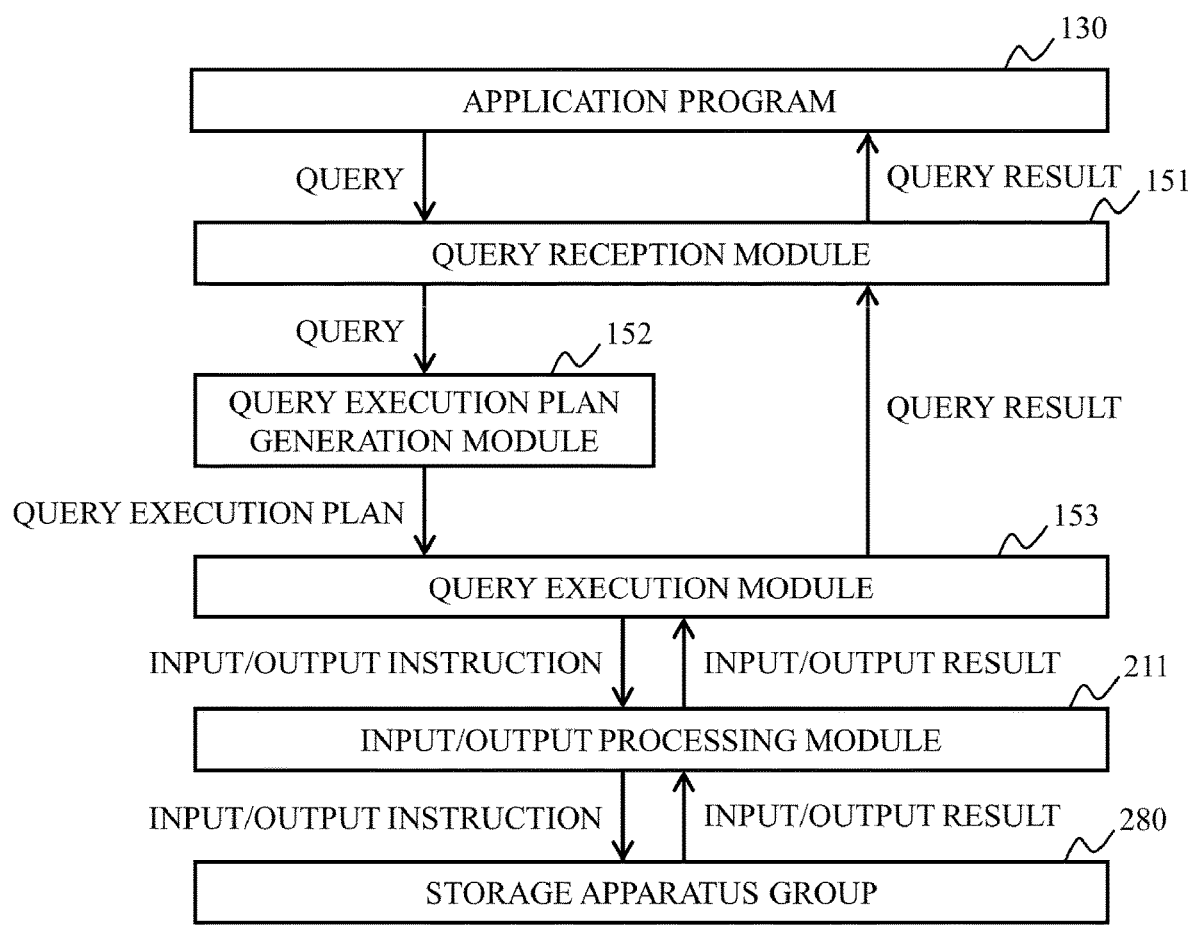
FIG. 2 is a diagram for illustrating an outline of a processing procedure in the computer system according to the first embodiment of the present invention.

This concludes the description of an entire configuration of the computer system 10 according to the first embodiment. Next, an outline of processing in the computer system 10 according to the first embodiment is described. FIG. 2 is a diagram for illustrating an outline of a processing procedure in the computer system 10 according to the first embodiment of the present invention. In FIG. 2, a procedure of acquiring data from the external storage apparatus 200 by the application program 130 via the database management system 150 is illustrated.

When the application program 130 is executed, the CPU 110 of the database server 100 transmits a query (inquiry) for acquiring data to the query reception module 151 of the database management system 150.

When the CPU 110 receives the query, the CPU 110 executes the query execution plan generation module 152, and generates a query execution plan based on the received query. Further, the CPU 110 executes the query execution module 153 based on the generated query execution plan. The query execution module 153 generates an input/output instruction for data based on the generated query execution plan. The query execution module 153 sequentially transmits the input/output instruction for data to the external storage apparatus 200.

The query execution plan is formed by combining operations including, for example, the input/output instruction for data and arithmetic processing. Further, the order of operations is defined as necessary. For example, when a query for acquiring different pieces of data is executed, the query execution plan may contain a plurality of operations containing input/output instructions for different pieces of data.

When the input/output processing module 211 receives the input/output instruction for data transmitted from the database server 100, the control unit 210 of the external storage apparatus 200 identifies a storage location of requested data in a database stored in the storage apparatus group 280 based on configuration information and other information on the volumes, to thereby access the data. Then, the input/output processing module 211 sends the result of accessing data (input/output result) to the database server 100 as a response. At this time, the input/output result is transmitted via the HBA 260 and the network 30.

When the CPU 110 receives an input/output result from the external storage apparatus 200, the CPU 110 generates a query execution result based on the input/output result received by the query execution module 153 and the query execution plan. When the CPU 110 receives all the input/output results, the CPU 110 generates a final query execution result, and the query reception module 151 sends the final query execution result to the application program 130 as a response. The application program 130 executes task processing based on the sent query result.

Next, a description is given of processing in the computer system. 10 according to the first embodiment of the present invention. The description is given of each processing in accordance with the procedure illustrated in FIG. 2.

Figure 3:
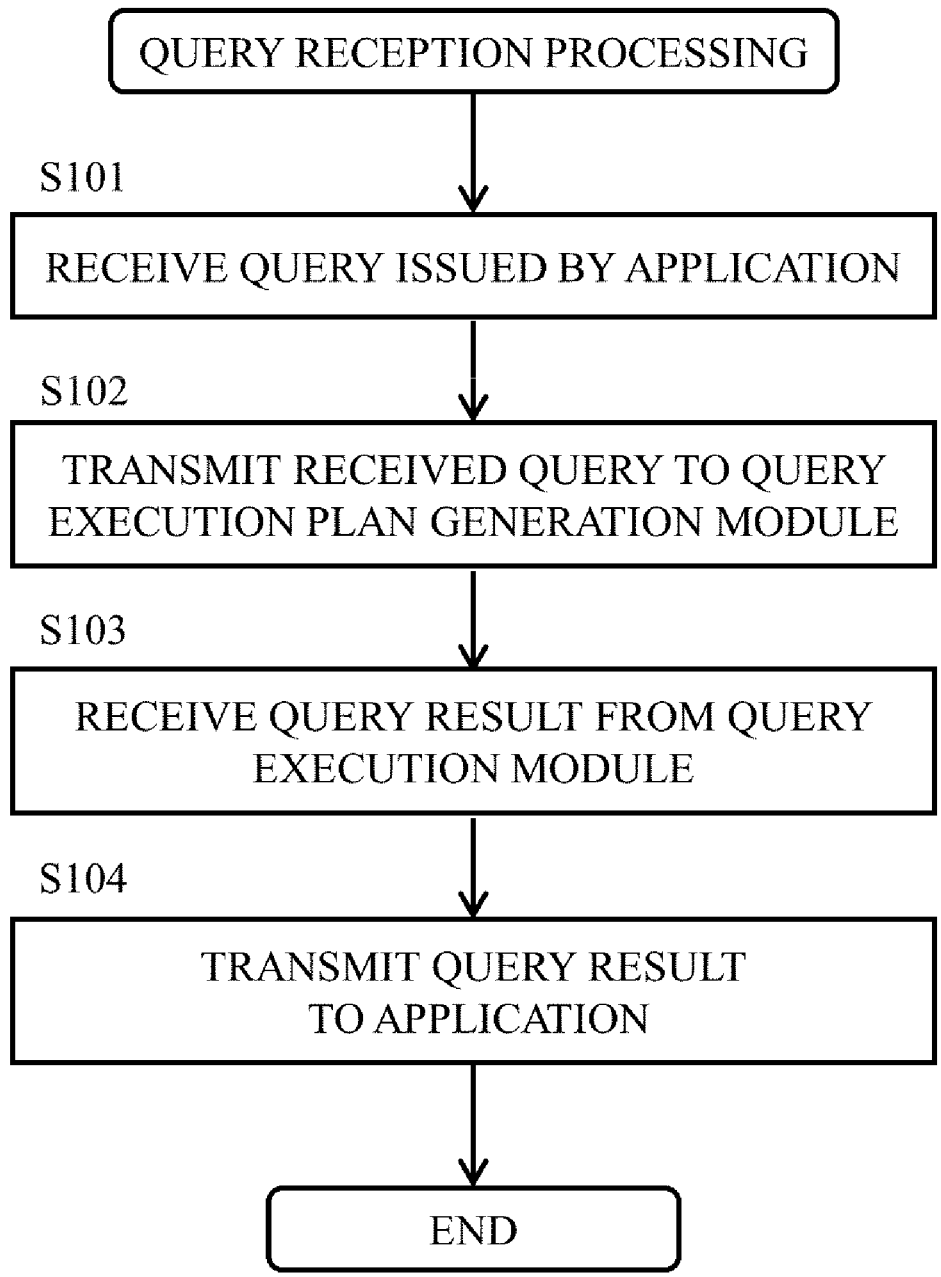
FIG. 3 is a flowchart for illustrating a procedure of query reception processing according to the first embodiment of the present invention.

FIG. 3 is a flowchart for illustrating a procedure of query reception processing according to the first embodiment of the present invention. The query reception processing is executed by the query reception module 151 included in the DBMS 150 executed by the database server 100. The query reception processing is executed when an input/output request (query) for data stored in the external storage apparatus 200 is received.

The CPU 110 of the database server 100 receives a query (input/output request) issued by an application with the query reception module 151 (Step S101). Further, the CPU 110 transmits the received query to the query execution plan generation module 152 (Step S102).

The CPU 110 executes query execution plan generation processing with the query execution plan generation module 152 to generate a query execution plan. The query execution plan generation processing is described in detail later with reference to FIG. 4. Then, the CPU 110 transmits the generated query execution plan to the query execution module 153 to execute the received query. When execution of the query is complete, the query reception module 151 receives a query result from the query execution module 153 (Step S103). After that, the query reception module 151 transmits the received query result to the application (Step S104).

Figure 4:
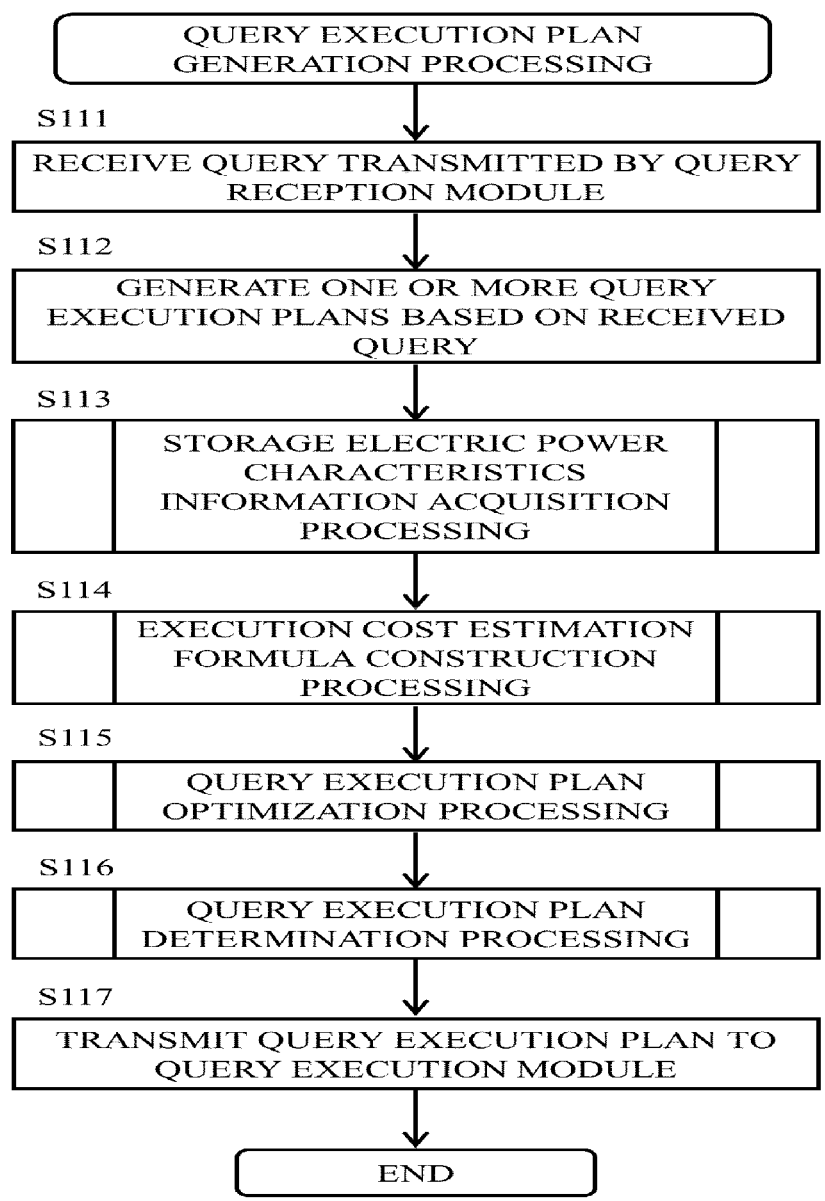
FIG. 4 is a flowchart for illustrating a procedure of query execution plan generation processing according to the first embodiment of the present invention.

Next, the query execution plan generation processing is described. FIG. 4 is a flowchart for illustrating a procedure of the query execution plan generation processing according to the first embodiment of the present invention. The query execution plan generation processing is executed by the query execution plan generation module 152 included in the DBMS 150 executed by the database server 100.

When the query reception module 151 executes the query execution plan generation processing, the CPU 110 of the database server 100 first receives the query transmitted by the query reception module 151 (Step S111). Further, the CPU 110 generates one or more query execution plans based on the received query (S112).

The query execution plan defines a procedure of extracting records from a table (relational table) storing data or sorting the extracted records based on the received query. In the first embodiment, a plurality of query execution plans are generated, and as described later, an execution cost for each query execution plan is calculated to optimize parameters, and a query execution plan is determined for actual execution.

Now, an example of the query execution plan is described. Examples of the join operation for the query execution plan include hash join, nested loop join, and sort-merge join. Each join operation has advantages and disadvantages, and is selected depending on its necessary performance.

In hash join, in Step 1, a hash table R' is created from a relational table R. Next, in Step 2, a relational table S is scanned and collated with the hash table R'. Lastly, the collation result is sorted in Step 3.

In nested loop join, in Step 1, the relational table R is scanned, and an index S' is referred to for each row to probe the relational table S. Then, in Step 2, the result of probing the relational table S is sorted.

In sort-merge join, in Step 1, the relational table R is sorted. Then, in Step 2, the index S' is referred to to scan the relational table S for collation with the sorted relational table R.

Then, when the query execution plan is generated, the CPU 110 executes processing of determining a query execution plan. In the first embodiment, in order to include power that is consumed through execution of a query in evaluation of the query, first, storage electric power characteristics information acquisition processing of acquiring electric power characteristics information in the external storage apparatus 200 is executed (Step S113). The storage electric power characteristics information acquisition processing is described in detail later with reference to FIG. 5. In the first embodiment, electric power characteristics information is acquired from the external storage apparatus 200 every time a query is received. However, the electric power characteristics information may be acquired from the external storage apparatus 200 periodically to be stored into the main memory 120, and this information may be referred to at the time of query execution.

Next, the CPU 110 executes execution cost estimation formula construction processing of constructing an execution cost estimation formula of the generated query execution plan (Step S114). The execution cost estimation formula contains an estimation formula for evaluating performance, for example, a processing speed, and an estimation formula for evaluating power consumption. The execution cost estimation formula construction processing is described in detail later with reference to FIG. 8.

Next, the CPU 110 calculates estimation values of the execution cost for each query execution plan based on the execution cost estimation formula constructed by the processing of Step S114, and executes query execution plan optimization processing of optimizing each query execution plan (Step S115). The query execution plan optimization processing is described in detail later with reference to FIG. 9.

Further, the CPU 110 executes query execution plan determination processing of determining a query execution plan to be executed, based on the estimation values of the execution cost for each query execution plan that is optimized at the processing of Step S115 (Step S116). The query execution plan determination processing is described in detail later with reference to FIG. 11.

Lastly, the CPU 110 transmits the determined query execution plan to the query execution module 153 (Step S117), and finishes the processing.

Figure 5:
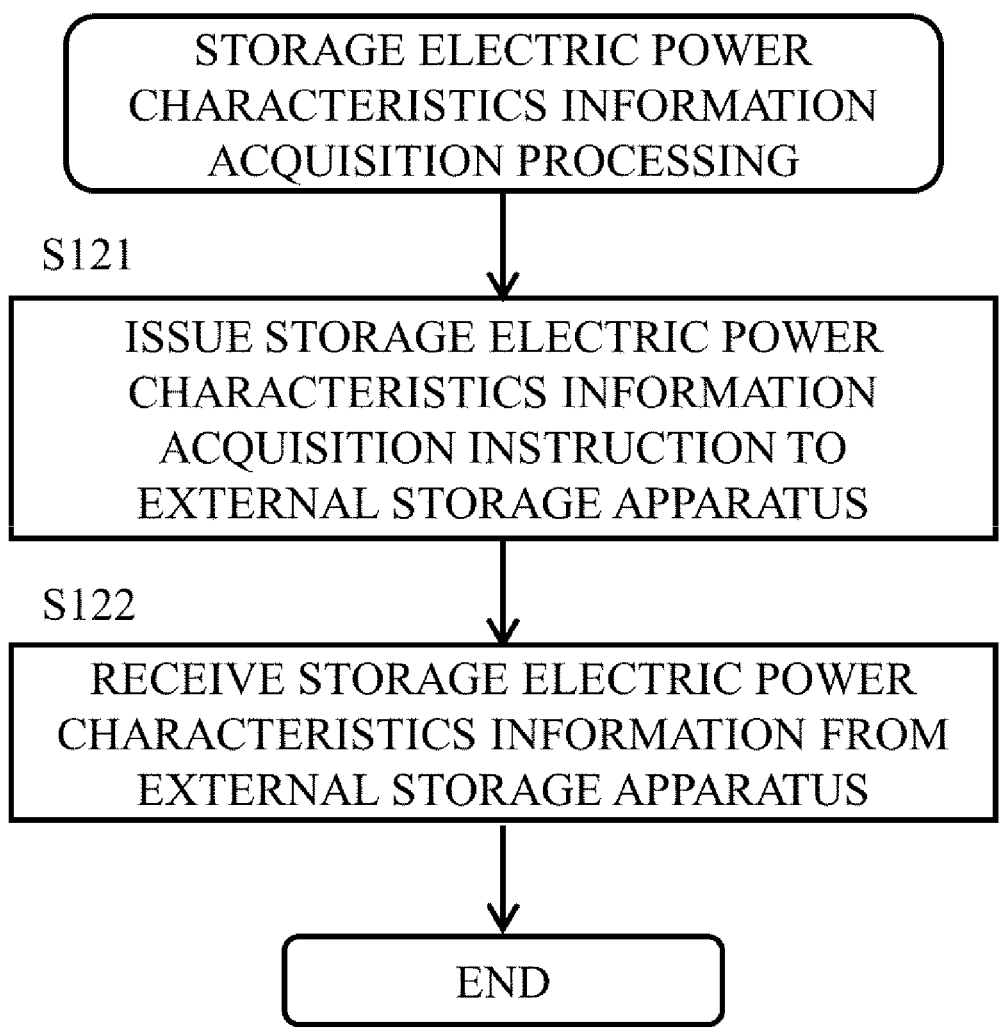
FIG. 5 is a flowchart for illustrating a procedure of storage electric power characteristics information acquisition processing according to the first embodiment of the present invention.

Next, a description is given of the storage electric power characteristics information acquisition processing of acquiring electric power characteristics information, for example, power consumption of each volume provided by the external storage apparatus 200. FIG. 5 is a flowchart for illustrating a procedure of the storage electric power characteristics information acquisition processing according to the first embodiment of the present invention. The storage electric power characteristics information acquisition processing is executed by the query execution plan generation module 152 included in the DBMS 150 executed by the database server 100.

When the storage electric power characteristics information acquisition processing is executed, the CPU 110 issues a storage electric power characteristics information acquisition instruction to the external storage apparatus 200 (Step S121). When the external storage apparatus 200 receives a storage electric power characteristics information acquisition instruction, the external storage apparatus 200 acquires the requested electric power characteristics information, and sends the information to the database server 100 as a response. Then, the CPU 110 receives storage electric power characteristics information from the external storage apparatus 200 (Step S122), and stores the information into the main memory 120 (query execution plan generation module 152). After that, the CPU 110 calculates, for example, the estimation values of the execution cost for a query execution plan based on the acquired storage electric power characteristics information.

Figure 6:
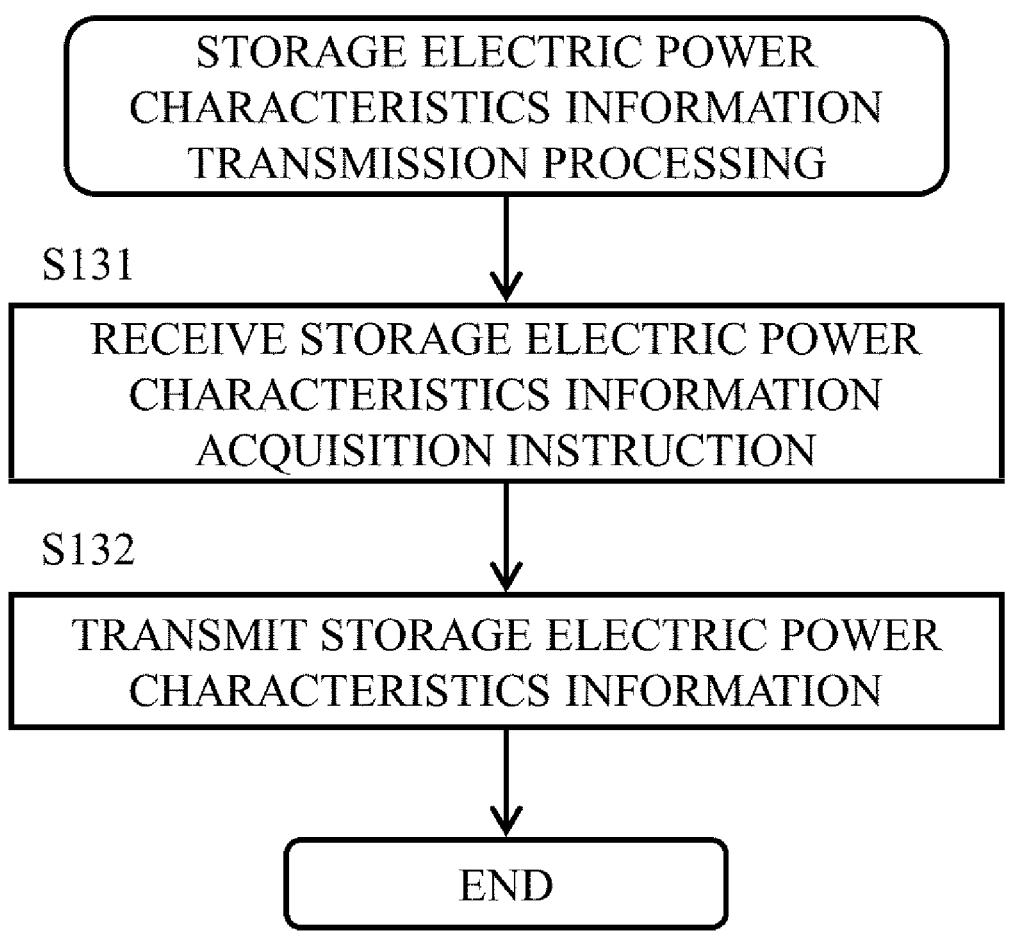
FIG. 6 is a flowchart for illustrating a procedure of storage electric power characteristics information transmission processing according to the first embodiment of the present invention.

Next, a description is given of storage electric power characteristics information transmission processing. FIG. 6 is a flowchart for illustrating a procedure of storage electric power characteristics information transmission processing according to the first embodiment of the present invention. The storage electric power characteristics information transmission processing is executed by the storage electric power characteristics information management module 214 included in the control unit 210 of the external storage apparatus 200.

When the control unit 210 receives a storage electric power characteristics information acquisition instruction from the database server 100 (Step S131), the control unit 210 transmits the storage electric power characteristics information 215 to the database server 100 (Step S132). When the storage electric power characteristics information acquisition instruction contains specification of electric power characteristics information to be acquired, the control unit 210 may transmit the specified information, or may always transmit the storage electric power characteristics information 215 that can be acquired. The generation timing of the storage electric power characteristics information according to the first embodiment is described in detail later with reference to FIG. 7.

Figure 7:
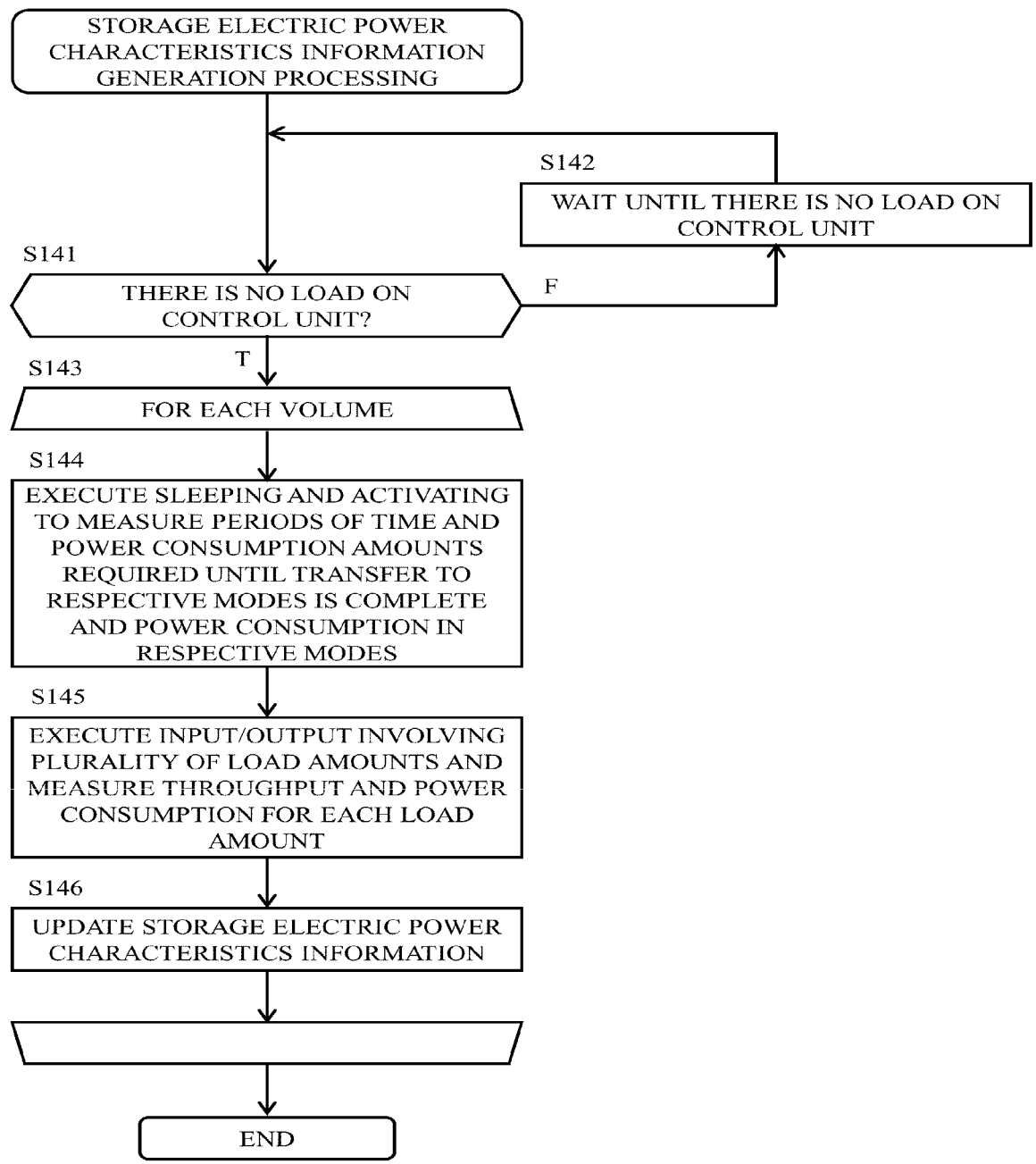
FIG. 7 is a flowchart for illustrating a procedure of storage electric power characteristics information generation processing according to the first embodiment of the present invention.

Next, storage electric power characteristics information generation processing is described. FIG. 7 is a flowchart for illustrating a procedure of the storage electric power characteristics information generation processing according to the first embodiment of the present invention. The storage electric power characteristics information generation processing is executed by the storage electric power characteristics information management module 214 included in the control unit 210 of the external storage apparatus 200.

Further, the storage electric power characteristics information generation processing may be executed at the timing of reception of the storage electric power characteristics information acquisition instruction. However, in the first embodiment, the storage electric power characteristics information generation processing may be executed at an independent timing irrespective of the execution timing of the storage electric power characteristics information transmission processing. Specifically, whether or not there is a load on the control unit 210 is detected, and when there is no load, the storage electric power characteristics information is generated. Further, processing of generating the storage electric power characteristics information may be executed periodically or held until there is no load when there is a load on the control unit 210 at the time of execution of the processing, and after that, the storage electric power characteristics information may be generated.

The control unit 210 first determines whether or not there is no load on the control unit 210 when the storage electric power characteristics information generation processing is started (Step S141). When there is no load on the control unit 210, the control unit 210 is not processing an input/output request received from the database server 100 or other entities, for example. When there is a load on the control unit 210 ("F" as a result of Step S141), the control unit 210 waits until there is no load on the control unit 210 (Step S142).

When there is no load on the control unit 210 ("T" as a result of Step S141), the control unit 210 executes processing of from Step S144 to Step S146 for each volume (Step S143).

The control unit 210 first transfers a volume for which the storage electric power characteristics information is to be generated to a sleep mode (sleeping) and an active mode (activating), and measures periods of time and power consumption amounts required until transfer to respective modes is complete (Step S144). The active mode is a mode in which stored data can be accessed immediately. For example, in the case of a disk drive, the active mode is a mode in which the disk drive is maintaining a normal rotation speed. In the case of a flash memory, the active mode is a mode in which a flash chip and a controller are operating. On the other hand, the sleep mode is a mode in which power consumption is reduced. For example, in the case of a disk drive, the sleep mode is a mode in which rotation of the disk is stopped or the disk is rotating at a low speed. In the case of a flash memory, the sleep mode is a mode in which any one of a flash chip and a controller is stopped or sleeping. When data is input/output from a volume in the sleep mode, it is necessary to temporarily transfer the mode to the active mode. In this description, two types of modes, namely, the active mode and the sleep mode are mentioned as the mode of the volume. However, modes other than those two types of modes may be assumed, for example, a mode in which the volume is accessed at a lower speed and its power consumption is also lower compared to the active mode.

Next, the control unit 210 executes input/output involving a plurality of load amounts for a target volume. Then, the control unit 210 measures throughput and power consumption for each load amount (Step S145).

After processing of Step S144 and Step S145 is finished, the control unit 210 updates the storage electric power characteristics information 215 corresponding to the target volume (Step S146). The above-mentioned processing is executed for all the volumes to generate the storage electric power characteristics information 215.

Figure 8:
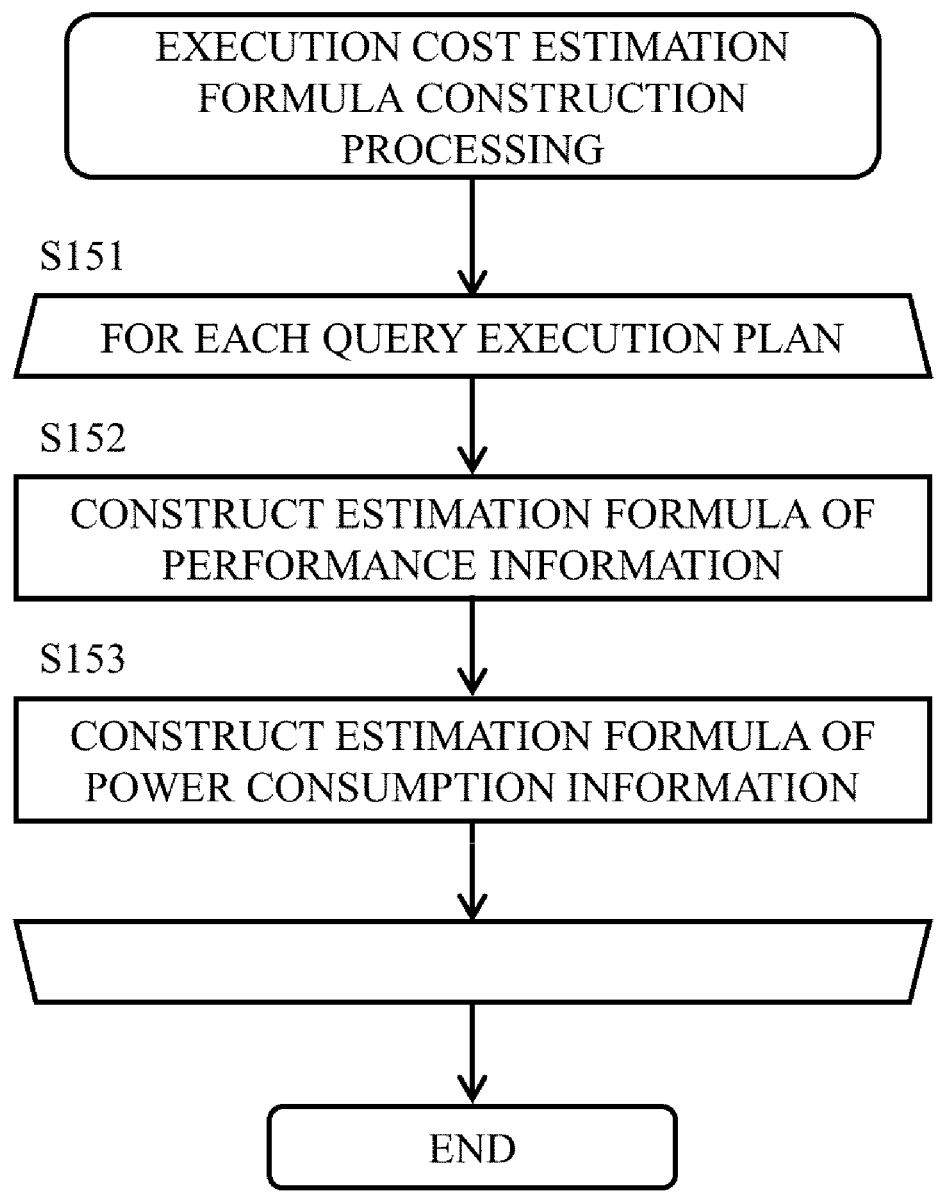
FIG. 8 is a flowchart for illustrating a procedure of execution cost estimation formula construction processing according to the first embodiment of the present invention.

Next, a description is given of the execution cost estimation formula construction processing of constructing an estimation formula for calculating an execution cost for a query execution plan. FIG. 8 is a flowchart for illustrating a procedure of the execution cost estimation formula construction processing according to the first embodiment of the present invention. The execution cost estimation formula construction processing is executed by the query execution plan generation module 152 included in the DBMS 150 executed by the database server 100.

When the execution cost estimation formula construction processing is started, the CPU 110 executes processing of Step S152 and Step S153 for all the generated query execution plans (Step S151). At this time, the processing of those steps is not necessarily performed for all the generated query execution plans. Instead, a part of the query execution plans may be excluded by, for example, using a rule determined in advance.

The CPU 110 first constructs an estimation formula of performance information (Step S152). The performance information is information relating to, for example, an execution speed or execution time of a query, and may be, for example, an execution multiplicity or a memory consumption amount. Next, the CPU 110 constructs an estimation formula of power consumption information (Step S153). The power consumption information is information relating to power consumption at the time of execution of a query, and is, for example, an average power consumption amount per unit time, a maximum power consumption amount, or a total power consumption amount.

Figure 9:
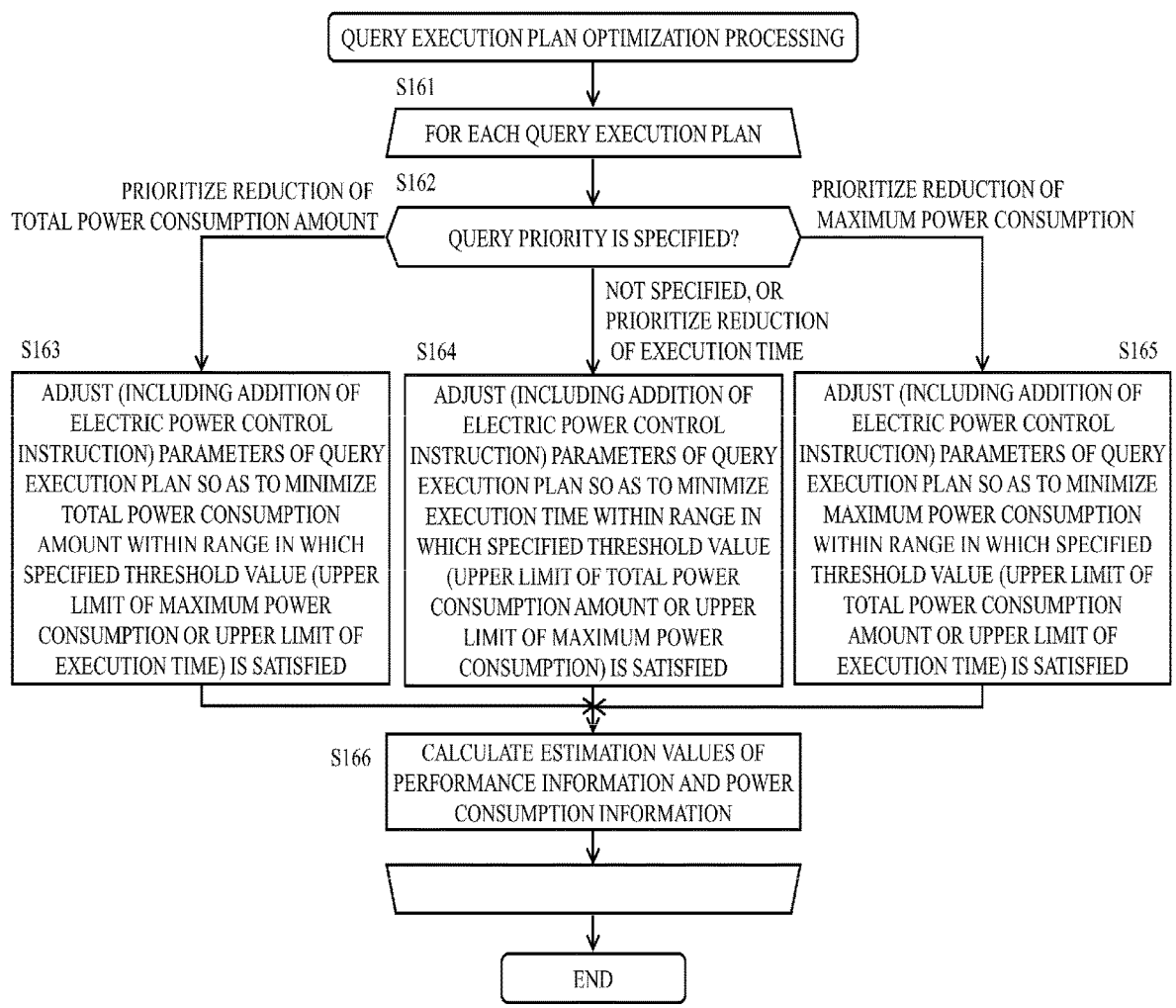
FIG. 9 is a flowchart for illustrating a procedure of query execution plan optimization processing according to the first embodiment of the present invention.

Next, when the estimation formula of the execution cost for each query execution plan is constructed, the parameters of the query execution plan are optimized based on the estimation formula. FIG. 9 is a flowchart for illustrating a procedure of the query execution plan optimization processing according to the first embodiment of the present invention. The query execution plan optimization processing is executed by the query execution plan generation module 152 included in the DBMS 150 executed by the database server 100.

The CPU 110 adjusts, for each query execution plan, the parameters of the query execution plan so as to conform to a specified priority (query priority) (Step S161). In the first embodiment, for example, reduction of the total power consumption amount is prioritized to adjust parameters, or reduction of the maximum power consumption is prioritized to adjust parameters. When the priority is not specified in particular, for example, the parameters are adjusted so as to reduce the execution time. Moreover, a threshold value can be set for each item to be prioritized, and the item to be prioritized is optimized within a range in which the threshold value is satisfied. At this time, the above-mentioned processing may not be performed for all the query execution plans, and some of the query execution plans may be excluded, for example, by using a rule defined in advance.

The CPU 110 first determines whether or not the query priority is specified (Step S162). The query priority may be specified as an indicator in an SQL representing a query, or may be contained in a configuration file of the DBMS 150. When the query priority is specified as an indicator in an SQL, for example, power consumption can be adjusted only when a specific high-load query is executed. On the contrary, when a query priority is specified in the configuration file of the DBMS 150, for example, the power consumption amount of the entire computer system can be adjusted.

When the query priority is specified as reduction of the total power consumption amount, the CPU 110 adjusts the parameters of the query execution plan so as to minimize the total power consumption amount within a range in which the specified threshold value is satisfied (Step S163). At this time, for example, the upper limit of the maximum power consumption or the upper limit of the execution time is specified as the threshold value.

Further, when the query priority is not specified, or when reduction of the execution time is specified, the CPU 110 adjusts the parameters of the query execution plan so as to minimize the execution time within the range in which the specified threshold value is satisfied (Step S164). At this time, the upper limit of the maximum power consumption or the upper limit of the total power consumption amount is specified as the threshold value.

Further, when the query priority is specified as reduction of the maximum power consumption, the CPU 110 adjusts the parameters of the query execution plan so as to minimize the maximum power consumption within the range in which the specified threshold value is satisfied (Step S165). At this time, the upper limit of the maximum power consumption and the upper limit of the execution time are specified as the threshold values.

The parameter of the query execution plan is, for example, the number of generatable tasks (the upper limit number of tasks that can access the external storage apparatus 200 simultaneously) that access data when a query is executed in the out-of-order execution format described later.

The adjustment of parameters of the query execution plan includes adding an electric power control instruction to be transmitted to the external storage apparatus 200. For example, when a specific volume is not accessed in a subsequent operation in the query execution plan, an electric power control instruction indicating "sleeping" is added. In this manner, it is possible to activate early the power saving function of a volume that is not accessed.

When adjustment of the parameters of the query execution plan is finished, the CPU 110 applies the query execution plan to an estimation formula of the execution cost to calculate the estimation values of performance information and power consumption information (Step S166). Then, when processing of from Step S162 to Step S165 is executed for all the query execution plans, the processing is finished.

When all the pieces of performance information and power consumption information are calculated for the generated query execution plans, the query execution plan management table is created. FIG. 10 is a diagram for illustrating an example of the query execution plan management table according to the first embodiment of the present invention. The query execution plan management table stores parameters of query execution plans, and estimation formulas and estimation values of the execution cost.

In the first embodiment, whether or not out-of-order execution is performed and a multiplicity of when out-of-order execution is performed are set as the parameters of the query execution plan. The multiplicity of when out-of-order execution is performed is the upper limit number of simultaneously generatable tasks for acquiring data. The estimation formulas and estimation values of the execution cost are stored. The estimation formula of the execution cost is defined for the execution time, the power consumption amount, and the maximum power consumption based on, for example, the execution format and parameters of a query. The estimation value is the result of applying a query to be executed to an estimation formula of the execution cost.

The query execution plan management table may be created when an execution plan is generated, an estimation formula may be written at the time of execution of the execution cost estimation formula construction processing, and the calculation result of the estimation formula may be written at the time of execution of the query execution plan optimization processing.

Figure 11:
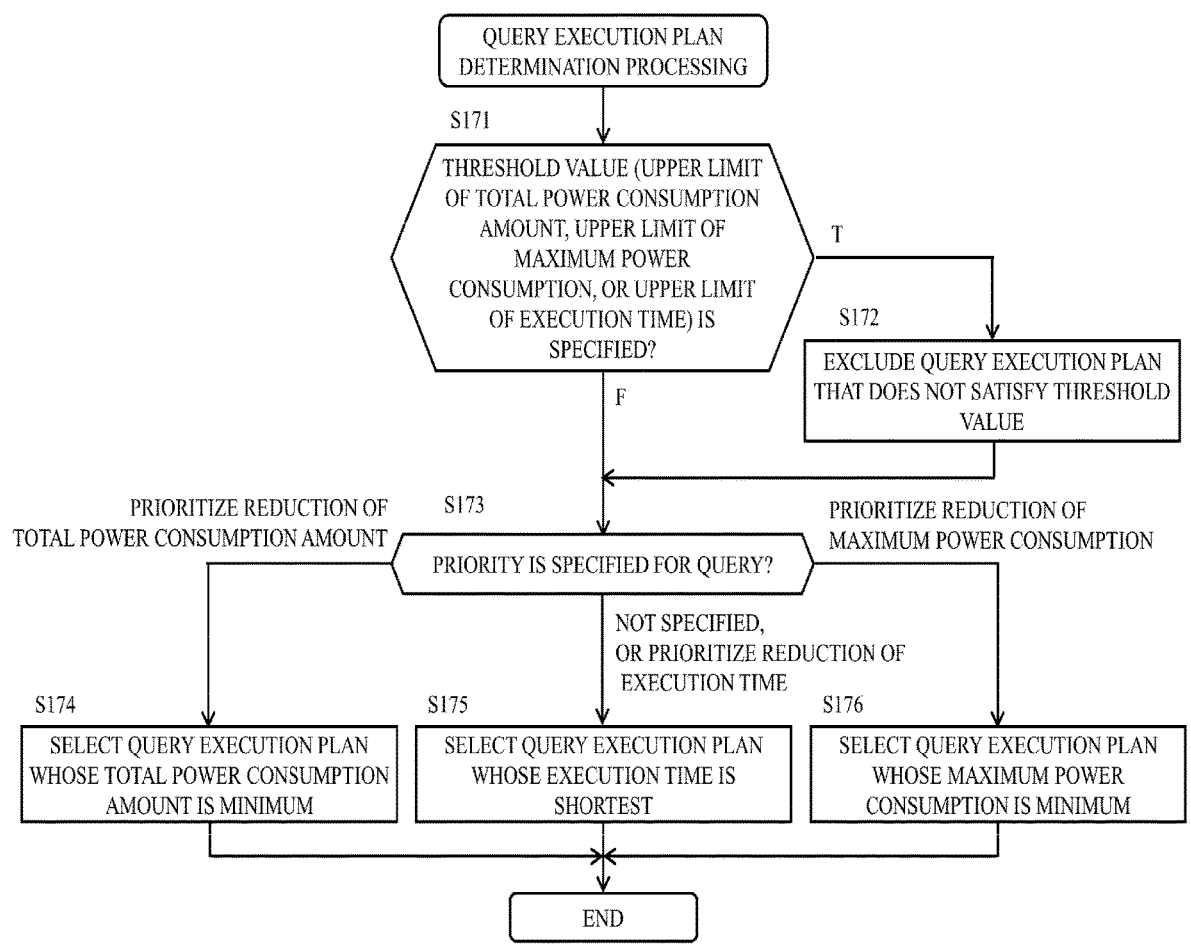
FIG. 11 is a flowchart for illustrating a procedure of query execution plan determination processing according to the first embodiment of the present invention.

When the query execution plan management table is created, a query execution plan to be executed is determined from the generated query execution plans. FIG. 11 is a flowchart for illustrating a procedure of the query execution plan determination processing according to the first embodiment of the present invention.

The CPU 110 first determines whether or not a threshold value is specified for an evaluation measure of the query (Step S171). When a threshold value is specified ("T" as a result of Step S171), a query execution plan that does not satisfy the threshold value is excluded (Step S172).

Next, the CPU 110 determines whether or not a priority (query priority) is specified for an evaluation measure of the query (Step S173). When the query priority is specified as reduction of the total power consumption amount, a query execution plan whose total power consumption amount is minimum is selected (Step S174). When the query priority is not specified, or reduction of the execution time is specified, a query execution plan whose execution time is the shortest is selected (Step S175). When the query priority is specified as reduction of the maximum power consumption, a query execution plan whose maximum power consumption is minimum is selected (Step S176).

Figure 12:
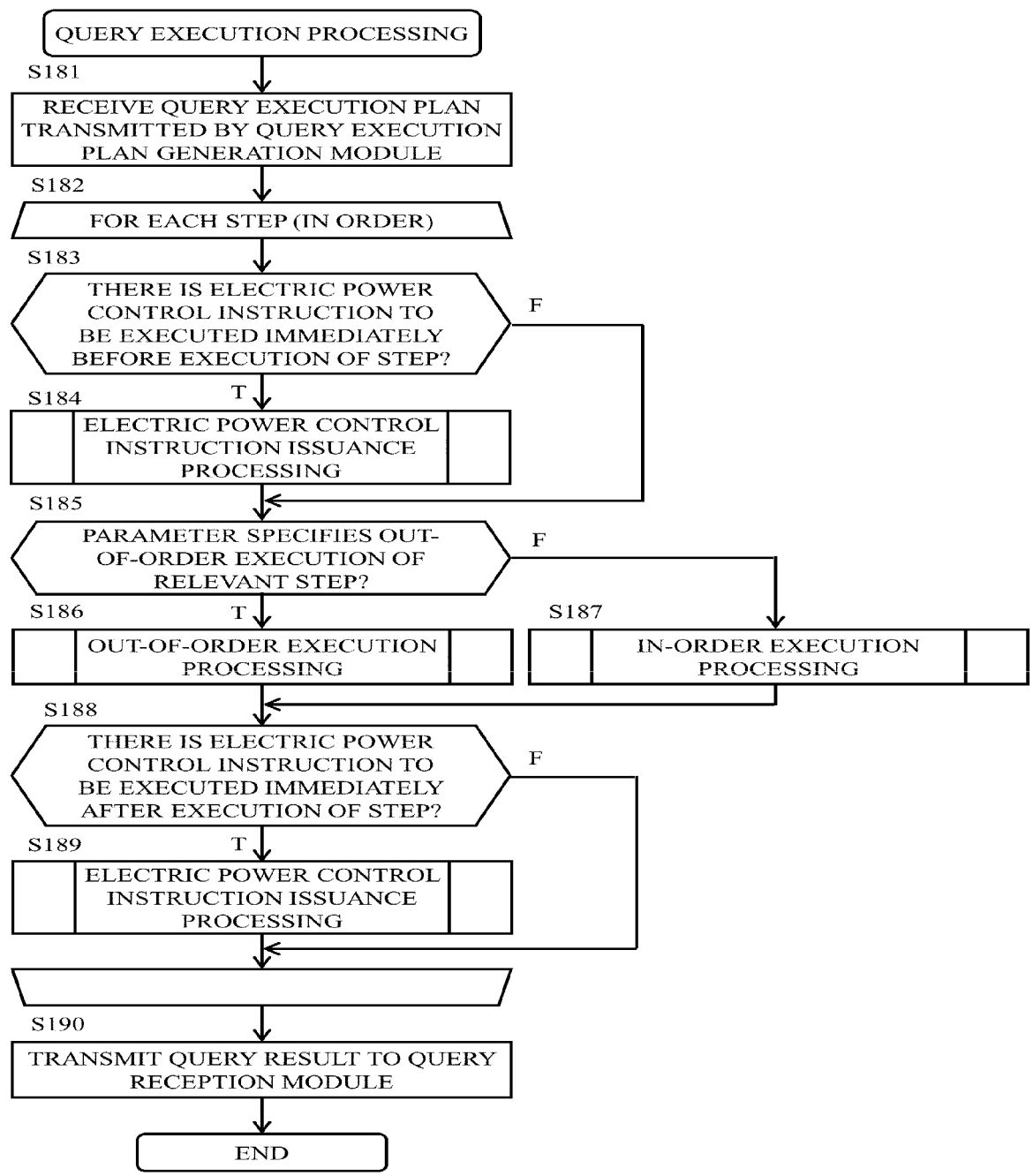
FIG. 12 is a flowchart for illustrating a procedure of query execution processing according to the first embodiment of the present invention.

As described above, when a query execution plan is determined, the query execution module 153 executes a query. FIG. 12 is a flowchart for illustrating a procedure of the query execution processing according to the first embodiment of the present invention.

The CPU 110 transmits a query execution plan determined by the query execution plan generation module 152 to the query execution module 153 (Step S181). The query execution plan is formed of one or a plurality of execution plan steps, and executes processing of from Step S183 to Step 189 sequentially for each execution plan step (Step S182).

The CPU 110 determines whether or not an instruction is given to issue an electric power control instruction immediately before execution of the execution plan step (Step S183). When the CPU 110 issues an electric power control instruction immediately before execution of the execution plan step ("T" as a result of Step S183), the CPU 110 executes electric power control instruction issuance processing of issuing an instructed electric power control instruction (Step S184). For example, the CPU 110 issues an electric power control instruction for preliminarily activating a volume to be accessed. The electric power control instruction issuance processing is described in detail later with reference to FIG. 13.

Next, the CPU 110 determines whether or not a parameter is set such that the execution plan step to be executed is processed in the out-of-order execution (Step S185). When the execution plan step is executed in the out-of-order execution ("T" as a result of Step S185), out-of-order execution processing is executed for the execution plan step (Step S186). The out-of-order execution processing is described in detail later with reference to FIG. 14.

On the contrary, when the CPU 110 does not execute the execution plan step in the out-of-order execution ("F" as a result of Step S185), the CPU 110 executes in-order execution processing for the execution plan step (Step S187). The in-order execution processing is described in detail later with reference to FIG. 15.

After the CPU 110 executes the execution plan step, the CPU 110 determines whether or not an instruction is given to issue an electric power control instruction immediately after execution of the execution plan step (Step S188). When an electric power control instruction is to be issued immediately after execution of the execution plan step ("F" as a result of Step S188), the CPU 110 executes the electric power control instruction issuance processing of issuing the specified electric power control instruction (Step S189). For example, the CPU 110 issues an electric power instruction for causing an accessed volume to sleep.

When all the execution plan steps of the query execution plan are executed, the CPU 110 transmits a result of executing the query to the query reception module 151 (Step S190), and finishes the processing.

Figure 13:
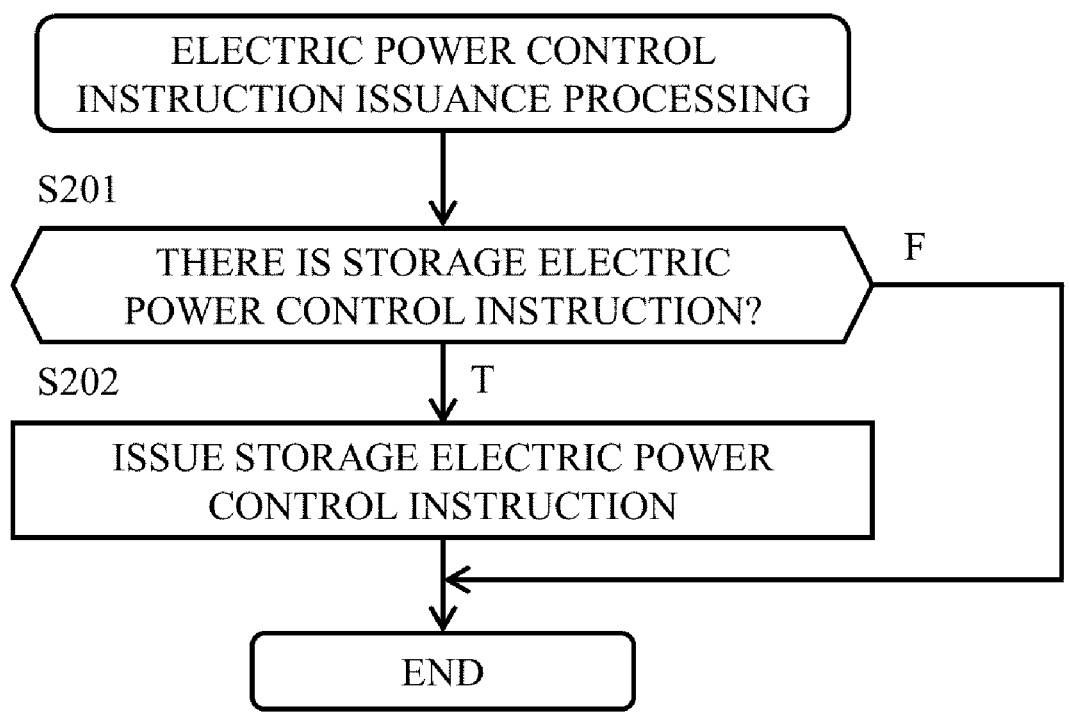
FIG. 13 is a flowchart for illustrating a procedure of electric power control instruction issuance processing according to the first embodiment of the present invention.

Next, the electric power control instruction issuance processing of issuing an electric power control instruction to a control target is described. FIG. 13 is a flowchart for illustrating a procedure of the electric power control instruction issuance processing according to the first embodiment of the present invention.

The CPU 110 determines whether or not the electric power control instruction specified in the query execution plan contains a storage electric power control instruction (Step S201). When the electric power control instruction specified in the query execution plan contains a storage electric power control instruction ("T" as a result of Step S201), the CPU 110 issues a storage electric power control instruction to the external storage apparatus 200 (Step S202).

Next, a description is given of a method of accessing data in the out-of-order execution in each execution plan step of the query execution plan. In the out-of-order execution, respective operations forming the query execution plan are sequentially executed to generate tasks for acquiring data from the external storage apparatus 200, and a plurality of tasks are executed in parallel. The upper limit number of tasks that are generated simultaneously is set as a parameter. Setting of the parameter is determined in the query execution plan optimization processing (FIG. 9).

Figure 14:
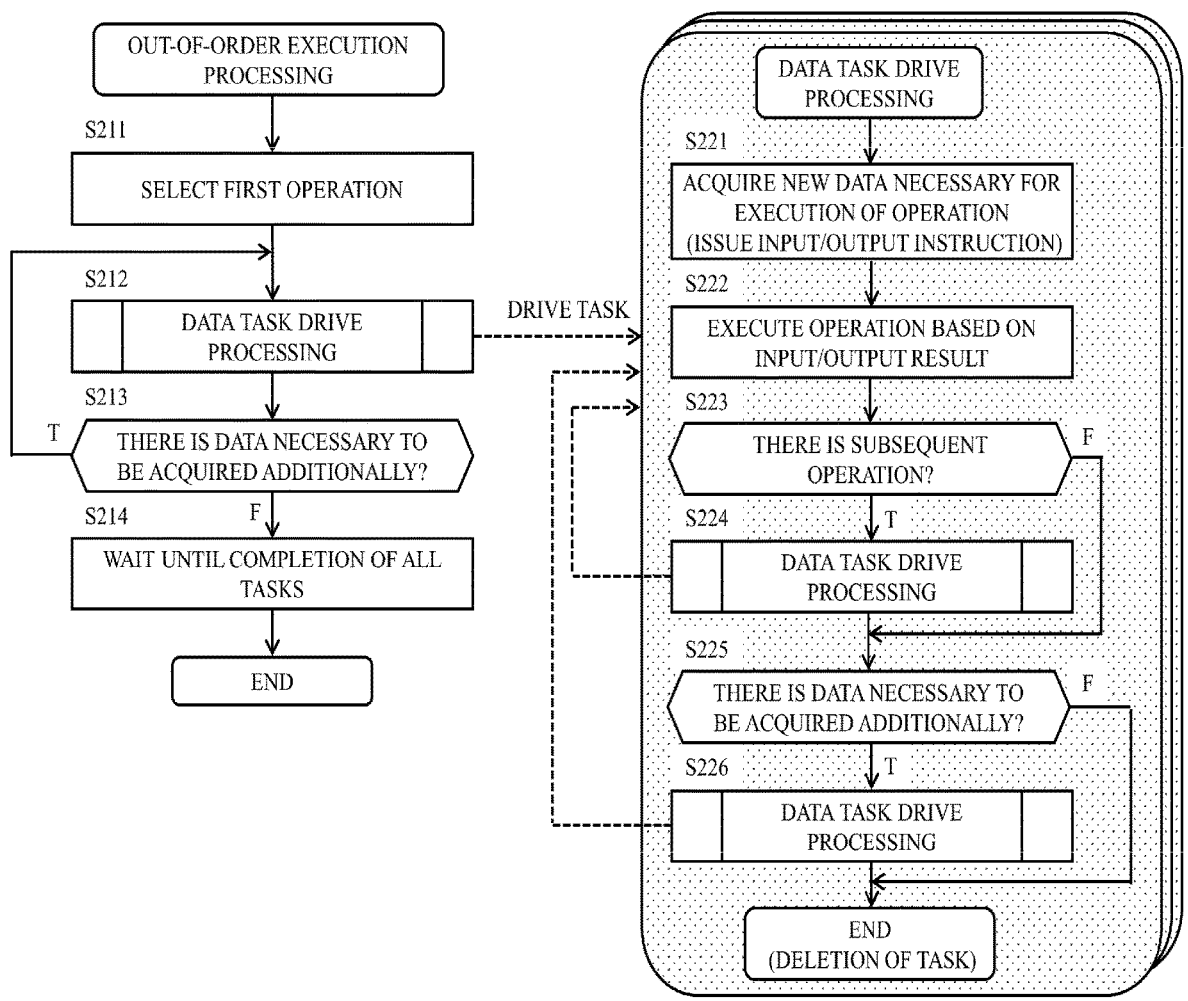
FIG. 14 is a flowchart for illustrating procedures of out-of-order execution processing and data task drive processing according to the first embodiment of the present invention.

FIG. 14 is a flowchart for illustrating a procedure of the out-of-order execution processing and data task drive processing according to the first embodiment of the present invention.

Figure 15:
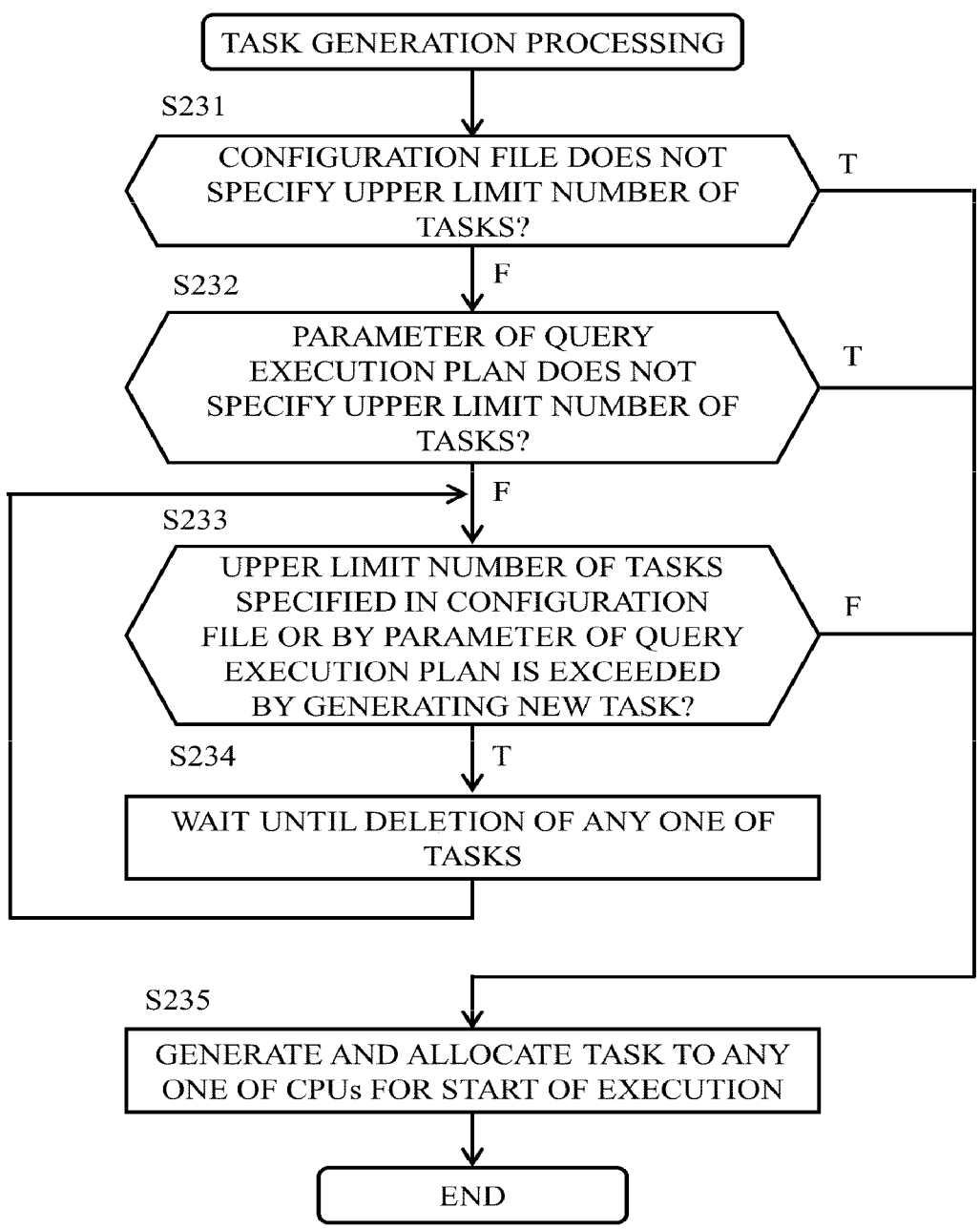
FIG. 15 is a flowchart for illustrating a procedure of task generation processing according to the first embodiment of the present invention.

The CPU 110 first selects an operation to be executed first in steps of the query execution plan (Step S211). Next, the CPU 110 executes data task drive processing of executing the selected operation (Step S212). The data task drive processing is executed after a task is generated, namely, after the task generation processing described later with reference to FIG. 15 is executed. When a task cannot be generated, execution of the data task drive processing is put on standby until a task is generatable.

In the data task drive processing, the CPU 110 first acquires new data necessary for execution of the operation (Step S221). The new data is acquired through transmission of an instruction for input/output of data to the external storage apparatus 200.

Next, the CPU 110 executes processing (operation) such as processing or aggregation of data based on the result of input/output of data (Step S222). Then, the CPU 110 determines whether or not the executed operation has a subsequent operation (Step S223). The subsequent operation is determined to be present, for example, when new data is acquired in order to execute the next operation based on the data acquired by the preceding operation.

When there is a subsequent operation ("T" as a result of Step S223), the CPU 110 executes the data task drive processing of executing the subsequent operation (Step S224). In this manner, the data task drive processing is called recursively in order to process the subsequent operation.

When execution of the data task drive processing of processing the subsequent operation is finished, or there is no subsequent operation ("F" as a result of Step S223), the CPU 110 determines whether or not the operation being executed has data necessary to be acquired additionally (Step S225). When there is data necessary to be acquired ("T" as a result of Step S225), the CPU 110 executes the data task drive processing again. On the contrary, when there is no data necessary to be acquired ("F" as a result of Step S225), the CPU 110 finishes the processing.

Next, a description is given of the task generation processing of generating a task for executing the data task drive processing. FIG. 15 is a flowchart for illustrating a procedure of the task generation processing according to the first embodiment of the present invention.

The CPU 110 first determines whether or not the configuration file does not specify the upper limit number of tasks to be generated (Step S231). When the configuration file does not specify the upper limit number of tasks ("T" as a result of Step S231), there is no limitation on the number of tasks to be generated. Thus, a new task is generated and allocated to any one of the CPUs 110 to start execution of the generated task (Step S235).

On the contrary, when the configuration file specifies the upper limit number of tasks ("F" as a result of Step S231), the CPU 110 determines whether or not the parameter of the query execution plan does not specify the upper limit number of tasks (Step S232). When the parameter of the query execution plan does not specify the upper limit number of tasks ("T" as a result of Step S232), a new task is generated and allocated to any one of the CPUs 110 to start execution of the generated task (Step S235).

Further, when the parameter of the query execution plan specifies the upper limit number of tasks ("F" as a result of Step S232), the CPU 110 determines whether or not the upper limit number of tasks specified in the configuration file or by the parameter of the query execution plan is exceeded by generating a new task (Step S233). When the upper limit number of tasks is exceeded ("T" as a result of Step S233), completion and deletion of a task being executed is put on standby (Step S234). On the contrary, when the upper limit number of tasks is not exceeded ("F" as a result of Step S233), a new task is generated and allocated to any one of the CPUs 110 to start execution of the generated task (Step S235).

Figure 16:
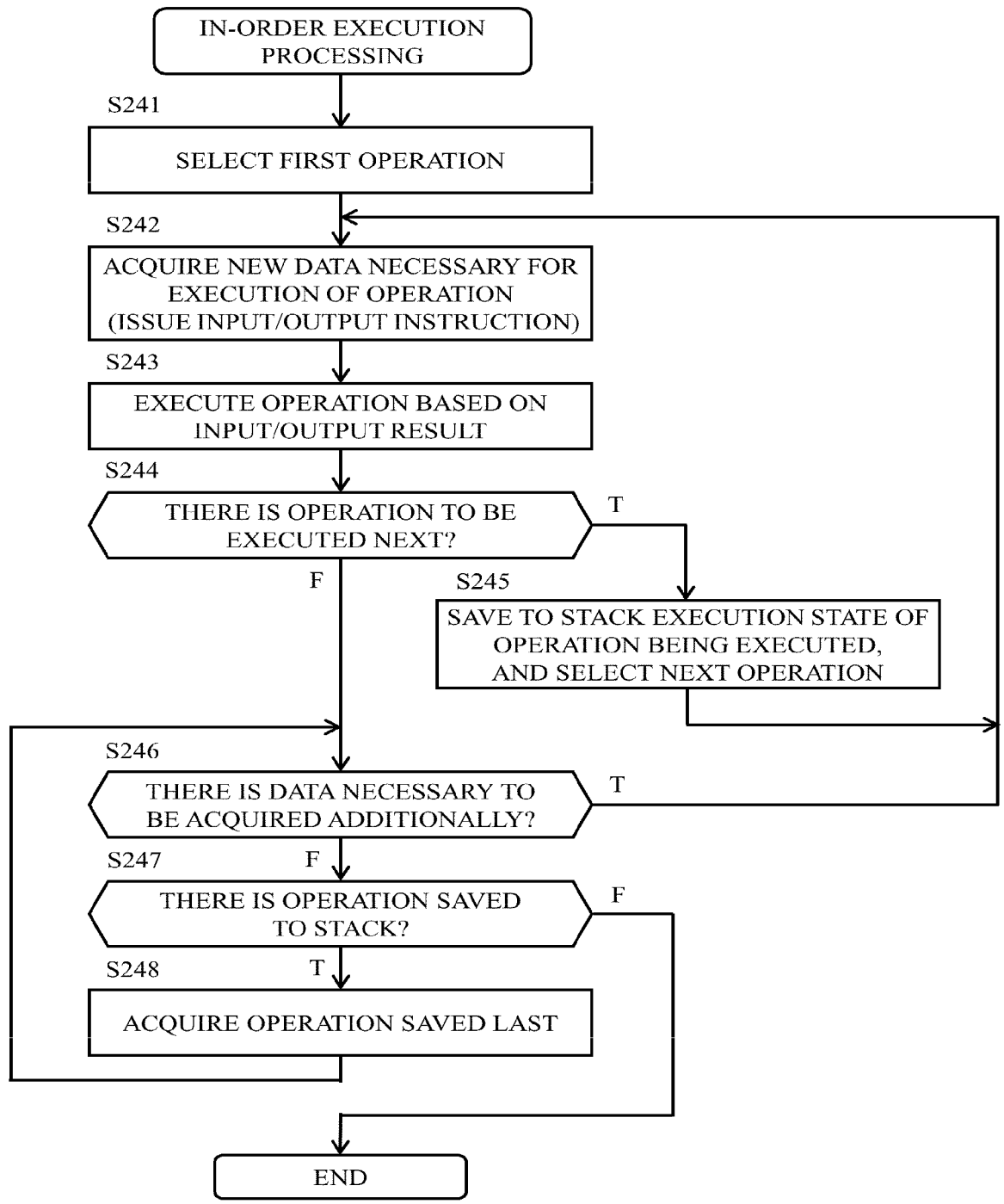
FIG. 16 is a flowchart for illustrating a procedure of in-order execution processing according to the first embodiment of the present invention.

Next, a description is given of a method of accessing data in in-order execution in steps of the query execution plan. The in-order execution involves sequentially executing respective operations, saving to a stack an execution state of an operation being executed when there is a subsequent operation, and executing the subsequent operation. Then, when execution of the subsequent operation is complete, the operation saved to the stack is resumed. When there is no subsequent operation or an operation saved to the stack, execution of the query is complete. FIG. 16 is a flowchart for illustrating a procedure of the in-order execution processing according to the first embodiment of the present invention.

The CPU 110 first selects an operation to be executed first in steps of the query execution plan (Step S241). Then, the CPU 110 acquires new data necessary for execution of the selected operation (Step S242). The new data is acquired by transmitting an input/output instruction for data to the external storage apparatus 200.

Next, the CPU 110 executes an operation based on the result of input/output of data (Step S243). Further, the CPU 110 determines whether or not the operation being executed has a subsequent operation (Step S244).

When there is a subsequent operation ("T" as a result of Step S244), the CPU 110 saves to the stack the execution state of the operation being executed, and selects the subsequent operation (Step S245). Then, the CPU 110 acquires new data necessary for execution of the selected operation (Step S242).

On the contrary, when there is no subsequent operation ("F" as a result of Step S244), the CPU 110 determines whether or not the operation being executed has data necessary to be acquired additionally (Step S246). When there is data necessary to be acquired ("T" as a result of Step S204), the CPU 110 acquires new data (Step S242).

When there is no data necessary to be acquired ("F" as a result of Step S204), the CPU 110 determines whether or not there is an operation saved to the stack (Step S247). When there is an operation saved to the stack ("T" as a result of Step S247), the CPU 110 acquires an operation saved last (Step S248), determines whether or not there is data necessary to be acquired additionally (Step S246), and executes processing onward. When there is no operation saved to the stack ("F" as a result of Step S247), the CPU 110 finishes the processing.

Figure 17:
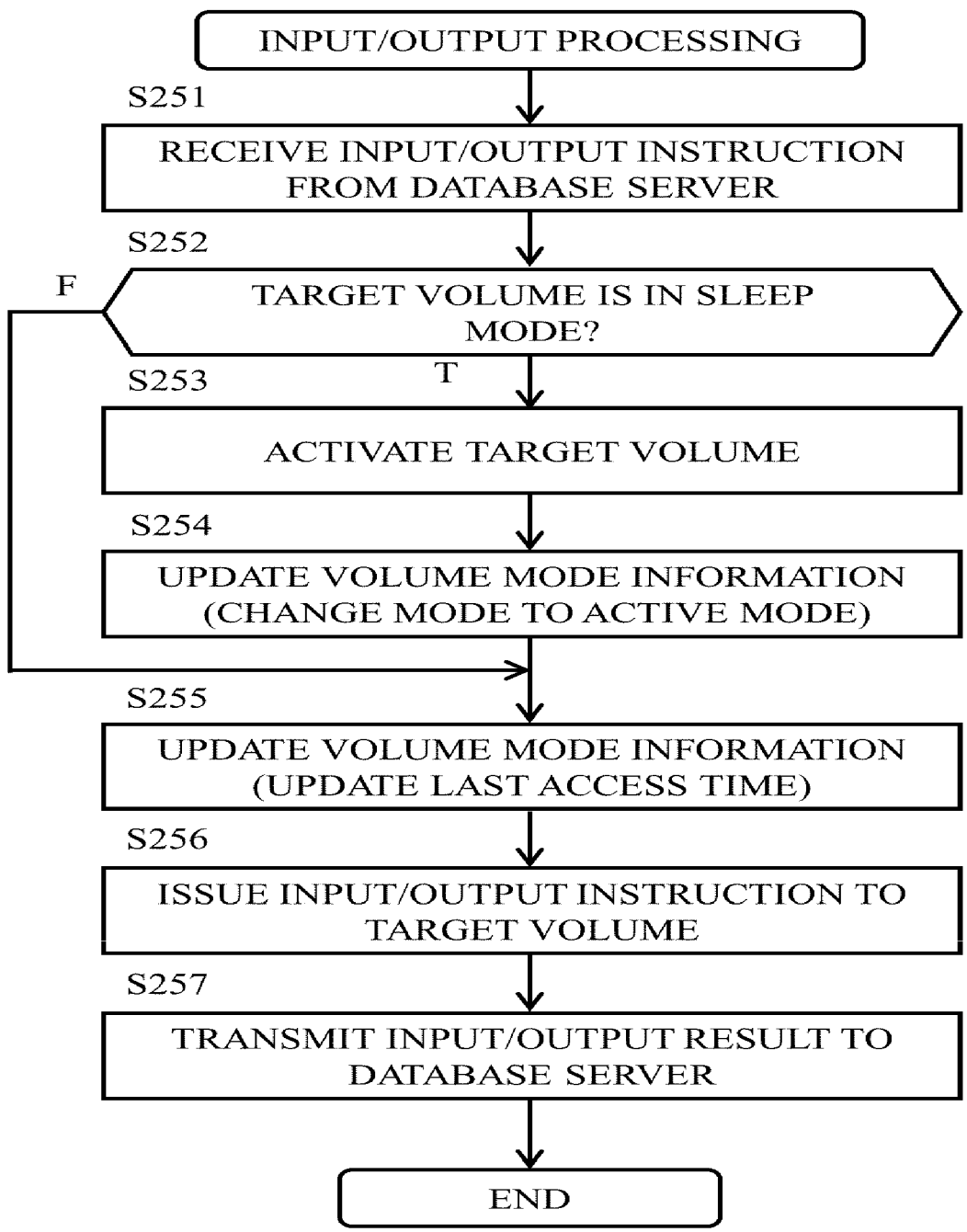
FIG. 17 is a flowchart for illustrating a procedure of input/output processing according to the first embodiment of the present invention.

This concludes the description of a procedure of acquiring data from the external storage apparatus 200 by the query execution module 153. Next, a description is given of input/output processing to be executed when the external storage apparatus 200 receives an input/output instruction. FIG. 17 is a flowchart for illustrating a procedure of the input/output processing according to the first embodiment of the present invention. The input/output processing is executed by the input/output processing module 211 included in the control unit 210 of the external storage apparatus 200.

When the control unit 210 receives an input/output instruction from the database server 100 (Step S251), the control unit 210 refers to an electric power mode 2132 of the volume mode information 213 to determine whether or not a volume for which data is to be input/output is in the sleep mode (Step S252). The volume mode information 213 stores information representing a mode of each volume provided by the storage apparatus group 280. In the following, a description is given of the volume mode information 213 with reference to FIG. 18.

Figure 18:
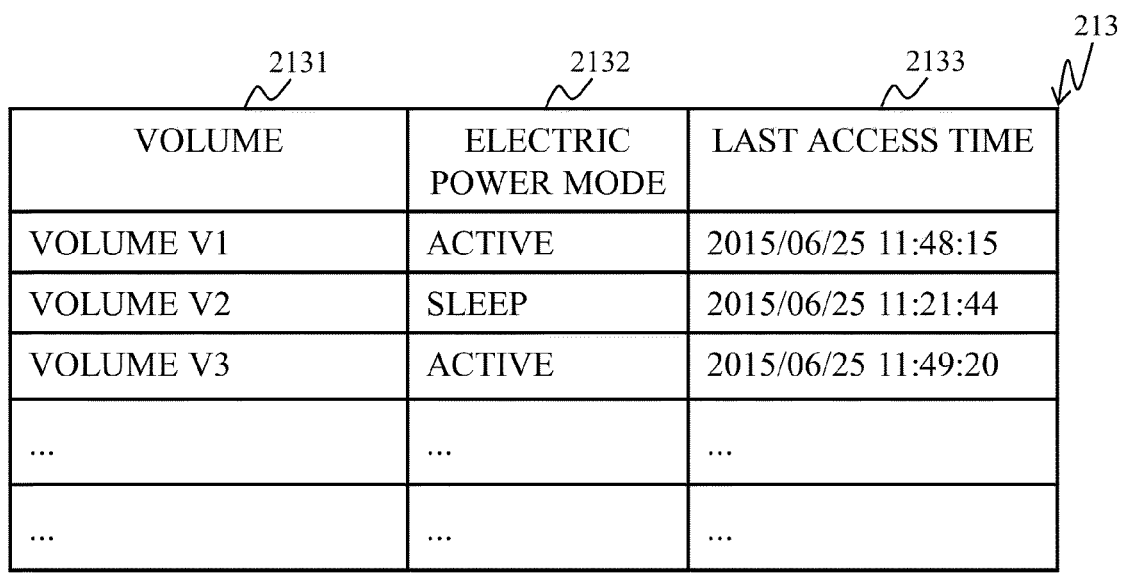
FIG. 18 is a table for showing an example of volume mode information according to the first embodiment of the present invention.

FIG. 18 is a table for showing an example of the volume mode information 213 according to the first embodiment of the present invention. The volume mode information 213 contains a volume 2131, the electric power mode 2132, and a last access time 2133. The volume 2131 stores identification information on each volume. The electric power mode 2132 represents a mode of each volume. Specifically, the mode is an active mode in which stored data can be accessed immediately with normal power consumption, or a sleep mode in which rotation of the disk drive is stopped or the disk drive is rotating at a low speed to reduce the power consumption. The last access time 2133 is a time at which the relevant volume is accessed last. In the first embodiment, the active mode and the sleep mode are controlled to be switched under a predetermined condition by electric power control processing described later with reference to FIG. 19.

Referring back to the description of the input/output processing of FIG. 17, when a volume for which data is to be input/output is in the sleep mode ("T" as a result of Step S252), the control unit 210 activates the target volume (Step S253), and updates the volume mode information 213 (Step S254). Specifically, the control unit 210 changes the electric power mode 2132 of the target volume in the volume mode information 213 to the active mode.

When the volume for which data is to be input/output is in the active mode, the control unit 210 updates the last access time 2133 of the target volume in the volume mode information 213 (Step S255). After that, the control unit 210 issues an input/output instruction to the target volume (Step S256), and transmits the input/output result to the database server 100 (Step S257).

Figure 19:
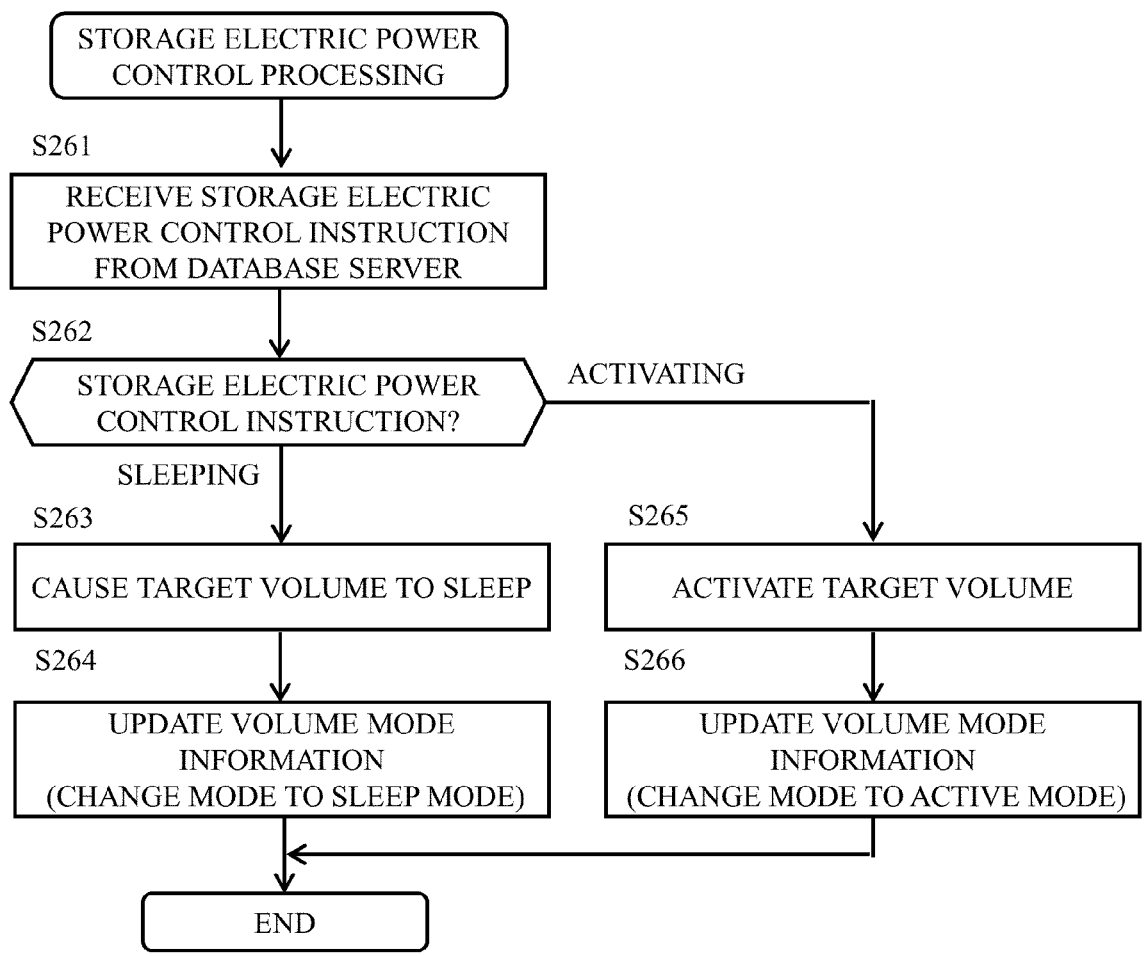
FIG. 19 is a flowchart for illustrating a procedure of electric power control processing according to the first embodiment of the present invention.

Next, a description is given of the electric power control processing to be executed when the external storage apparatus 200 has received an electric power control instruction. FIG. 19 is a flowchart for illustrating a procedure of the electric power control processing according to the first embodiment of the present invention. The electric power control processing is executed by the storage electric power control module 212 included in the control unit 210 of the external storage apparatus 200.

When the control unit 210 receives an electric power control instruction from the database server 100 (Step S261), the control unit 210 determines the type of the received electric power control instruction (Step S262), and changes processing in accordance with the type of the electric power control instruction.

When the received electric power control instruction indicates "sleeping", the control unit 210 causes the target volume to sleep (Step S263). Further, the control unit 210 updates the volume mode information 213 (Step S264). Specifically, the control unit 210 changes the electric power mode 2132 of the target volume in the volume mode information 213 to the sleep mode.

On the contrary, when the received electric power control instruction indicates "activating", the control unit 210 activates the target volume (Step S265). Further, the control unit 210 updates the volume mode information 213 (Step S266). Specifically, the control unit 210 changes the electric power mode 2132 of the target volume in the volume mode information 213 to the active mode.

Figure 20:
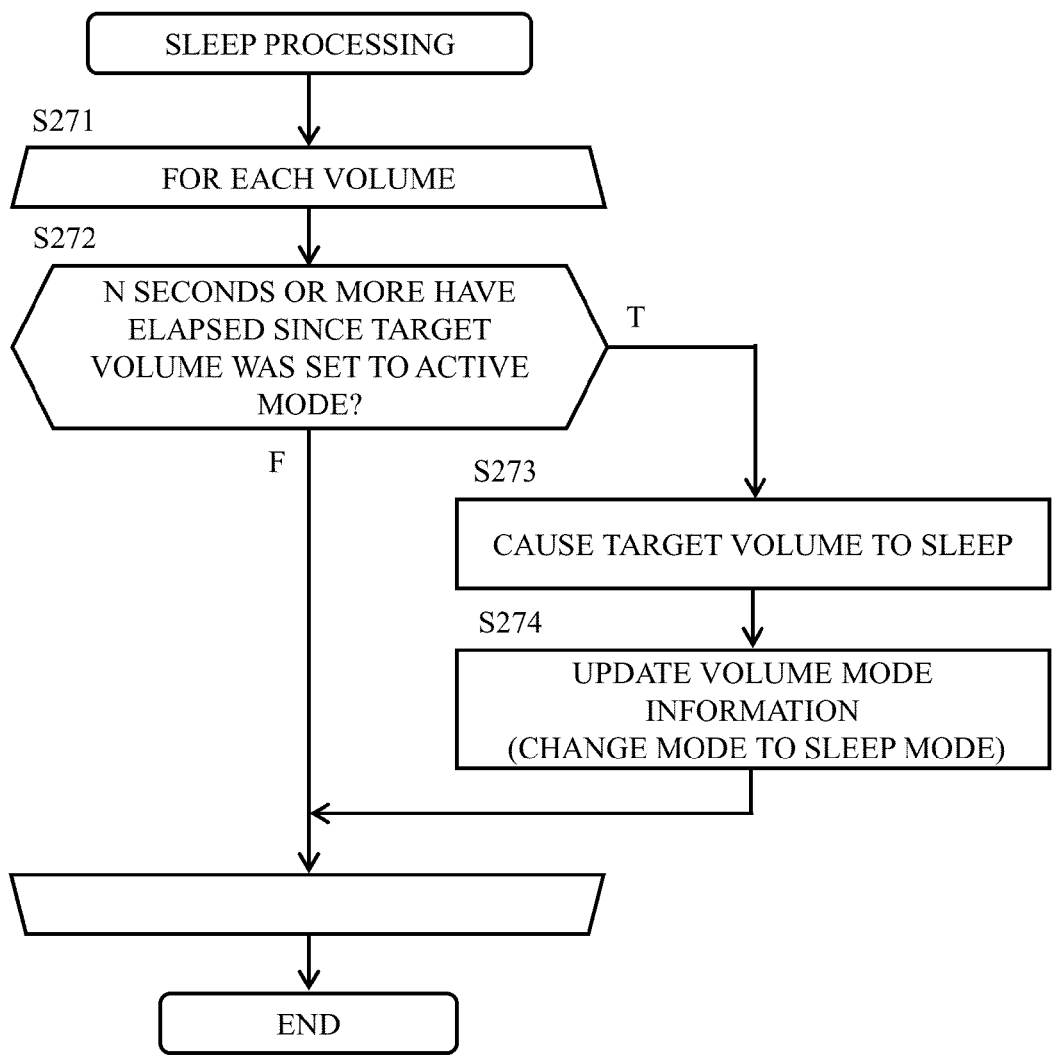
FIG. 20 is a flowchart for illustrating a procedure of sleep processing according to the first embodiment of the present invention.

Next, a description is given of sleep processing of causing a volume that is not accessed for a predetermined period of time to sleep, which is performed by the external storage apparatus 200. FIG. 20 is a flowchart for illustrating a procedure of the sleep processing according to the first embodiment of the present invention. The sleep processing is executed by the storage electric power control module 212 included in the control unit 210 of the external storage apparatus 200 at a predetermined timing. The predetermined timing is, for example, after a predetermined period of time has elapsed since the target volume is accessed last, or at fixed time intervals.

The control unit 210 executes the following processing for each volume (Step S271). First, the control unit 210 determines whether or not N seconds or more have elapsed since the target volume was set to the active mode (since the target volume was accessed last) (Step S272). When the target volume is not in the active mode, or when N seconds or more have not elapsed since the target volume was set to the active mode ("F" as a result of Step S262), another volume is set as a target.

On the contrary, when N seconds or more have elapsed since the target volume was set to the active mode ("T" as a result of Step S272), the control unit 210 causes the target volume to sleep (Step S273). Further, the control unit 210 updates the volume mode information 213 (Step S274). Specifically, the control unit 210 changes the electric power mode 2132 of the target volume in the volume mode information 213 to the sleep mode.

Figure 21:
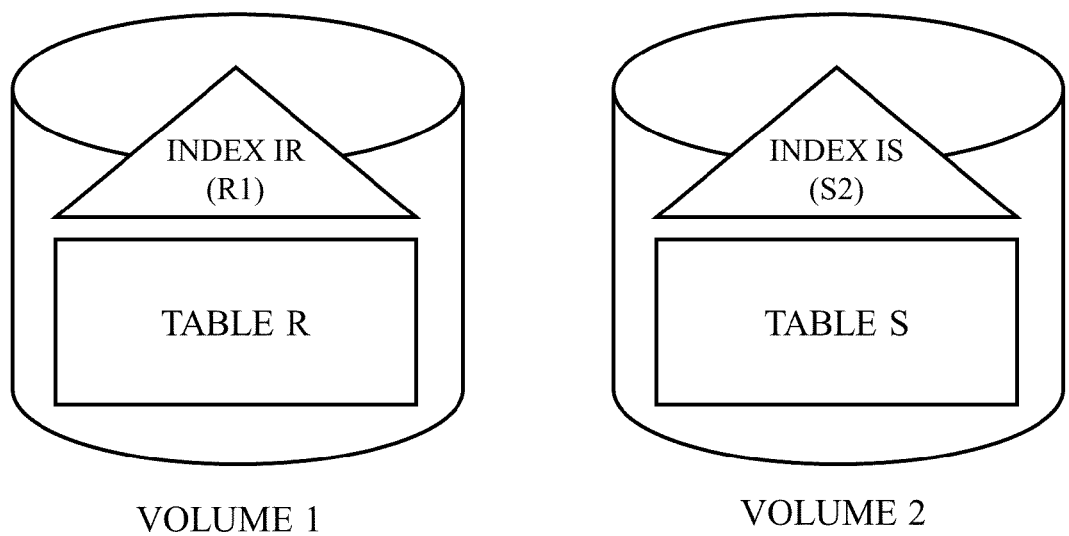
FIG. 21 is a diagram for illustrating a configuration of a volume storing a table and an index of a database according to the first embodiment of the present invention.

This concludes the configuration and control according to the first embodiment of the present invention. Now, a description is given of an application example of the first embodiment of the present invention with reference to FIG. 21 to FIG. 30. First, a configuration of a database to which the first embodiment of the present invention is applied is described. FIG. 21 and FIG. 22 are each a diagram for illustrating the configuration of a database according to the first embodiment of the present invention. FIG. 21 is a diagram for illustrating a configuration of a volume that stores a table and an index, and FIG. 22 are each a diagram for illustrating a configuration of each table.

As illustrated in FIG. 21, a volume 1 and a volume 2 are provided by the external storage apparatus 200. The volume 1 stores a table R and an index IR. Further, the volume 2 stores a table S and an index IS.

Figure 22A:
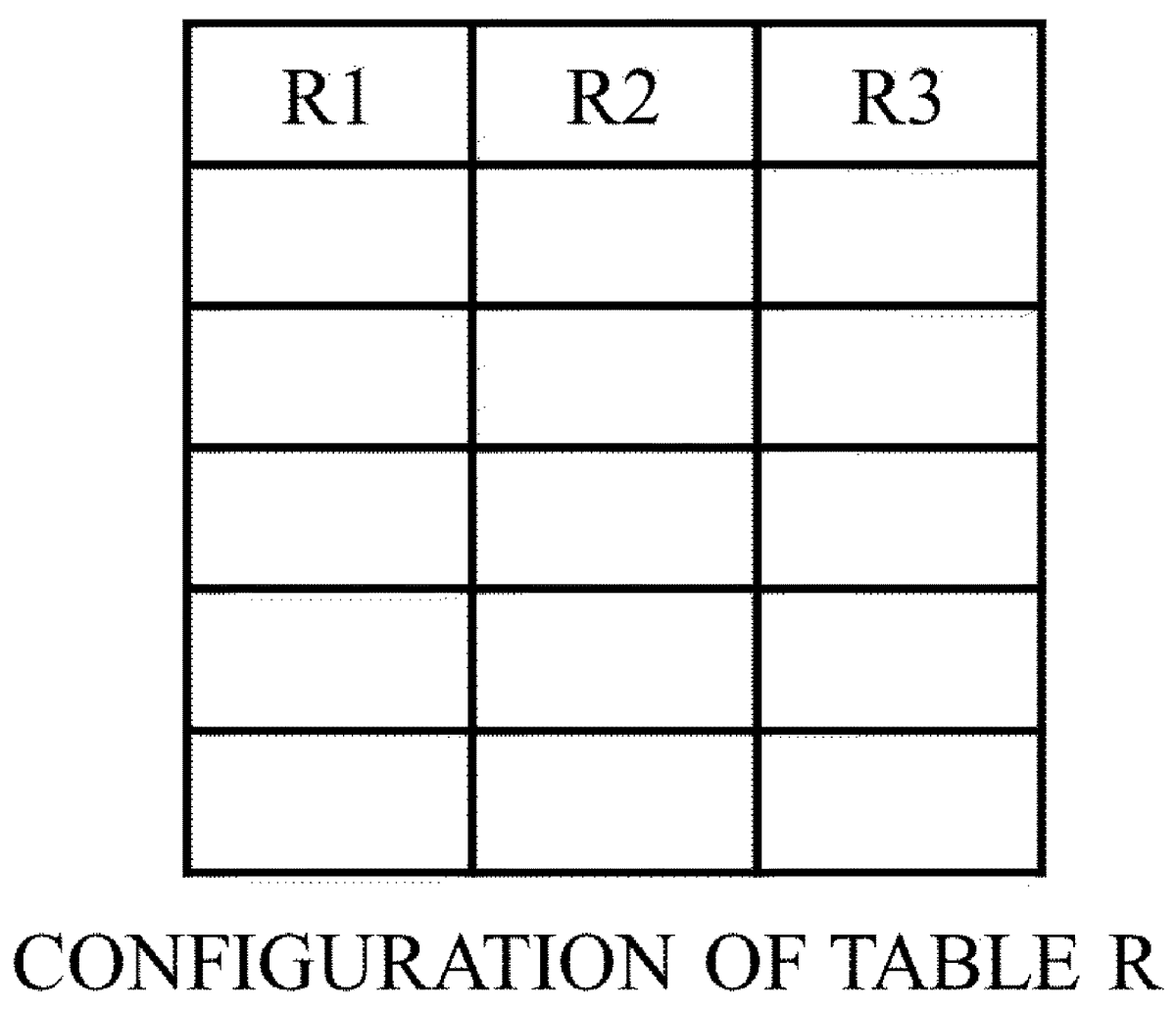

As illustrated in FIG. 22(A), the table R is formed of fields R1, R2, and R3. Further, the index IR is created for the field R1. Further, the record length and the number of records of the table R are 100 B (bytes) and 1,000,000,000 (1 G), respectively. The table length (size) of the table R is 100 GB.

Figure 22B:
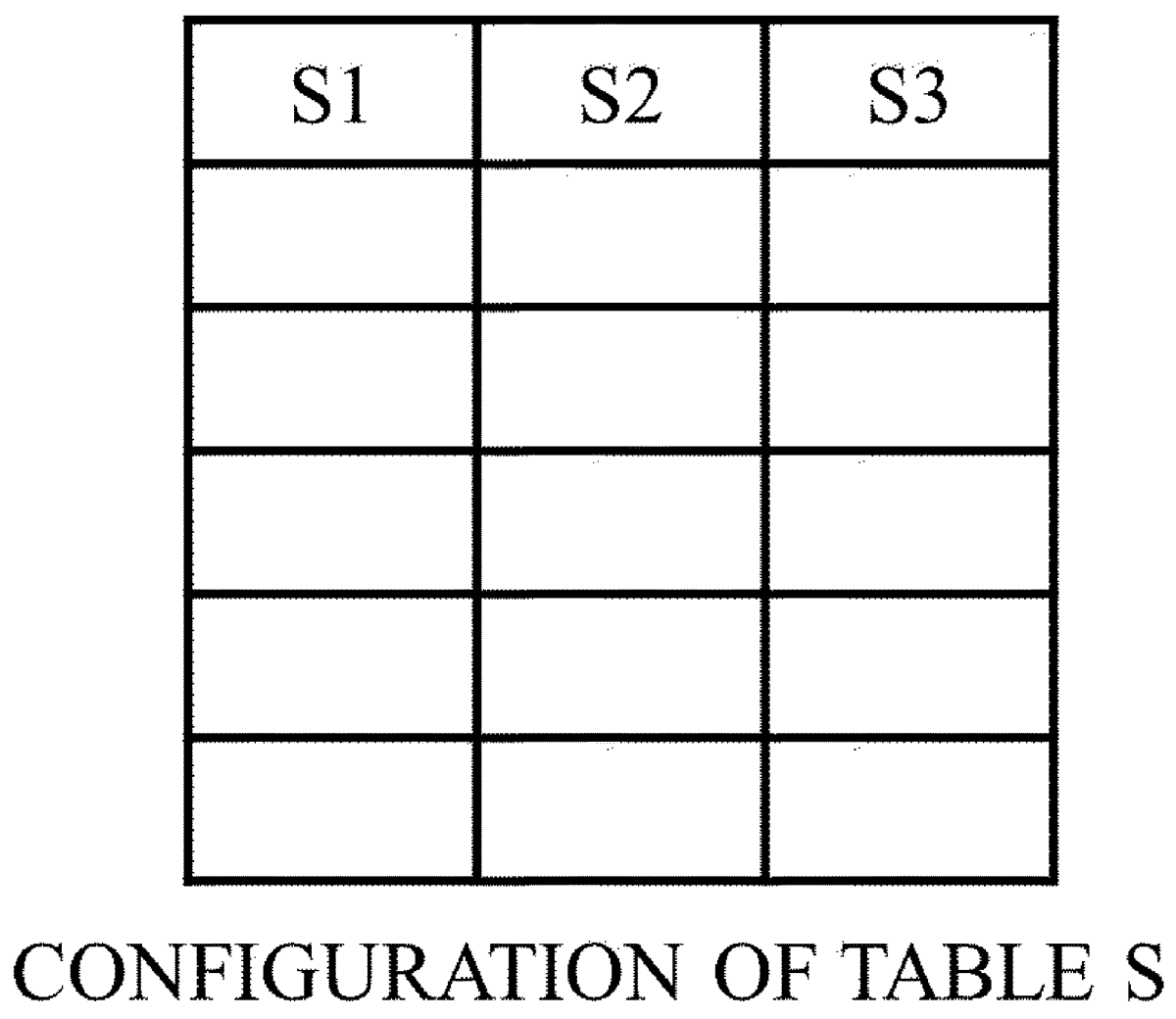

On the other hand, as illustrated in FIG. 22(B), the table S is formed of fields S1, S2, and S3. Further, the index IS is created for the field S2. Further, the record length of the table S is 100 B (bytes), and the number of records is 100,000,000,000 (100 G). The table length (size) of the table S is 10 TB.

Further, the table R and the table S can be joined to each other with the field R2 and the field S2 serving as a join key, and the value stored in the field R2 always exists in the field S2. The join ratio is 100, which means that 100 records of the table S can be joined to one record of the table R.

Next, a description is given of the storage electric power characteristics information 215 of the external storage apparatus 200 according to the first embodiment of the present invention. FIG. 23 is a diagram for illustrating the storage electric power characteristics information 215 of the external storage apparatus 200 according to the first embodiment of the present invention. In the first embodiment, the volume 1 and the volume 2 have the same performance. Now, a description is given of performance characteristics relating to access performance and electric power characteristics relating to power consumption.

The performance characteristics mainly indicate speeds for inputting/outputting data to/from (making I/O access to) the volume. Further, the performance characteristics contain sequential access performance at the time of sequential access to data stored in the volume, and random access performance at the time of random access to the stored data. Sequential access to each volume in the first embodiment achieves input/output of 100 MB data per second (100 MB/s).

On the other hand, random access to each volume in the first embodiment achieves a maximum of 10,000 inputs/outputs per second (10,000 IOPS). In the case of random access, a period of time required for 1 input/output is obtained by adding an average access time to a data transfer time. Further, the random access performance changes depending on the multiplicity. The multiplicity in this case refers to the number of concurrent accesses to the volume. As illustrated in FIG. 23, as the multiplicity becomes larger, the throughput (random access performance) also becomes larger. When the multiplicity is 1 (the number of concurrent accesses is 1), the throughput is 100 IOPS, while when the multiplicity is 100 or more, the throughput is 10,000 IOPS. In other words, the external storage apparatus 200 can process 100 inputs/outputs concurrently for each volume in parallel.

Next, a description is given of the electric power characteristics. As described above, there are two types of electric power modes for each volume, namely, the active mode in which data can be input/output to/from each volume, and the sleep mode in which rotation of the disk is stopped or the disk is rotating at a low speed.

The power consumption of when there is no input/output under the active mode is 100 W. Further, the power consumption of when sequential access is made is 200 W. The power consumption of when random access is made is between 100 W and 200 W, which depends on the multiplicity. Specifically, when the multiplicity is represented by x and the random access performance is represented by f (x), power consumption of g (x)=100 W+(200 W−100 W)×f (x)÷10,000 IOPS is obtained. That is, a larger multiplicity results in larger power consumption. On the other hand, the power consumption at the time of sleeping is 10 W.

Further, a period of time for transferring to the sleep mode from the active mode is 10 seconds, and 500 joules (J) of energy is required for that period. In this case, the average power is 50 W. Similarly, the period of time for transferring to the active mode from the sleep mode is 10 seconds, and 500 joules (J) of energy is required (50 W on average).

Next, a description is given of a procedure of measuring the performance of the external storage apparatus 200 and its specific example with reference to FIG. 24 to FIG. 30. First, a description is given of a query for measuring the performance at the time of execution. FIG. 24 are each a diagram for illustrating an example of a query for acquiring data from the external storage apparatus 200, which is executed by the database server 100 according to the first embodiment of the present invention. In the first embodiment, the query is represented by SQL, and two types of queries for joining the table R to the table S are shown.

The query 1 illustrated in FIG. 24(A) acquires values of the field R1 of the table R and the field S3 of the table S for records whose field R2 of the table R and field S2 of the table S are the same as each other. At this time, the query 1 acquires a record that satisfies a conditional expression specifying that the value of the field R1 of the table R lies between x1 and y1. The selection ratio of a record satisfying the conditional expression is assumed to be 0.1%.

A query 2 illustrated in FIG. 24(B) acquires, unlike the query 1, values of the field R1 of the table R and the field S3 of the table S for all the records whose field R2 of the table R and field S2 of the table S are the same as each other.

First, the query 1 is described. In this description, three types of query execution plans are created, and costs related to the execution time and power consumption are calculated, to select an optimal query execution plan. Specifically, the three types of query execution plans to be created use hash join, index join (in-order execution), and index join (out-of-order execution). In the following, each query execution plan is described.

Figures 25A, 25B:
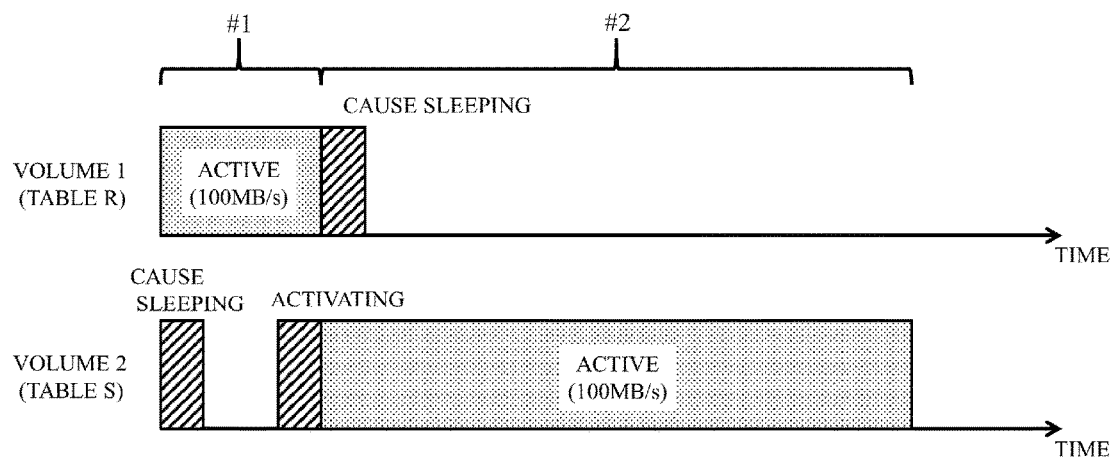
FIG. 25(A) is a diagram for illustrating a query execution plan 1 for processing a query 1 by hash join according to the first embodiment of the present invention, illustrating specifics of the query execution plan 1.
FIG. 25(B) is a diagram for illustrating a query execution plan 1 for processing a query 1 by hash join according to the first embodiment of the present invention, illustrating a mode of each volume in chorological order.

FIG. 25 are each a diagram for illustrating a query execution plan 1 for processing the query 1 by hash join according to the first embodiment of the present invention. FIG. 25(A) is a diagram for illustrating specifics of the query execution plan 1, and FIG. 25(B) is a diagram for illustrating a mode of each volume in chronological order.

In the query execution plan 1 using hash join, as illustrated in FIG. 25(A), the table R is first scanned to create a hash table (Step #1). At this time, as illustrated in FIG. 25(B), the table S (volume 2) is caused to sleep after the start of Step #1, and the table S (volume 2) is activated before the end of Step #1. Next, the table S is scanned and the hash table is probed to output a result (#2). At this time, as illustrated in FIG. 25(B), the table R (volume 1) is caused to sleep after the start of Step #2.

Next, performance of when a query result is acquired with the query execution plan 1 is calculated. First, the execution time is calculated. As described above, the size of the table R is 100 GB and the reading speed is 100 MB/S, and thus an execution time T1 of Step #1 is 100 GB÷100 MB/S=1, 000 seconds. On the other hand, the size of the table S is 10 TB and the reading speed is 100 MB/S, and thus an execution time T2 of Step #2 is 10 TB÷100 MB/S=100,000 seconds. Therefore, the execution time of the query execution plan 1 is 1,000 seconds+100,000 seconds=101,000 seconds.

Next, the power consumption amount is calculated. The power consumption is calculated for each volume at each step. The power consumption amount of the volume 1 in Step #1 is measured for power consumption during access to the table R, and as described above, the execution time T1 is 1,000 seconds and 200 W of power is consumed per second in the active mode. Therefore, 1,000 seconds×200 W=200,000 J is obtained.

On the other hand, the power consumption amount of the volume 2 in Step #1 is measured for power consumption (500 J, 10 seconds) for causing the volume 2 to sleep, power consumption (500 J, 10 seconds) for activating the sleeping volume 2 to execute Step #2, and power consumption while the volume 2 is sleeping. Duration of the sleep mode is 1,000 seconds (=T1)−10 seconds−10 seconds, and 10 W of power is consumed per second in the sleep mode. Thus, the power consumption during the sleep mode is 980 seconds×10 W=9,800 J. Therefore, the power consumption amount of the volume 2 in Step #1 is 500 J+500 J+9,800 J=10,800 J.

In conclusion, the power consumption amount in Step #1 J1=200,000 J+10,800 J=210,800 J is obtained.

Next, the power consumption amount of the volume 1 in Step #2 is measured for power consumption (500 J, 10 seconds) for causing the volume 1 to sleep, and power consumption while the volume 1 is waiting in the sleep mode until Step #2 is finished. Duration of the sleep mode is 100,000 seconds(=T2)−10 seconds, and thus the power consumption during the sleep mode is 99,990 seconds×10 W=999, 900 J. Therefore, the power consumption amount of the volume 1 in Step #2 is 500 J+999,900 J=1,000,400 J.

On the other hand, the power consumption amount of the volume 2 in Step #2 is measured for power consumption during access to the table S, and as described above, the execution time T2 is 100,000 seconds. Therefore, 100,000 seconds×200 W=20,000,000 J is obtained.

In conclusion, the power consumption amount in Step #2 is J2=1,000,400 J+20,000,000 J=21,000,400 J. Therefore, the power consumption of the query execution plan 1 is 21,211,200 J, which is a sum of power consumption in Step #1 and Step #2.

Next, the maximum power consumption is calculated. The maximum power consumption of the volume 1 in Step #1 is achieved in the active mode, and thus 200 W is obtained. Further, the maximum power consumption of the volume 2 is achieved when the volume 2 is caused to sleep, when the volume 2 is activated, or when the volume 2 is in the sleep mode, and thus 50 W is obtained. Therefore, the maximum power consumption P1 in Step #1 is 200 W+50 W=250 W.

On the other hand, the maximum power consumption of the volume 1 in Step #2 is achieved when the volume 1 is caused to sleep, or when the volume 1 is in the sleep mode, and thus 50 W is obtained. Further, the maximum power consumption of the volume 2 is achieved in the active mode, and thus 200 W is obtained. Therefore, the maximum power consumption P2 in Step #2 is 50 W+200 W=250 W.

In conclusion, the maximum power consumption of the query execution plan 1 is the maximum value of maximum power consumption of each step, and thus is 250 W.

Figures 26A, 26B:
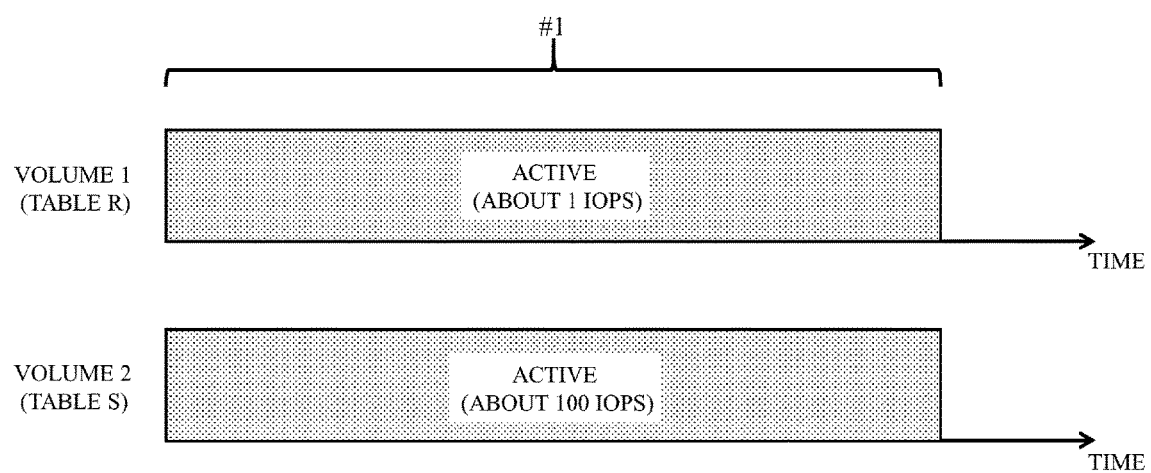
FIG. 26(A) is a diagram for illustrating a query execution plan 2 for processing the query 1 by index join (in-order execution) according to the first embodiment of the present invention, illustrating specifics of the query execution plan 2.
FIG. 26(B) is a diagram for illustrating a query execution plan 2 for processing the query 1 by index join (in-order execution) according to the first embodiment of the present invention, illustrating the mode of each volume in chorological order.

FIG. 26 are each a diagram for illustrating a query execution plan 2 for processing the query 1 by index join (in-order execution) according to the first embodiment of the present invention. FIG. 26(A) is a diagram for illustrating specifics of the query execution plan 2, and FIG. 26(B) is a diagram for illustrating a mode of each volume in chorological order.

In the query execution plan 2 using index join, as illustrated in FIG. 26(A), the table R is scanned while the index IS is referred to to probe the table S, to thereby output a result (#1).

Next, performance of when a query result is acquired with the query execution plan 2 is calculated. First, the execution time is calculated. The index is created for the field R1, and the selection ratio is 0.1%. Thus, 0.1% of all the records (the number of records: 1 G) of the table R is acquired. At this time, records (field S3) are acquired from the table S using the index IS based on the field R2 contained in the records acquired from the table R. Thus, random access is made to 0.1% of all the records (the number of records: 1 G) of the table R, and after that, random access is made to 0.1% of all the records (the number of records: 100 G) of the table S. Therefore, periods of time for accessing the volume 1 and the volume 2 are almost the same. Therefore, the execution time T1 of Step #1 is (1 G×0.1%÷100 IOPS)+(100 G×0.1%÷100 IOPS)=1,010,000 seconds.

Next, the power consumption amount is calculated. As described above, the periods of time for accessing the volume 1 and the volume 2 are almost the same, and thus the speed of accessing the volume 2 is 100 times faster than the speed of accessing the volume 1 in consideration of the number of records. When the speed of accessing the volume 1 is 1 IOPS, the speed of accessing the volume 2 is 100 IOPS. Further, the maximum value of the random access performance is 10,000 IOPS, whereas the volume 1 (table R) is accessed at 1 IOPS. Thus, it can be considered that there is no load on the volume 1 in the active mode, which means that the power consumption is 100 W. Further, the volume 2 is accessed at 100 IOPS(=f(x)), and thus the power consumption is 100 W+(200 W−100 W)÷10,000 IOPS=101 W. Therefore, the power consumption amount J1 is 100 W×1,010,000 seconds+101 W×1,010,000 seconds=203,010,000 J.

Next, the maximum power consumption is calculated. As described above, while the query is executed, the power consumption of the volume 1 is 100 W and the power consumption of the volume 2 is 101 W. The maximum power consumption of the query execution plan 2 is the maximum value of total power consumption of the volumes, and therefore is 100+101=201 W.

Figures 27A, 27B:
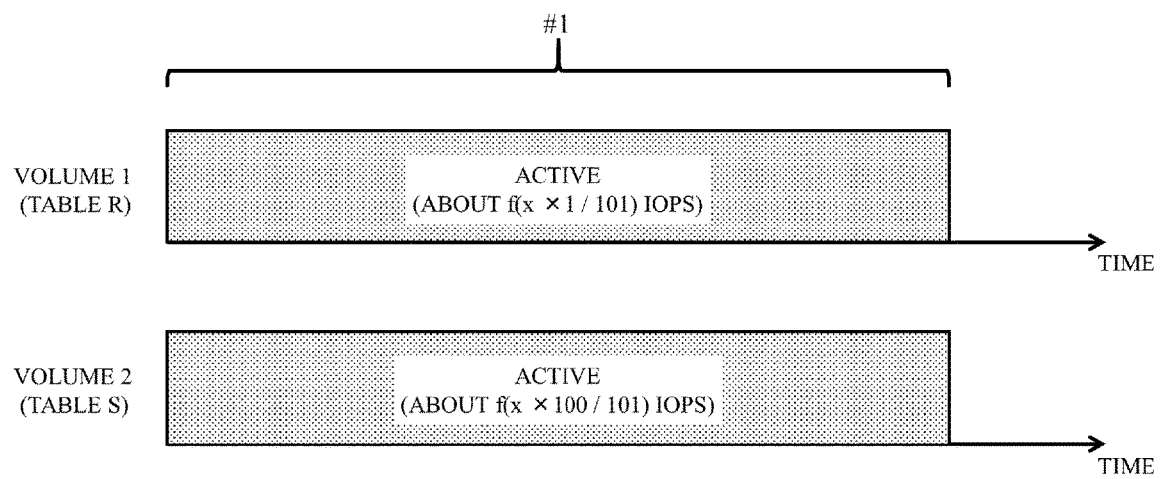
FIG. 27(A) is a diagram for illustrating a query execution plan 3 for processing the query 1 by index join (out-of-order execution) according to the first embodiment of the present invention, illustrating specifics of the query execution plan 3.
FIG. 27(B) is a diagram for illustrating a query execution plan 3 for processing the query 1 by index join (out-of-order execution) according to the first embodiment of the present invention, illustrating the mode of each volume in chorological order.

FIG. 27 are each a diagram for illustrating a query execution plan 3 for processing the query 1 by index join (out-of-order execution) according to the first embodiment of the present invention. FIG. 27(A) is a diagram for illustrating specifics of the query execution plan 3, and FIG. 27(B) is a diagram for illustrating a mode of each volume in chorological order.

In the query execution plan 3 using index join, also in the case of out-of-order execution, the table R is scanned while the index IS is referred to to probe the table S, to thereby output a result (#1) similarly to the case of the in-order execution.

Next, performance of when a query result is acquired with the query execution plan 3 is calculated. The multiplicity x is determined at the time of optimization of parameters, and thus each performance is calculated using the variable x. First, the execution time is calculated. Similarly to the case of in-order execution illustrated in FIG. 26, 0.1% of all the records (the number of records: 1 G) of the table R is acquired, and 0.1% of records are acquired from the table S in the same manner.

Further, the join ratio of the table S to the table R is 100, and thus when one record is read from the table R, an average of 100 records are read from the table S, which means that a total of 101 records are read. As a result, the throughput of the volume 1 is f(x×1÷101), and the throughput of the volume 2 is f (x×100÷101). Therefore, the execution time for the volume 1 is 1 G×0.1%÷f (x×1÷101) IOPS, and the execution time for the volume 2 is 100 G×0.1%÷f (x×100÷101) IOPS. Access to the volume 1 and access to the volume 2 are made in parallel, and thus the maximum value of the execution time for each volume is the entire execution time.

Next, the power consumption amount is calculated. The power consumption amount J1 is g (x×1÷101)×(execution time of volume 1)+g (x×100÷101)×(execution time of volume 2) based on the execution time for each volume described above, the join ratio of the table S to the table R, and the calculation formula g (x) of power consumption illustrated in FIG. 23.

Lastly, the maximum power consumption is calculated. In the case of out-of-order execution, access to respective volumes is made in parallel, and thus the sum of maximum power consumption of respective volumes is the entire maximum power consumption. Therefore, the maximum power consumption P1 is g(x×1÷101)+g(x×100÷101).

Results of calculating costs for the query execution plans 1 to 3 as described above are written to the query execution plan management table. FIG. 28 is a diagram for illustrating an example of a query execution plan table when a threshold value is not specified and reduction of an execution time is prioritized to process the query 1 according to the first embodiment of the present invention.

A threshold value is not set to the power consumption or other values in the case illustrated in FIG. 28, and thus a query execution plan having the shortest (entire) execution time is selected. The execution time of the query execution plan 1 is 101,000 seconds, the execution time of the query execution plan 2 is 1,010,000 seconds, and the execution time of the query execution plan 3 is 10,100 seconds, and thus the query execution plan 3 is selected. In the query execution plan 3, the multiplicity x is determined to be 100 so as to achieve the shortest execution time.

When the execution time is calculated approximately in the case of the multiplicity x being 100, the execution time for the volume 1 is 1 G×0.1%÷(10,000×1÷101) IOPS=10, 100 seconds, and the execution time for the volume 2 is 100 G×0.1%÷(10,000×100÷101) IOPS=10, 100 seconds based on the calculation formula described above. Therefore, the entire execution time T1 for the query execution plan 3 is 10,100 seconds.

Now, a description is given of a case under another condition. FIG. 29 is a diagram for illustrating an example of the query execution plan table when the threshold value for maximum power consumption is specified as 250 W and reduction of the execution time is prioritized to process the query 1 according to the first embodiment of the present invention.

Each query execution plan is the same as an example illustrated in FIG. 28. In the query execution plan 3, the multiplicity x is set such that the maximum power consumption is 250 W or less. As a result, when the multiplicity x is 50 or less, the maximum power consumption is 250 W or less. Regarding the query 1, as the multiplicity x becomes larger, the execution time becomes shorter as long as the multiplicity is 100 or less, and thus the multiplicity x is determined to be 50.

When each performance is calculated approximately in the case of the multiplicity x being 50, the execution time for the volume 1 is 1 G×0.1%÷(5,000×1÷101) IOPS=20,200 seconds, and the execution time for the volume 2 is 100 G×0.1%÷(5,000×100÷101) IOPS=20, 200 seconds based on the calculation formula described above. Therefore, the entire execution time T1 for the query execution plan 3 is 20,200 seconds. Further, the power consumption amount J1 is (250×1÷101)×20,200+(250×100÷101)×20,200=5,050,000 J. The maximum power consumption P1 is (250×1÷101)+(250×100÷101)=250 W.

Next, a description is given of a case of creating a query execution plan management table for the query 2. Similarly to the case of the query 1, three types of query execution plans are created by using hash join, index join (in-order execution), and index join (out-of-order execution). Costs related to the execution time and power consumption are calculated to select an optimal query execution plan. In the following, costs of each query execution plan are calculated.

In the query execution plan 1 using hash join, similarly to the case of the query 1, the table R is first scanned to create a hash table (Step #1). Next, the table S is scanned and the hash table is probed to output a result (#2). Transfer of modes for each volume is similar to the case of the query 1. When a query is processed based on the query execution plan using hash join, a constant execution time is determined by the size of the table without depending on the selection ratio of a record, and thus the execution time for the query execution plan 1 is 101,000 seconds, which is the same as the case of the query 1. Further, the power consumption amount and the maximum power consumption are also similar to those of the case of the query 1, and the power consumption amount and the maximum power consumption of the query execution plan 1 are 21,211,200 J and 250 W, respectively. The procedure of calculating each cost is similar to the case of the query 1.

In the query execution plan 2 using index join (in-order execution), similarly to the case of the query 1, the table R is scanned while the index IS is referred to to probe the table S, to thereby output a result (#1).

Next, performance of when a query result is acquired with the query execution plan 2 is calculated. First, the execution time is calculated. The index is created for the field R1, and the selection ratio is 100% unlike the case of the query 1. Thus, all the records are acquired from the table R (the number of records: 1 G), and records (field S3) are acquired from the table S using the index IS. Thus, random access is made to all the records (the number of records: 1 G) of the table R, and after that, random access is made to all the records (the number of records: 100 G) of the table S. Therefore, periods of time for accessing the volume 1 and the volume 2 are almost the same. Therefore, the execution time T1 of Step #1 is (1 G÷100 IOPS)+(100 G÷100 IOPS)= 1,010,000,000 seconds.

Next, the power consumption amount is calculated. The power consumption is similar to the case of the query 1, and the power consumption of the volume 1 (table R) is 100 W, and the power consumption of the volume 2 is 101 W. Therefore, the power consumption amount J1 is 100 W×1,010,000,000 seconds+101 W×1,010,000,000 seconds=203,010,000,000 J.

Next, the maximum power consumption is calculated. As described above, while a query is executed, the power consumption of the volume 1 is 100 W and the power consumption of the volume 2 is 101 W. Similarly to the case of the query 1, the maximum power consumption of the query execution plan 2 is the maximum value of total power consumption of the volumes, and therefore is 100+101=201 W.

In the query execution plan 3 using index join, also in the case of out-of-order execution, the table R is scanned while the index IS is referred to to probe the table S, to thereby output a result (#1) similarly to the case of in-order execution. Further, similarly to the case of the query 1, the multiplicity x is determined at the time of optimization of parameters, and thus each performance is calculated using the variable x.

Similarly to the case of the query execution plan 2, the execution time is determined based on the fact that all the records are acquired from the table R, all the records are also acquired from the table S, and the throughput of each volume is the same as the case of the query 1. Therefore, the execution time of the volume 1 is 1 G÷f(x×1÷101) IOPS, and the execution time of the volume 2 is 100 G÷f(x× 100÷101) IOPS. The maximum value of the execution time for each volume is the entire execution time.

Similarly to the case of the query 1, the power consumption amount J1 is g(x×1÷101)×(execution time of volume 1)+g (x×100÷101)×(execution time of volume 2). Further, the maximum power consumption P1 is g(x×1÷101)+g(x× 100÷101).

Results of calculating costs for the query execution plans 1 to 3 as described above are written to the query execution plan management table. FIG. 30 is a diagram for illustrating an example of the query execution plan table when the threshold value is not specified and reduction of the execution time is prioritized to process the query 2 according to the first embodiment of the present invention. In this case, a query execution plan having the shortest (entire) execution time is selected. The execution time of the query execution plan 1 is 101,000 seconds, the execution time of the query execution plan 2 is 1,010,000,000 seconds, and the execution time of the query execution plan 3 is 10,100,000 seconds. Thus, the query execution plan 1 is selected. In the query execution plan 3, the multiplicity x is determined to be 100 so as to achieve the shortest execution time.

As described above, it is possible to adjust the power consumption amount through control by the database management system 150 in the computer system 10 according to the first embodiment of the present invention. Therefore, it is possible to suppress an increase in running cost accompanied by power consumption because the power consumption amount can be adjusted through control by software without necessitating a massive investment in hardware.

Further, in the computer system 10 according to the first embodiment of the present invention, it is possible to suppress the maximum power consumption amount, and thus to prevent instability of power supply that is caused when power consumption surpasses the upper limit usable amount of electric power instantaneously.

Further, in the computer system 10 according to the first embodiment of the present invention, it is possible to average the amount of used electric power by setting a threshold value for the power consumption amount on a time basis. For example, in the daytime when a large amount of electric power is used, the power consumption amount can be suppressed, while in the nighttime when a small amount of electric power is used, the power consumption amount can be made large. With this, it is possible to flexibly deal with a change in power consumption amount due to external factors such as temperature or weather.

Second Embodiment

In the first embodiment of the present invention, the execution cost, for example, the power consumption, is calculated based on the electric power characteristics information on the external storage apparatus 200. In a second embodiment of the present invention, an example of calculating the execution cost in consideration of the power consumption of the database server 100 is described.

Figure 31:
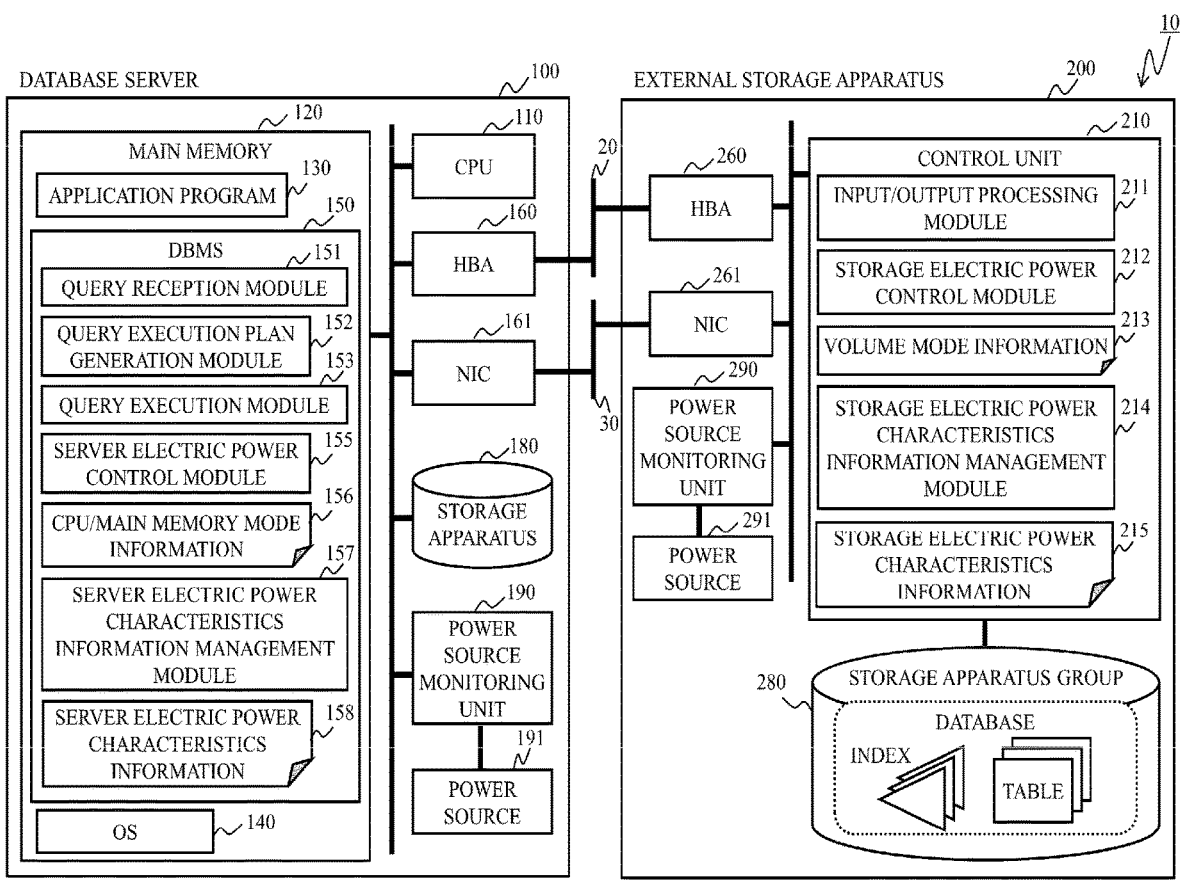
FIG. 31 is a diagram for illustrating a configuration of a computer system according to a second embodiment of the present invention.

FIG. 31 is a diagram for illustrating a configuration of the computer system 10 according to the second embodiment of the present invention. The computer system 10 according to the second embodiment of the present invention includes, similarly to the computer system according to the first embodiment, the database server 100 and the external storage apparatus 200. A description of configurations common to the computer systems 10 according to the first and second embodiments is omitted, and a difference in configuration is described.

The database management system (DBMS) 150 of the database server 100 according to the second embodiment includes, in addition to components of the database server 100 according to the first embodiment, a server electric power control module 155, CPU/main memory mode information 156, a server electric power characteristics information management module 157, and server electric power characteristics information 158.

The server electric power control module 155 is configured to control power consumption of the database server 100. In the second embodiment, the database server 100 includes a plurality of CPUs 110 and main memories 120, and one or a plurality of CPUs 110 and main memories 120 are used as necessary. The CPU 110 is mounted using a so-called CPU slot, which is an electronic component having connection terminals. Similarly, the main memory 120 is mounted using a so-called main memory slot, which is an electronic component having connection terminals. The CPU 110 and the main memory 120 may be managed in units of slots.

The server electric power control module 155 is configured to adjust execution performance and power consumption by increasing/decreasing the numbers of CPUs 110 and main memories 120 to be used. The CPU/main memory mode information 156 is information for managing modes of the CPU 110 and the main memory 120. The CPU/main memory mode information 156 is described in detail later with reference to FIG. 37.

The server electric power characteristics information management module 157 is configured to manage electric power characteristics information on the database server 100. Specifically, electric power characteristics information such as information on power consumption by the CPU 110 and the main memory 120 is acquired and recorded as the server electric power characteristics information 158. Processing by the server electric power characteristics information management module 157 is described in detail later with reference to FIG. 32. The server electric power characteristics information 158 is described in detail later with reference to FIG. 38.

The configuration of the external storage apparatus 200 according to the second embodiment is the same as that of the external storage apparatus according to the first embodiment.

Next, a description is given of processing in the computer system 10 according to the second embodiment of the present invention. A description of processing common to the first and second embodiments is omitted.

Figure 32:
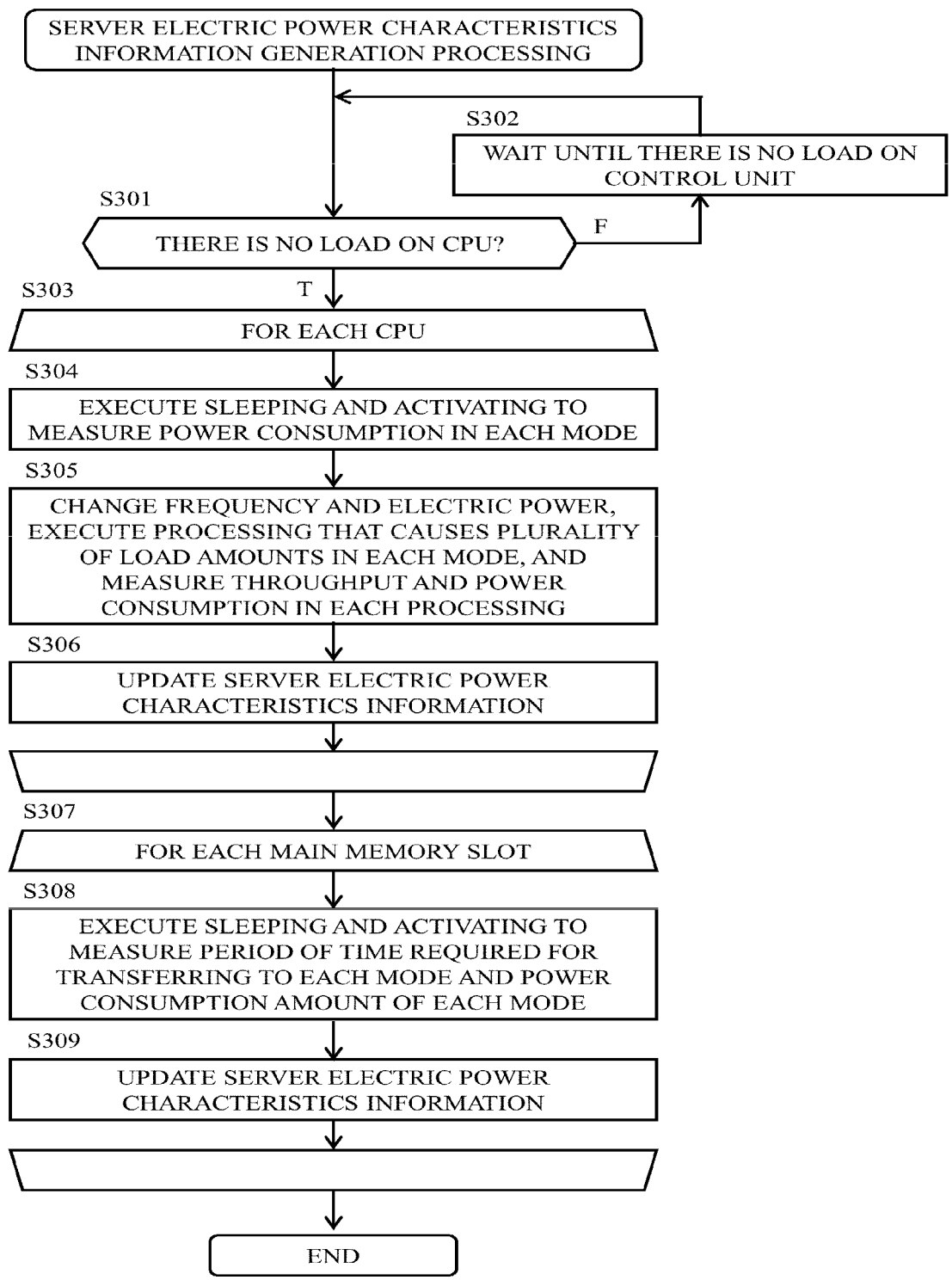
FIG. 32 is a flowchart for illustrating a procedure of server electric power characteristics information generation processing according to the second embodiment of the present invention.

FIG. 32 is a flowchart for illustrating a procedure of server electric power characteristics information generation processing according to the second embodiment of the present invention. The server electric power characteristics information generation processing is executed by the server electric power characteristics information management module 157 included in the DBMS 150 executed by the database server 100. The server electric power characteristics information generation processing is executed by the database server 100 at a predetermined timing, and for example, may be executed at a fixed time point, at predetermined time intervals, or when the database server 100 becomes a predetermined state.

When the server electric power characteristics information generation processing is started, the CPU 110 of the database server 100 first determines whether or not there is no load on the CPU 110 (Step S301). There is no load on the CPU 110 when the CPU 110 is not processing a query or other tasks. When there is no load on the CPU 110 ("F" as a result of Step S301), the CPU 110 waits until there is no load (Step S302).

When there is no load on the CPU 110 ("T" as a result of Step S301), the CPU 110 executes processing of from Step S304 to Step S306 for each CPU 110 (Step S303).

The CPU 110 first transfers the mode of the target CPU 110 for which electric power characteristics information is to be generated to a sleep mode (sleeping) and an active mode (activating), and measures the power consumption amount of each mode (Step S304). The active mode is a mode in which arithmetic processing can be executed. On the other hand, the sleep mode is a mode in which power consumption is reduced by reducing supplied electric power at the expense of execution of arithmetic processing. A power saving mode may be set as a mode in which power consumption is suppressed in exchange for arithmetic processing at a lower speed compared to the active mode. In order to suppress power consumption, for example, supplied electric power is reduced or the frequency is reduced.

Next, the CPU 110 changes the frequency and supplied electric power, executes processing that causes a plurality of load amounts in each mode, and measures throughput and power consumption for each load amount (Step S305).

When the processing of Step S304 and Step S305 is finished, the CPU 110 updates the server electric power characteristics information 158 corresponding to the target CPU 110 (Step S306). Processing described above is executed for all the CPUs 110 to generate the server electric power characteristics information 158.

Next, the CPU 110 executes processing of Step S308 and Step S309 for the main memory slot that accommodates the main memory 120 (Step S307).

The CPU 110 transfers the main memory 120 for which the electric power characteristics information is to be generated to the sleep mode (sleeping) and the active mode (activating), and measures a period of time required for transferring to each mode and the power consumption amount of each mode (Step S308). The active mode is a mode in which electric power is supplied and data can be read/written from/to the main memory 120. On the other hand, the sleep mode is a mode in which electric power is not supplied and data cannot be read/written from/to the main memory 120. In this description, two types of modes, namely, the active mode and the sleep mode are mentioned as the mode of the main memory 120. However, modes other than those two types of modes may be assumed, for example, a mode in which access can be made at a lower speed and its power consumption is also lower compared to the active mode.

The CPU 110 updates the server electric power characteristics information 158 corresponding to the target main memory slot (Step S309). Processing described above is executed for all the main memory slots to generate the server electric power characteristics information 158.

Figure 33:
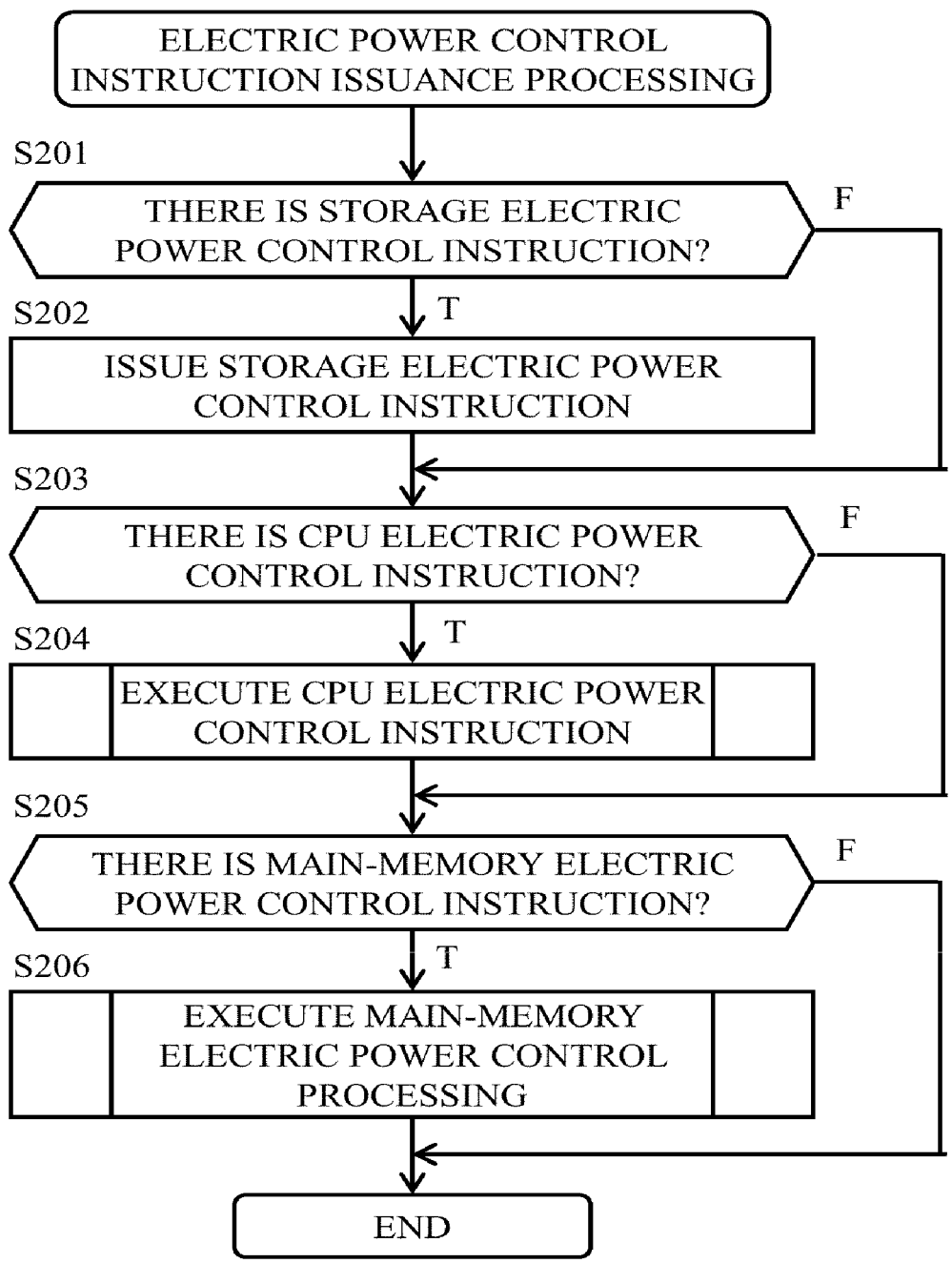
FIG. 33 is a flowchart for illustrating a procedure of electric power control instruction issuance processing according to the second embodiment of the present invention.

Next, a description is given of electric power control instruction issuance processing of issuing an electric power control instruction to a control target. FIG. 33 is a flowchart for illustrating a procedure of the electric power control instruction issuance processing according to the second embodiment of the present invention. The electric power control instruction issuance processing is executed by the server electric power control module 155 included in the DBMS 150 executed by the database server 100.

The CPU 110 first issues an electric power control instruction to the external storage apparatus 200 (Step S201 and Step S202). Processing of Step S201 and Step S202 is the same as that of the first embodiment, and thus the description thereof is omitted here.

Next, the CPU 110 determines whether or not the electric power control instruction specified in the query execution plan contains a CPU electric power control instruction (Step S203). When the electric power control instruction specified in the query execution plan contains a CPU electric power control instruction ("T" as a result of Step S203), the CPU 110 executes CPU electric power control processing (Step S204). The CPU electric power control processing is described in detail later with reference to FIG. 34.

Lastly, the CPU 110 determines whether or not the electric power control instruction specified in the query execution plan contains a main-memory electric power control instruction (Step S205). When the electric power control instruction specified in the query execution plan contains a main-memory electric power control instruction ("T" as a result of Step S205), the CPU 110 executes main-memory electric power control processing (Step S206). The main-memory electric power control processing is described in detail later with reference to FIG. 35.

Figure 34:
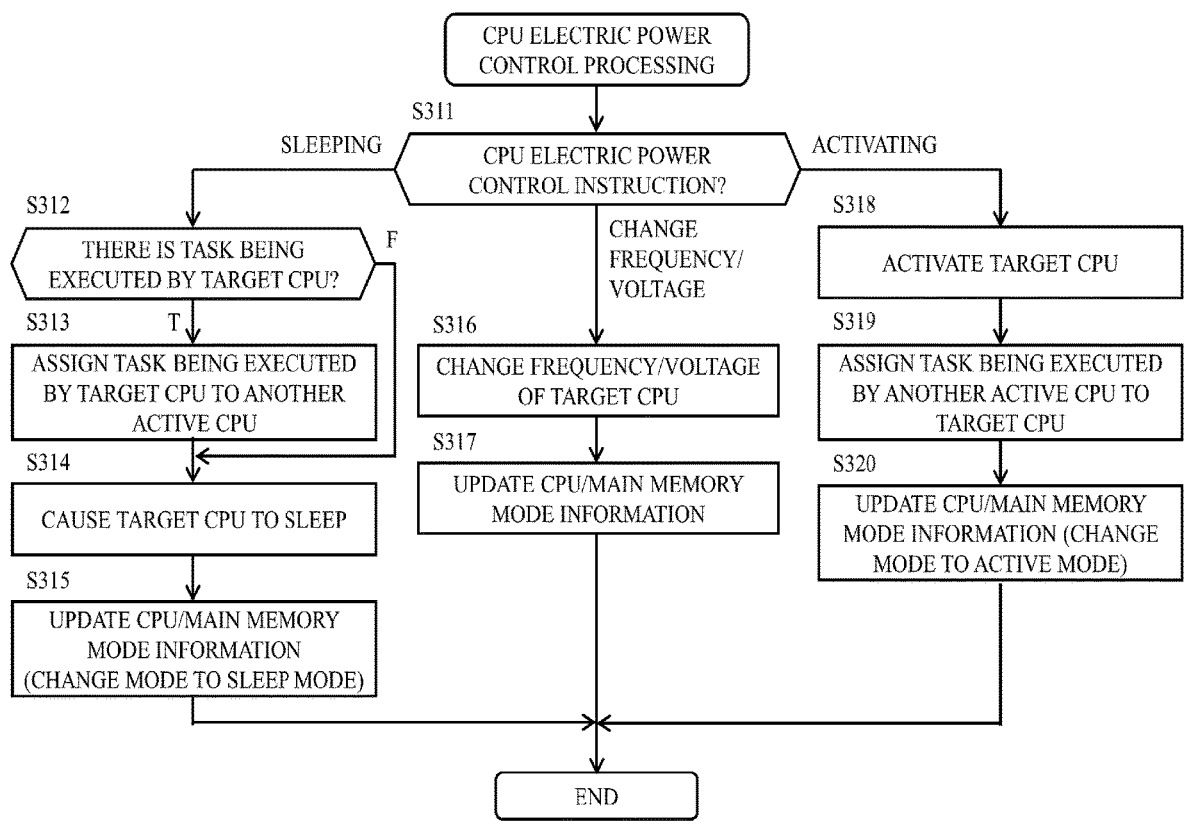
FIG. 34 is a flowchart for illustrating a procedure of CPU electric power control processing according to the second embodiment of the present invention.

Now, a description is given of the electric power control processing in the database server 100. First, electric power control of the CPU 110 is described. FIG. 34 is a flowchart for illustrating a procedure of the CPU electric power control processing according to the second embodiment of the present invention. The CPU electric power control processing is executed by the server electric power control module 155 included in the DBMS 150 executed by the database server 100.

The CPU 110 first determines specifics of the CPU electric power control instruction (Step S311). In the second embodiment, three types of values, namely, sleeping of the CPU 110, frequency/voltage change, and activating of the CPU 110 may be set.

When the specifics of the CPU electric power control instruction are "sleeping", the CPU 110 determines whether or not there is a task being executed by the target CPU 110 that is to be caused to sleep (Step S312). When there is a task being executed by the target CPU 110 ("T" as a result of Step S312), the CPU 110 assigns the task being executed to another active CPU (Step S313).

When there is no task being executed ("F" as a result of Step S312), or when the task being executed is assigned to another active CPU, the CPU 110 causes the target CPU to sleep (Step S314). Further, the CPU 110 updates the mode of the corresponding CPU 110 in the CPU/main memory mode information 156 to the sleep mode (Step S315).

Further, when the specifics of the CPU electric power control instruction are "frequency/voltage change", the CPU 110 changes the frequency/voltage of the target CPU 110 (Step S316). Further, the CPU 110 updates information on the corresponding CPU 110 in the CPU/main memory mode information 156 (Step S317).

When the specifics of the CPU electric power control instruction are "activating", the CPU 110 activates the target CPU 110 to be activated (Step S318). Further, the CPU 110 assigns a task being executed by another active CPU 110 to the target CPU 110 (Step S319). For example, another active CPU 110 may be the CPU 110 with a high load, or may be the CPU 110 to which waiting processing is allocated. Lastly, the CPU 110 updates the corresponding mode of the target CPU 110 in the CPU/main memory mode information 156 to the active mode (Step S320).

Figure 35:
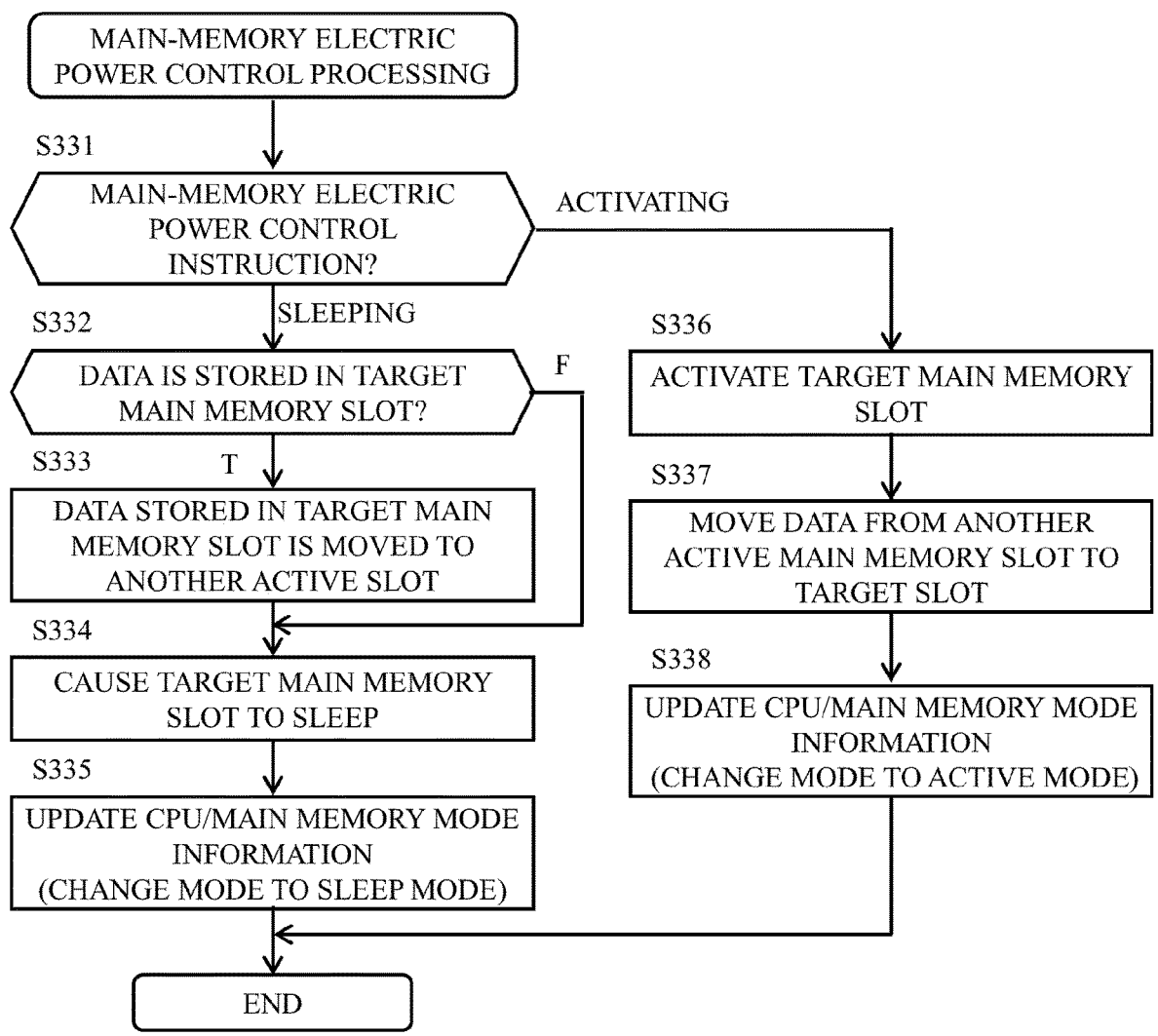
FIG. 35 is a flowchart for illustrating a procedure of main-memory electric power control processing according to the second embodiment of the present invention.

Next, a description is given of electric power control of the main memory 120. FIG. 35 is a flowchart for illustrating a procedure of the main-memory electric power control processing according to the second embodiment of the present invention. The main-memory electric power control processing is executed by the server electric power control module 155 included in the DBMS 150 executed by the database server 100.

The CPU 110 first determines specifics of the main-memory electric power control instruction (Step S331). In the second embodiment, sleeping or activating of the main memory 120 may be set.

When the specifics of the main-memory electric power control instruction are "sleeping", the CPU 110 determines whether or not data is stored in the target main memory 120 that is to be caused to sleep (Step S332). When data is stored in the main memory 120 ("T" as a result of Step S332), the stored data is moved to another active main memory 120 (Step S333).

When data is not stored in the target main memory 120 ("F" as a result of Step S332), or when the stored data is moved to another active main memory 120, the CPU 110 causes the target main memory to sleep (Step S334). Further, the CPU 110 updates the corresponding mode of the target main memory 120 in the CPU/main memory mode information 156 to the sleep mode (Step S335).

On the contrary, when the specifics of the main-memory electric power control instruction are "activating", the CPU 110 activates the target main memory 120 (Step S336). Further, the CPU 110 moves data from another active main memory 120 to the target main memory 120 (Step S337). For example, the CPU 110 may average the amounts of data stored in the respective main memories 120, or may move data from the main memory 120 with a small available capacity. Lastly, the CPU 110 updates the corresponding mode of the target main memory 120 in the CPU/main memory mode information 156 to the active mode (Step S338).

Next, a description is given of a configuration of the CPU/main memory mode information 156. FIG. 36 are each a table for showing an example of the CPU/main memory mode information 156 according to the second embodiment of the present invention, and FIG. 36(A) and FIG. 36(B) represent modes of the CPU 110 and the main memory 120, respectively.

The CPU/main memory mode information 156 is formed of an identifier 1561 of the CPU 110, an electric power mode 1562 of the CPU 110, an identifier 1563 of the main memory slot, and an electric power mode 1564 of the main memory slot. The CPU 110 may be mounted on a CPU slot and managed in unit of CPU slots. The main memory 120 is managed in units of main memory slots accommodating one or a plurality of storage media.

Values such as the active mode or the sleep mode may be set to the electric power mode 1562 of CPU 110, and a power saving mode associated with a change in frequency/voltage may also be set, for example. When a plurality of stages of frequencies/voltages may be set, a plurality of power saving modes may be set or items corresponding to the frequency/voltage may be added to the CPU/main memory mode information 156. Further, values such as the active mode or the sleep mode may be set to the electric power mode 1564 of the main memory slot.

Figure 37:
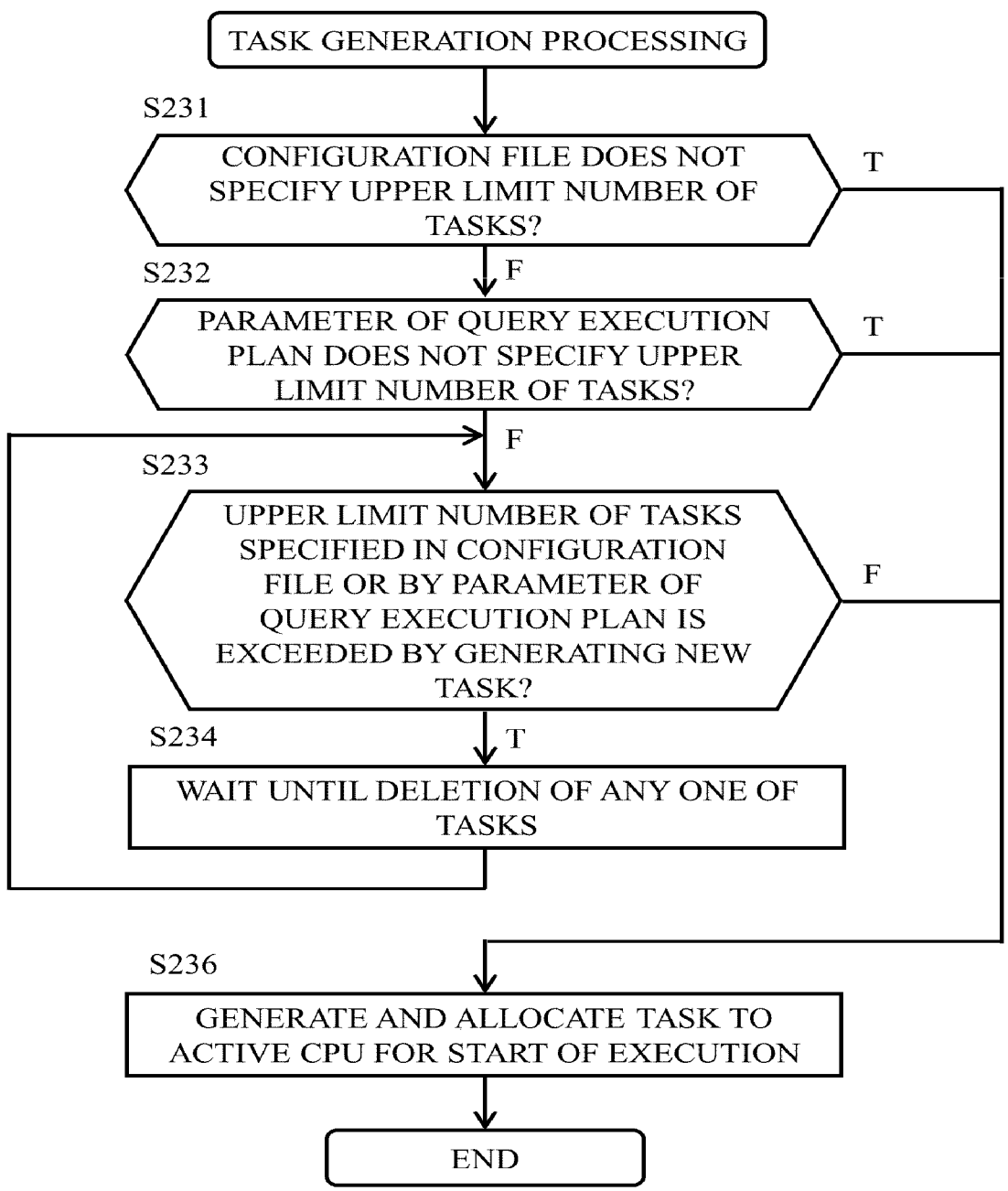
FIG. 37 is a flowchart for illustrating a procedure of task generation processing according to the second embodiment of the present invention.

This concludes the description of electric power control of the database server 100. As a supplementary description, a description is given of the task generation processing by the query execution module 153 according to the second embodiment. FIG. 37 is a flowchart for illustrating a procedure of the task generation processing according to the second embodiment of the present invention. Processing of from Step S231 to Step S234 is the same as that of the first embodiment. In the second embodiment, the generated task is not assigned to anyone of the CPUs 110, but assigned to the active mode CPUs 110 excluding the sleep mode CPUs 110, and execution of the generated task is started (Step S236).

This concludes the description of the configuration and control according to the second embodiment of the present invention. Next, a description is given of an application example of the second embodiment of the present invention with reference to FIG. 38 to FIG. 40. First, the server electric power characteristics information 158 of the database server 100 according to the second embodiment of the present invention is described. The storage electric power characteristics information 215 of the external storage apparatus 200 is the same as that of the first embodiment.

Figure 38:
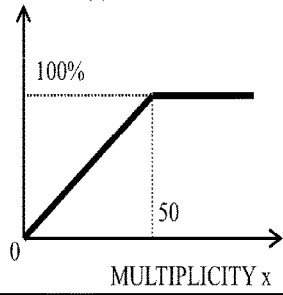
FIG. 38 is a diagram for illustrating server electric power characteristics information in a database server according to the second embodiment of the present invention.

FIG. 38 is a diagram for illustrating the server electric power characteristics information 158 of the database server 100 according to the second embodiment of the present invention. In the second embodiment, each CPU 110 and each main memory slot have the same performance, and thus performance characteristics related to the processing speed and electric power characteristics related to the power consumption are described. The database server 100 includes four CPUs 110 and four main memory slots. Further, any one of the active mode and the sleep mode may be set to both of the CPUs 110 and the main memory slots as their electric power modes.

First, the CPUs 110 are described. Each CPU 110 has the same performance. At the time of access to the database, a usage is determined based on the multiplicity x of a task being executed. The multiplicity x of one CPU is 50 at maximum, and the usage increases by 2% each time one task is executed, which means that the usage s (x) is represented by x×2%.

The electric power characteristics of the CPUs 110 are, for each CPU 110, power consumption of 100 W when the CPU 110 is in the active mode and there is no load. At the time of access to the database, the CPU 110 consumes a maximum power of 150 W, and the power consumption t (x) is represented by 100 W+(150 W−100 W)×s (x) for the multiplicity x. Further, the power consumption in the sleep mode is 10 W. A period of time and electric power required for transferring modes of the CPU 110 are negligibly small.

Next, the main memory 120 is described. When a predetermined voltage is not supplied, the main memory 120 cannot keep holding data. Thus, the main memory 120 can exhibit its performance only in the active mode. Regarding the electric power characteristics, the power consumption is 10 W in the active mode and 1 W in the sleep mode. Further, a period of time and electric power required for transferring modes of the main memory 120 are negligibly small similarly to the case of the CPU 110.

An example of controlling electric power of the CPU 110 and the main memory 120 based on the server electric power characteristics information 158 described above is shown in FIG. 39 and FIG. 40. FIG. 39 are each a table for showing reduction of power consumption through electric power control of the CPUs 110 in the database server 100 according to the second embodiment of the present invention, and FIG. 39(A) and FIG. 39(B) represent states before and after execution of electric power control, respectively. FIG. 40 are each a table for showing reduction of power consumption through electric power control of the main memory 120 in the database server 100 according to the second embodiment of the present invention, and FIG. 40(A) and FIG. 40(B) represent states before and after execution of electric power control, respectively.

Referring to FIG. 39, all the CPUs of from a CPU 1 to a CPU 4 are in the active mode before execution of electric power control, and a usage of the CPU 1 and the CPU 2 is 60%, whereas a usage of the CPU 3 and the CPU 4 is 40%. Power consumption of the CPU 1 and the CPU 2 is 160 W, whereas power consumption of the CPU 3 and the CPU 4 is 140 W, resulting in total power consumption of 600 W.

In contrast, through execution of electric power control according to the second embodiment, the multiplicities x of the CPU 1 and the CPU 2 are set to 50 to increase their usage, whereas the multiplicities x of the CPU 3 and the CPU 4 are set to 0, and besides, the CPU 3 and the CPU 4 are transferred to the sleep mode, to thereby cause power consumption of the CPU 1 and the CPU 2 to be 200 W and power consumption of the CPU 3 and the CPU 4 to be 10 W. As a result, the entire power consumption is 420 W, which means that 180 W of electric power can be reduced.

As described above, it is possible to reduce power consumption by adjusting the usage (multiplicity) of each CPU. When the CPU transfers to the sleep mode, a large amount of power consumption can be reduced. Therefore, it is possible to reduce entire power consumption by performing control such that another CPU takes over execution of a task being executed by a low-usage CPU. Further, usable CPUs may be narrowed down based on the multiplicity set as a parameter.

Referring to FIG. 40, all the main memories of from a main memory slot 1 to a main memory slot 4 are in the active mode before execution of electric power control. At this time, the main memory slot 3 and the main memory slot 4 can be transferred to the sleep mode by narrowing down the main memories 120 to be used to the main memory slot 1 and the main memory slot 2. With this, it is possible to reduce power consumption of the main memory slot 3 and the main memory slot 4 from 10 W to 1 W, which means that the entire power consumption can be reduced by 18 W.

According to the second embodiment of the present invention, it is possible to reduce power consumption of not only the external storage apparatus 200 but also of the database server 100, to thereby further reduce power consumption of the entire computer system.

Third Embodiment

In the second embodiment, electric power of the external storage apparatus 200 is controlled, and at the same time, power consumption of the database server 100 is controlled. In a third embodiment of the present invention, a description is given of an example of controlling power consumption by decreasing the accuracy of a query. In the third embodiment, a special input/output instruction ("partial processing" enable indicator) for specifying the accuracy of a query is issued.

Figure 41:
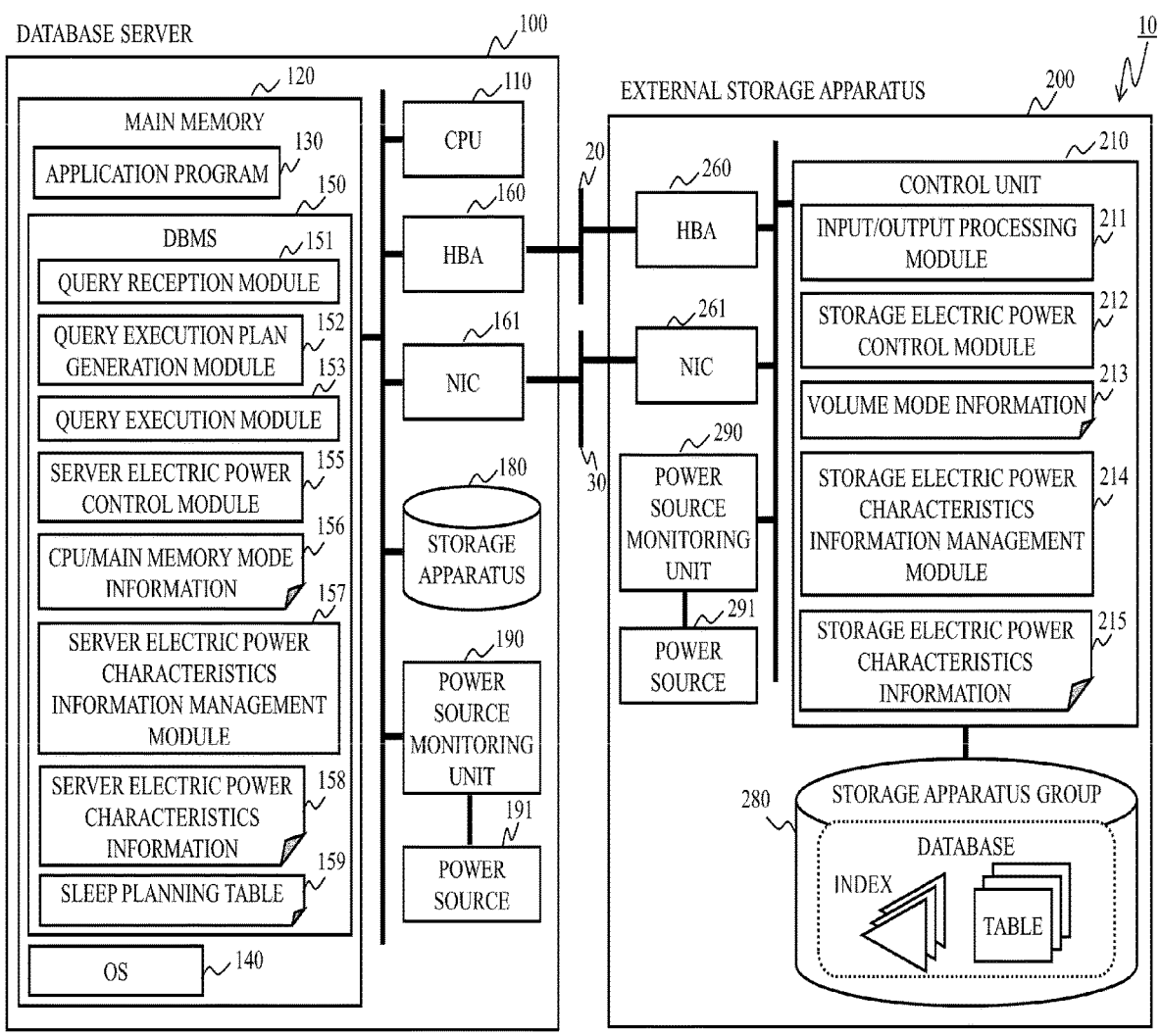
FIG. 41 is a diagram for illustrating a configuration of a computer system according to a third embodiment of the present invention.

FIG. 41 is a diagram for illustrating a configuration of the computer system 10 according to the third embodiment of the present invention. The computer system 10 according to the third embodiment of the present invention includes, similarly to the computer system according to the second embodiment, the database server 100 and the external storage apparatus 200. A description of configurations common to the computer systems 10 according to the second and third embodiments is omitted, and a difference in configuration is described.

The database server 100 according to the third embodiment adds a sleep planning table 159 to the components of the DBMS 150 according to the second embodiment. Other components are the same as those of the second embodiment. The sleep planning table 159 is information for setting a timing at which a volume provided by the CPU 110 of the database server 100 and the external storage apparatus 200 is caused to sleep. The sleep planning table 159 is described in detail later with reference to FIG. 46.

In the third embodiment, adjustment of the accuracy of a query is performed by the query execution plan generation module 152 and the query execution module 153. The configuration of the external storage apparatus 200 is the same as that of the second embodiment. In the following, processing by the query execution plan generation module 152 and the query execution module 153 is described.

Figure 42:
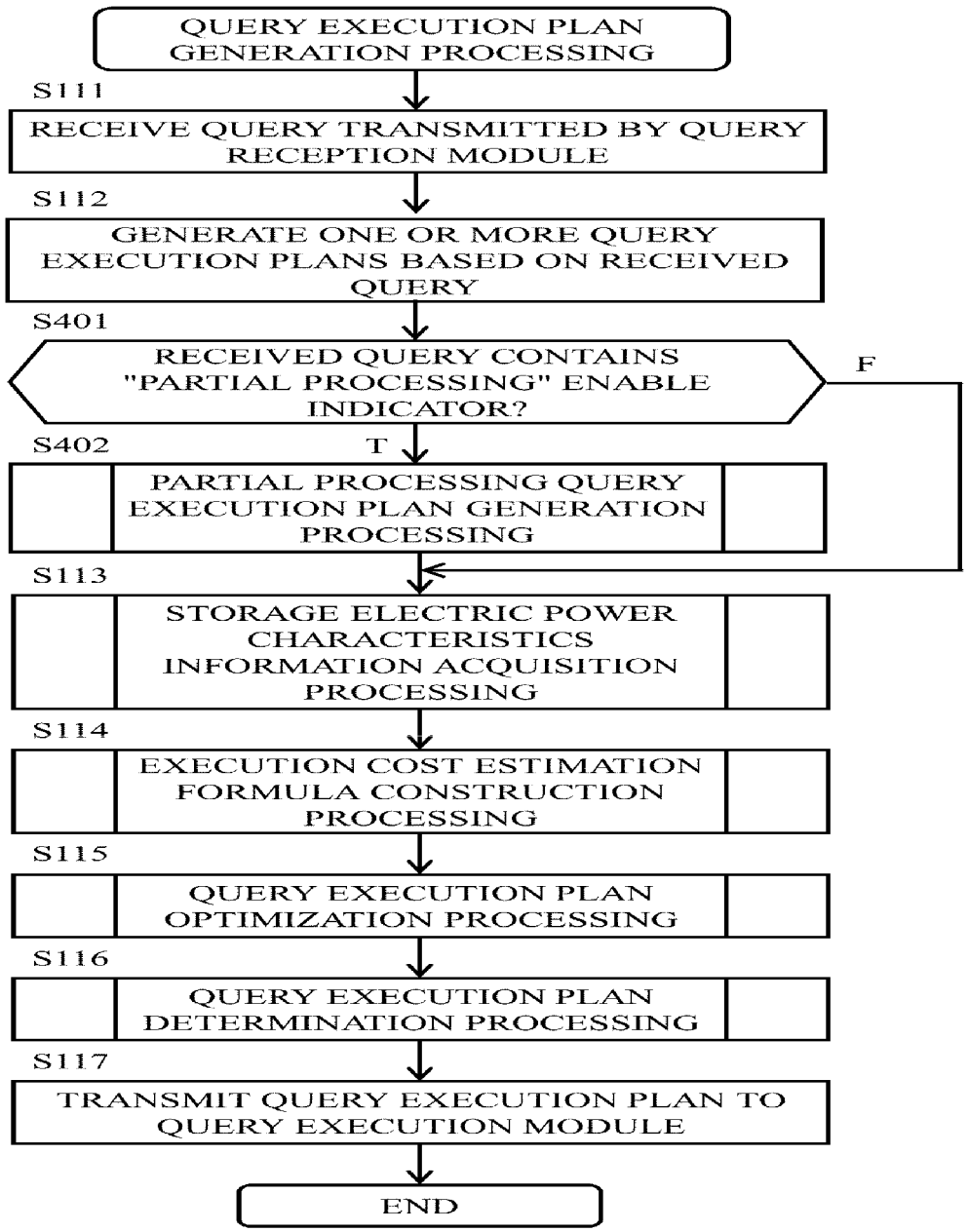
FIG. 42 is a flowchart for illustrating a procedure of query execution plan generation processing according to the third embodiment of the present invention.

First, the query execution plan generation processing is described. FIG. 42 is a flowchart for illustrating a procedure of the query execution plan generation processing according to the third embodiment of the present invention. In the query execution plan generation processing according to the third embodiment, processing for executing partial processing is added between processing of Step S112 and Step S113 of the query execution plan generation processing according to the first embodiment.

To be more specific about execution of the partial processing, in the third embodiment, an SQL statement representing a query can contain a partial processing enable indicator. The partial processing excludes a part of a volume from an execution range of the query. With this, it is possible to make the execution of a query faster and save power, but an accuracy of the search result deteriorates. For example, when an aggregation function for calculating an average value or other statistical values is used to acquire the search result, the partial processing can be used, for example, when it is enough to grasp an approximate result and the processing result is desired to be acquired quickly.

When the CPU 110 of the database server 100 creates one or more query execution plans (Step S112), the CPU 110 determines whether or not the received query contains a partial processing enable indicator (Step S401). When the received query contains a partial processing enable indicator ("T" as a result of Step S401), the CPU 110 executes partial processing query execution plan generation processing of generating one or more partial processing query execution plans for the received query (Step S402). The partial processing query execution plan generation processing is described in detail later with reference to FIG. 43. After the partial processing query execution plan generation processing is executed, the CPU 110 executes processing from Step S113 and onward. The determination of whether or not the received query contains a partial processing enable indicator may be made based on whether or not an SQL character string representing the received query contains a character string (for example, /*ENABLE_PARTIAL_PROCESSING*/) representing the partial processing enable indicator, or based on whether or not the configuration file or other files of the DBMS 150 contains an instruction representing the partial processing enable indicator. For example, specification of the partial processing enable indicator in the configuration file of the DBMS 150 means specifying that the entire computer system is adapted to partial processing.

Figure 43:
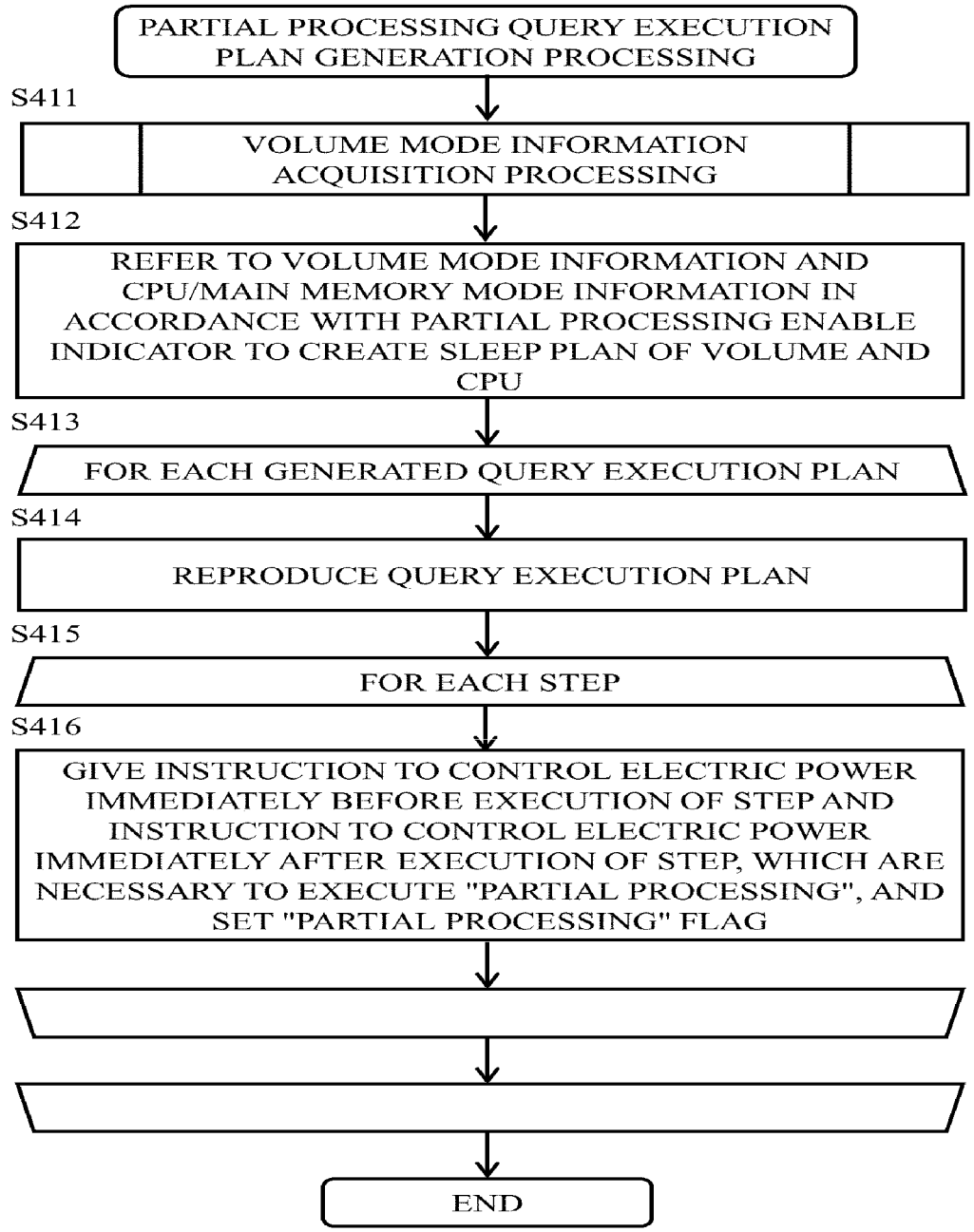
FIG. 43 is a flowchart for illustrating a procedure of partial processing query execution plan generation processing according to the third embodiment of the present invention.

Next, the partial processing query execution plan generation processing is described. FIG. 43 is a flowchart for illustrating a procedure of the partial processing query execution plan generation processing according to the third embodiment of the present invention. The partial processing query execution plan generation processing is executed by the query execution plan generation module 152 included in the DBMS 150 executed by the database server 100.

The CPU 110 first executes volume mode information acquisition processing of acquiring the volume mode information 213 from the external storage apparatus 200 (Step S411). The volume mode information acquisition processing is described in detail later with reference to FIG. 44.

Next, on the basis of partial processing enable indicator, the CPU 110 refers to the volume mode information 213 and the CPU/main memory mode information 156 to create a sleep plan of the volume and the CPU 110 (Step S412).

Further, the CPU 110 executes processing from Step S414 and onward for each generated query execution plan (Step S413).

The CPU 110 first reproduces the query execution plan (Step S414). Further, the CPU 110 performs setting for executing partial processing, for each step of the reproduced query execution plan (Step S415). Specifically, the CPU 110 gives an instruction to control electric power immediately before execution of the step and an instruction to control electric power immediately after execution of the step, which are necessary to execute partial processing, and sets a partial processing flag (Step S416).

Figure 44:
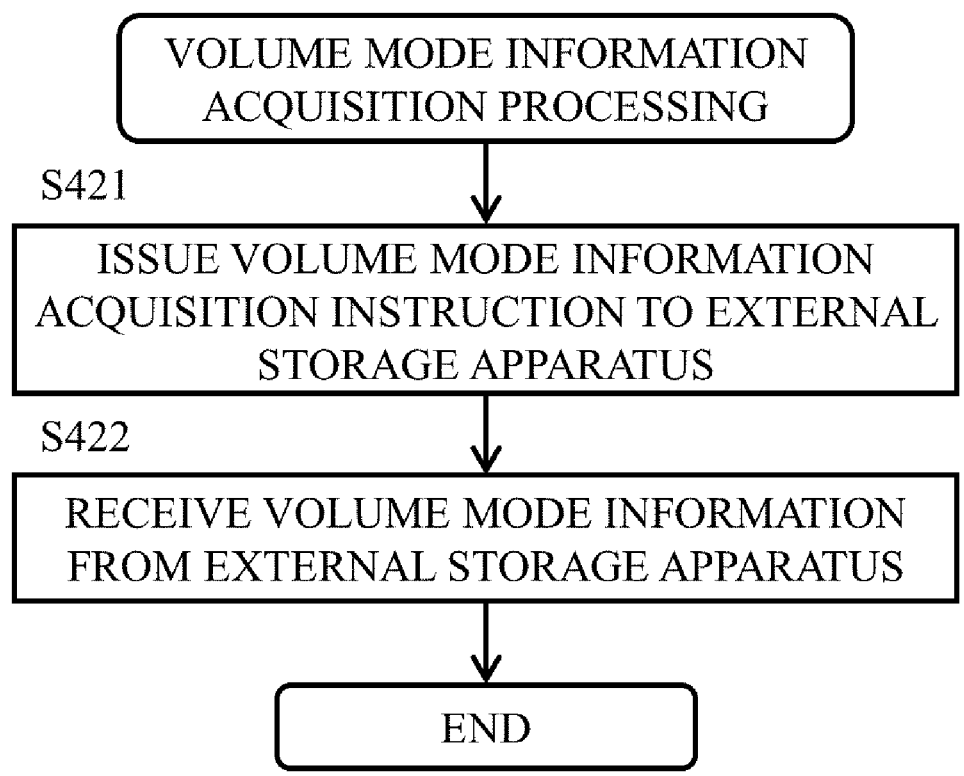
FIG. 44 is a flowchart for illustrating a procedure of volume mode information acquisition processing according to the third embodiment of the present invention.

Next, a description is given of processing of acquiring the volume mode information 213. FIG. 44 is a flowchart for illustrating a procedure of the volume mode information acquisition processing according to the third embodiment of the present invention. The volume mode information acquisition processing is executed by the query execution plan generation module 152 included in the DBMS 150 executed by the database server 100.

When the volume mode information acquisition processing is started, the CPU 110 first issues a volume mode information acquisition instruction to the external storage apparatus 200 (Step S421). After that, the CPU 110 receives volume mode information transmitted from the external storage apparatus 200 (Step S422).

Figure 45:
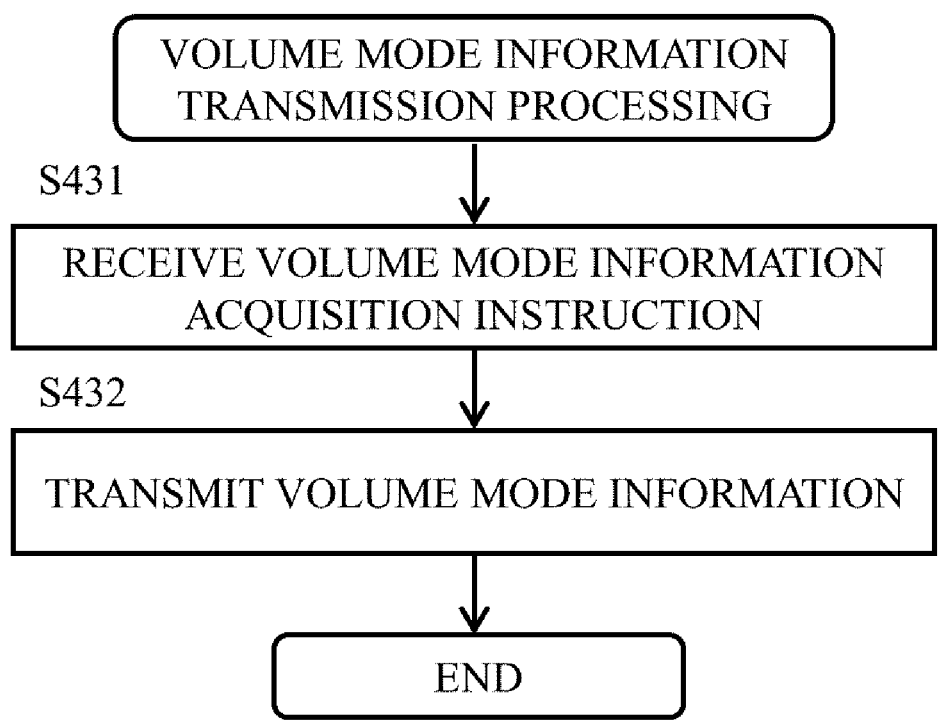
FIG. 45 is a flowchart for illustrating a procedure of volume mode information transmission processing according to the third embodiment of the present invention.

Next, a description is given of volume mode information transmission processing by the external storage apparatus 200 that has received a volume mode information acquisition instruction. FIG. 45 is a flowchart for illustrating a procedure of the volume mode information transmission processing according to the third embodiment of the present invention. The volume mode information transmission processing is executed by the storage electric power control module 212 included in the control unit 210 of the external storage apparatus 200.

When the control unit 210 of the external storage apparatus 200 receives a volume mode information acquisition instruction from the database server 100 (Step S431), the control unit 210 acquires the volume mode information 213 and transmits the volume mode information 213 to the database server 100 (Step S432). When a volume is specified in the volume mode information acquisition instruction, only the information on the specified volume may be transmitted.

Next, a description is given of the sleep planning table 159 of the volume and the CPU 110. FIG. 46 is a table for showing an example of the sleep planning table 159 of the volume and the CPU 110 according to the third embodiment of the present invention. The sleep planning table 159 is contained in the DBMS 150 of the database server 100 as described above.

The sleep planning table 159 contains an identifier 1591 for identifying the volume/CPU and a sleep plan 1592. As shown in FIG. 46, the sleep plan 1592 stores, for example, a timing at which the target volume or CPU is caused to sleep. Creation of a record in the sleep planning table 159 may be omitted when the volume or the CPU 110 is activated at all times, and a corresponding record may be created only when the volume or the CPU 110 is caused to sleep.

Figure 47:
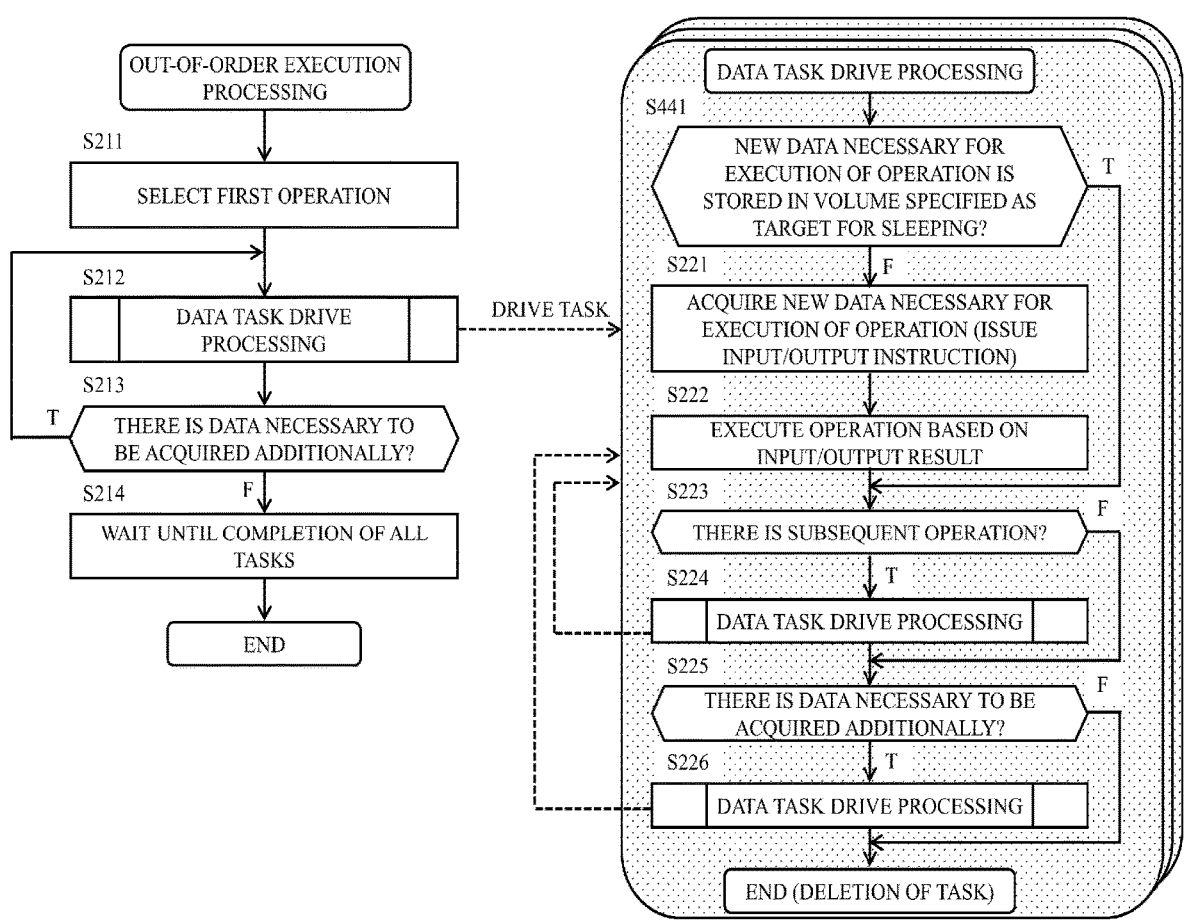
FIG. 47 is a flowchart for illustrating a procedure of out-of-order execution processing according to the third embodiment of the present invention.

Next, processing by the query execution module 153 is described. FIG. 47 is a flowchart for illustrating a procedure of the out-of-order execution processing according to the third embodiment of the present invention. The difference from the out-of-order execution processing according to the first embodiment is to determine, at the start of data task drive processing, whether or not new data necessary for execution of an operation is stored in the volume specified as the target for sleeping. The data task drive processing according to the third embodiment is the same as that of the first embodiment except for this point.

When the data task drive processing is started, the CPU 110 determines whether or not new data necessary for execution of a first operation is stored in a volume specified as the target for sleeping (Step S441). When new data is stored in a volume specified as the target for sleeping ("T" as a result of Step S441), the CPU 110 processes the subsequent operation without executing the operation (Step S223).

Figure 48:
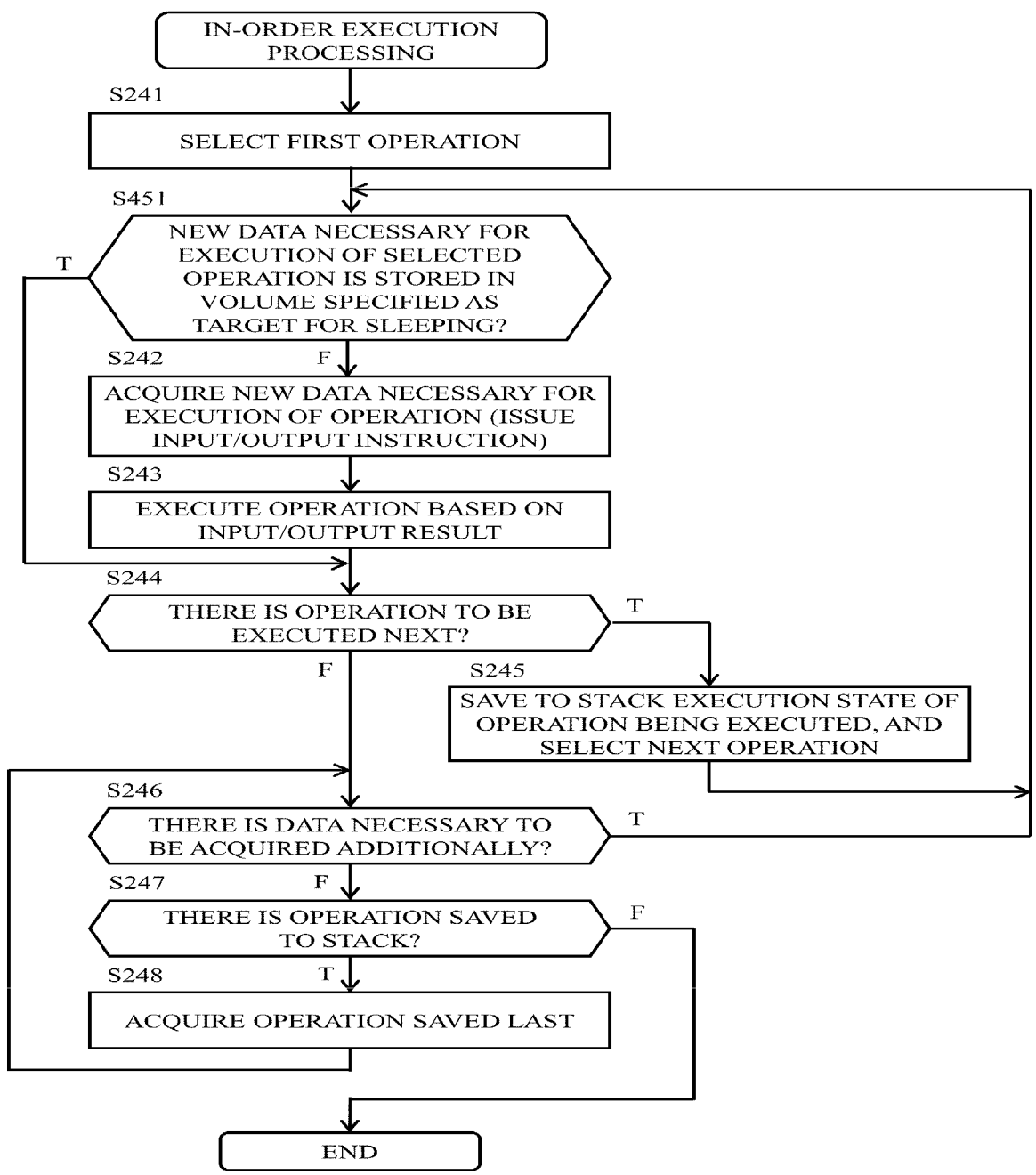
FIG. 48 is a flowchart for illustrating a procedure of in-order execution processing according to the third embodiment of the present invention.

FIG. 48 is a flowchart for illustrating a procedure of the in-order execution processing according to the third embodiment of the present invention. The difference from the in-order execution processing according to the first embodiment is to determine whether or not new data necessary for execution of a selected operation is stored in the volume specified as the target for sleeping before processing the selected operation. The in-order execution processing according to the third embodiment is the same as that of the first embodiment except for this point.

The CPU 110 determines whether or not new data necessary for execution of a selected operation is stored in the volume specified as the target for sleeping before processing the selected operation (Step S451). When new data is stored in a volume specified as the target for sleeping ("T" as a result of Step S451), the CPU 110 processes the subsequent operation without executing the operation (Step S244).

This concludes the description of the configuration and control according to the third embodiment of the present invention. Next, a description is given of an application example of the third embodiment of the present invention with reference to FIG. 49 to FIG. 54. First, a description is given of a configuration of a database according to the third embodiment of the present invention. FIG. 49 is a diagram for illustrating a configuration of a database according to the third embodiment of the present invention.

In this example, four volumes of from the volume 1 to a volume 4 are provided, and the volume 1 stores the table R and the index IR. On the other hand, the table S and the index IS are stored in the volumes 2 to 4 using a hash distribution method with S2 serving as a hash key. The volume 2 stores a table S1 and an index IS1, the volume 3 stores a table S2 and an index IS2, and the volume 4 stores a table S3 and an index IS3. Further, data is stored using a hash distribution method, and thus data of the table S is stored equally in the volumes 2 to 4. The configurations of the table R, the index IR, the table S, and the index IS are the same as those of the first embodiment illustrated in FIG. 22.

Next, a description is given of the storage electric power characteristics information 215 of the external storage apparatus 200 according to the third embodiment of the present invention. FIG. 50 is a diagram for illustrating the storage electric power characteristics information 215 of the external storage apparatus 200 according to the third embodiment of the present invention. In the third embodiment, the volumes 1 to 4 have the same performance, which is the same as that of each volume according to the first embodiment illustrated in FIG. 23.

Next, a description is given of a query for measuring the performance at the time of execution. FIG. 51 is a diagram for illustrating an example of a query to be executed in the database server 100 according to the third embodiment of the present invention. The query illustrated in FIG. 51 is the same as the query 1 of the first embodiment illustrated in FIG. 24(A), and thus the description thereof is omitted here.

Further, similarly to the first embodiment, three types of query execution plans are created by using hash join, index join (in-order execution), and index join (out-of-order execution). Descriptions of hash join and index join (in-order execution) are omitted here, and a description is given of an example of applying the third embodiment to the query execution plan 3 using index join (out-of-order execution). FIG. 52 is a diagram for illustrating the query execution plan 3 for processing the query 1 by index join (out-of-order execution) according to the third embodiment of the present invention. The query execution plan 3 is the same as that of the first embodiment.

Now, a description is given of the performance of when the query illustrated in FIG. 51 is processed based on the query execution plan 3 illustrated in FIG. 52. The multiplicity x in out-of-order execution is set to 100. FIG. 53 are each a diagram for illustrating processing performance achieved by the query execution plan 3 when partial execution is not performed in the third embodiment of the present invention, and FIG. 53(A) and FIG. 53(B) represent performance information of each volume and a state of each volume, respectively.

When partial execution is not performed, as illustrated in FIG. 53(A), an average IOPS is 99 IOPS for the volume 1, and 3,300 IOPS for the volumes 2 to volume 4, resulting in a total of 9,999 IOPS. Further, as illustrated in FIG. 53(B), all the volumes are in the active mode. Further, power consumption of the volume 1 and the volumes 2 to 4 is 101 W and 133 W, respectively, resulting in a total of 500 W.

FIG. 54 are each a diagram for illustrating processing performance achieved by the query execution plan 3 when partial execution is performed in the third embodiment of the present invention, and FIG. 54(A), FIG. 54(B), and FIG. 54(C) represent the sleep planning table 159, performance information on each volume, and a state of each volume, respectively.

In the example illustrated in FIG. 54, as illustrated in FIG. 54(A) and FIG. 54(C), the volume 4 is caused to sleep to perform partial execution. Then, as illustrated in FIG. 54(B), the average IOPS is 99 IOPS for the volume 1, and 3,300 IOPS for the volumes 2 and 3, resulting in a total of 6,699 IOPS. Further, power consumption of the volume 1 and the volumes 2 and 3 is 101 W and 133 W, respectively, resulting in a total of 377 W.

As described above, according to the third embodiment of the present invention, it is possible to reduce power consumption by narrowing down volumes to be accessed and causing volumes not to be accessed to sleep, although the accuracy deteriorates due to the fact that a part of the processing results cannot be acquired by performing partial execution of a query. When data is stored equally in each volume in a distributed manner using a hash distribution method as in the case of the third embodiment, the accuracy may deteriorate, for example, in the case of acquiring an average value of data, but an approximate result can be acquired with a small error. At this time, the necessary accuracy may be determined based on a range of the partial execution.

Fourth Embodiment

In the first embodiment, the external storage apparatus 200 processes an input/output instruction transmitted from the database server 100 to input/output data. In a fourth embodiment of the present invention, a description is given of an example in which processing of the received input/output instruction is delayed to save power.

Figure 55:
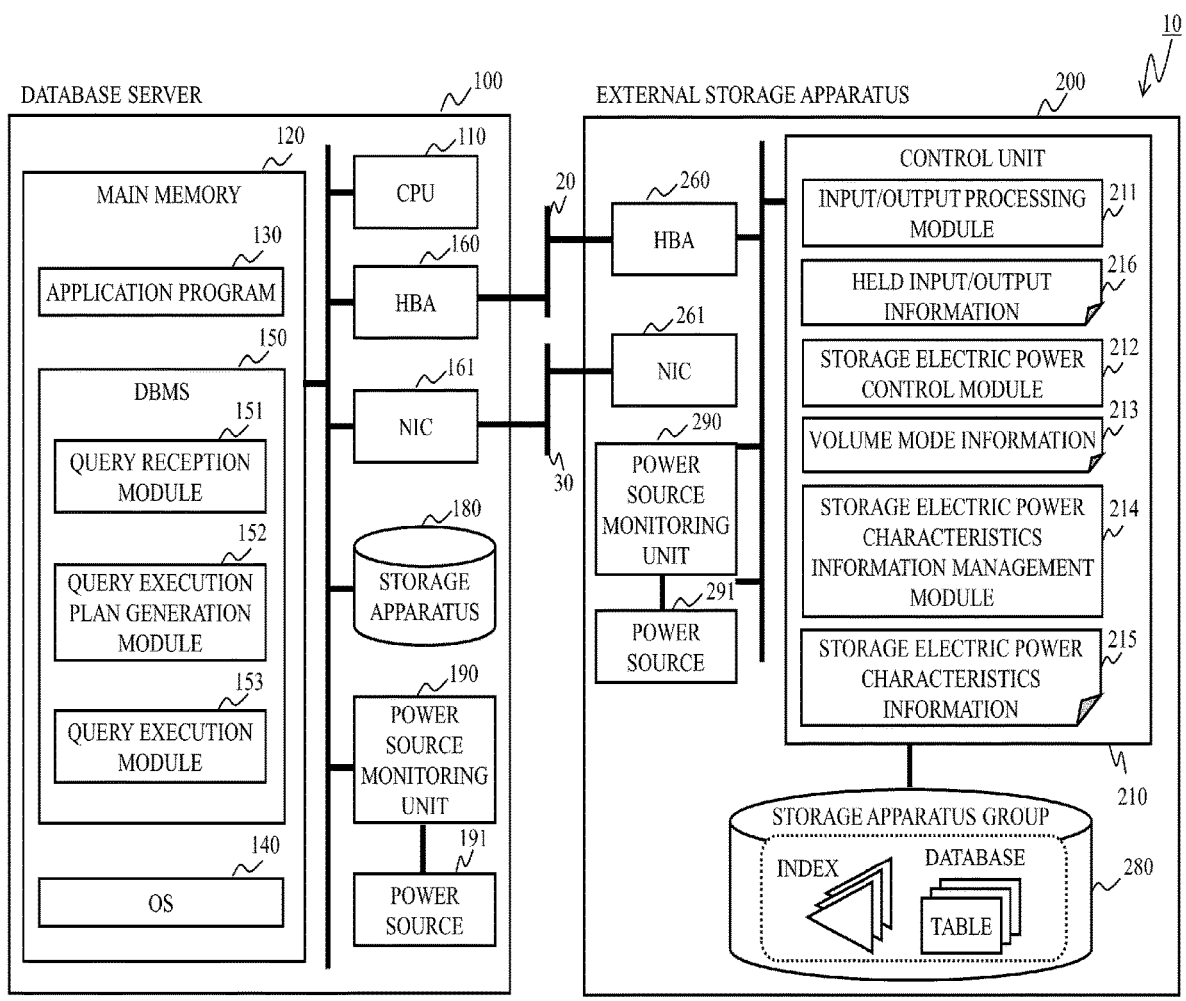
FIG. 55 is a diagram for illustrating a configuration of a computer system according to a fourth embodiment of the present invention.

FIG. 55 is a diagram for illustrating a configuration of the computer system 10 according to the fourth embodiment of the present invention. The computer system 10 according to the fourth embodiment of the present invention is different from the computer system according to the first embodiment in that the control unit 210 of the external storage apparatus 200 holds held input/output information 216. Other configurations are the same as those of the computer system 10 according to the first embodiment, and thus a description thereof is omitted here.

The held input/output information 216 is a table for managing a held (unexecuted) input/output instruction among input/output instructions transmitted from the database server 100. The held input/output information 216 is described in detail later with reference to FIG. 60.

The computer system 10 according to the fourth embodiment has an input/output delay mode in which processing of an input/output instruction can be delayed as described above. The input/output delay mode is specified by the query execution module 153 of the database management system. 150 issuing an input/output instruction having a set delay permission flag to the external storage apparatus 200.

Figure 56:
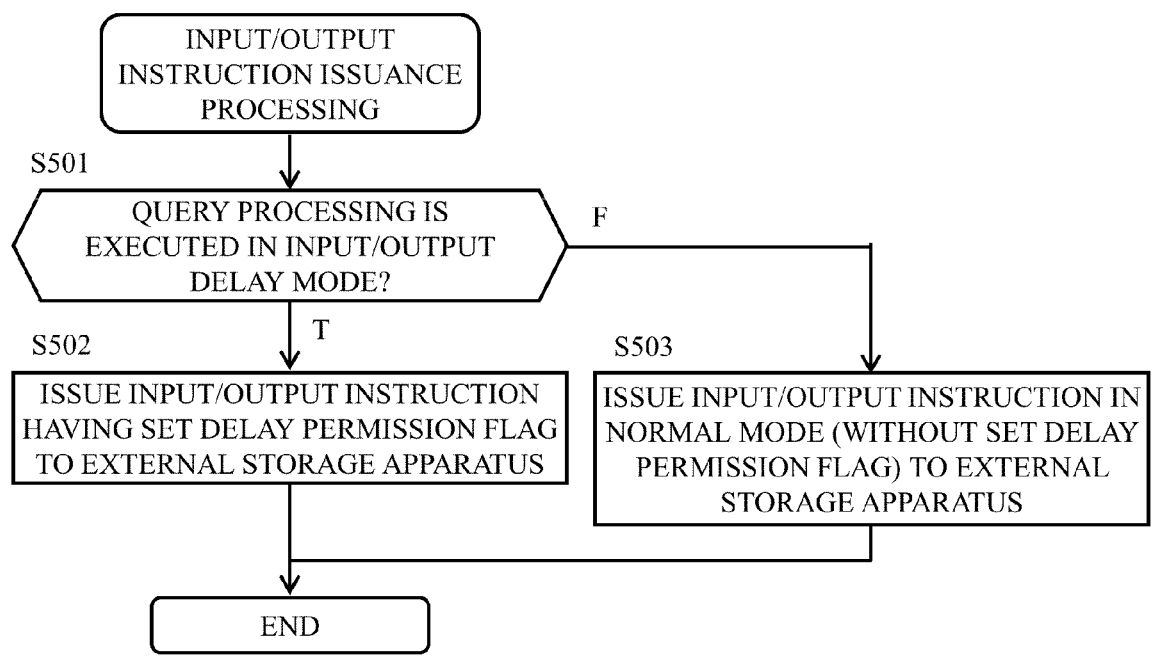
FIG. 56 is a flowchart for illustrating a procedure of input/output instruction issuance processing according to the fourth embodiment of the present invention.

FIG. 56 is a flowchart for illustrating a procedure of input/output instruction issuance processing according to the fourth embodiment of the present invention. The input/output instruction issuance processing is executed by the query execution module 153 in processing of Step S221 of the out-of-order execution processing and processing of Step S242 of the in-order execution processing.

The CPU 110 of the database server 100 determines whether or not query processing is executed in the input/output delay mode (Step S501). When the query processing is executed in the input/output delay mode ("T" as a result of Step S501), the CPU 110 issues an input/output instruction having a set delay permission flag to the external storage apparatus 200 (Step S502). On the contrary, when the query processing is not executed in the input/output delay mode ("F" as a result of Step S501), the CPU 110 issues an input/output instruction in a normal mode, that is, an input/output instruction not having a set delay permission flag to the external storage apparatus 200 (Step S503).

Figure 57:
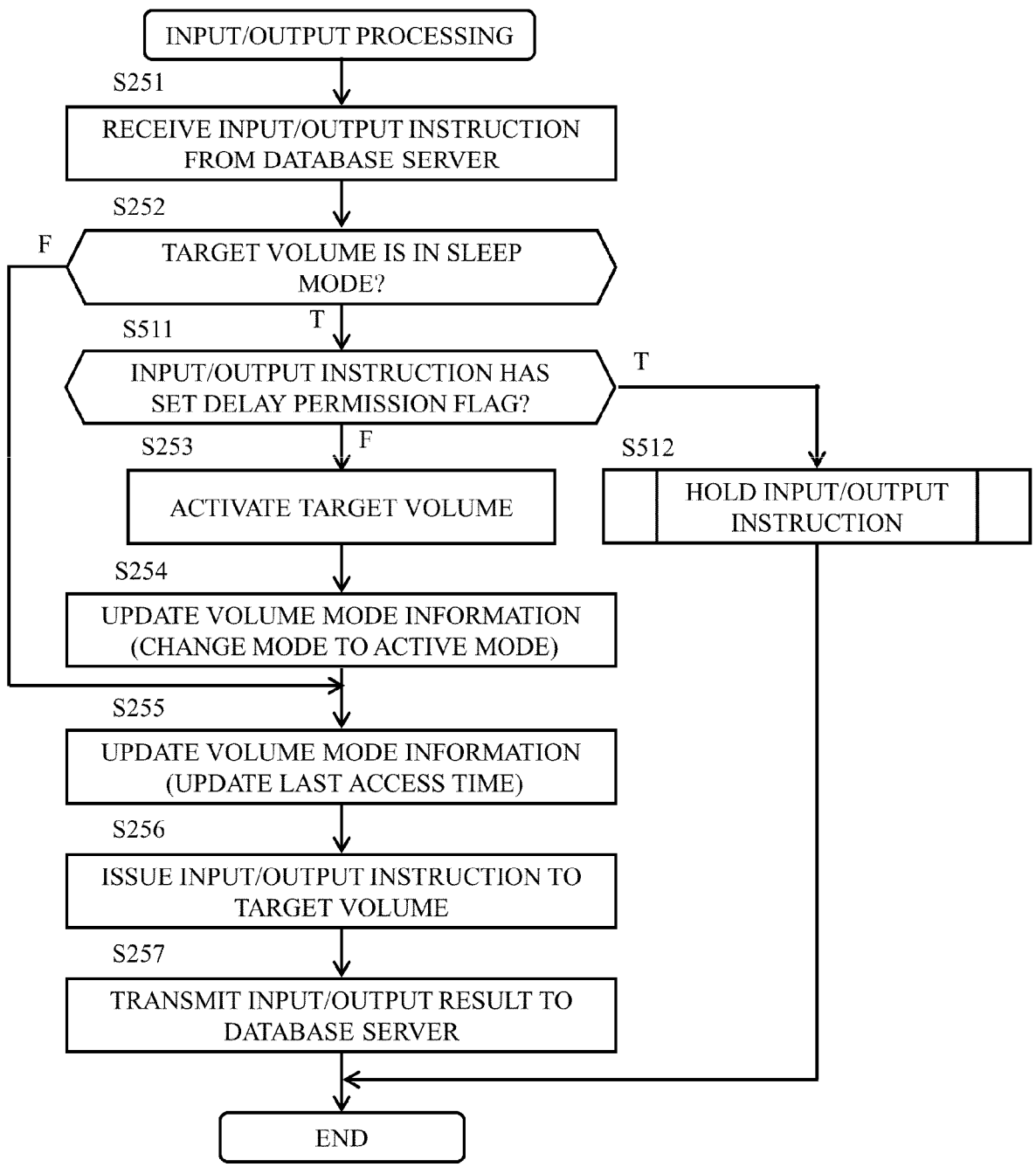
FIG. 57 is a flowchart for illustrating a procedure of input/output processing according to the fourth embodiment of the present invention.

Next, a description is given of processing by the input/output processing module 211 included in the control unit of the external storage apparatus 200. In the input/output processing according to the fourth embodiment, processing of executing input/output delay is added to the input/output processing according to the first embodiment (FIG. 17). FIG. 57 is a flowchart for illustrating a procedure of the input/output processing according to the fourth embodiment of the present invention.

When the control unit 210 receives an input/output instruction from the database server 100 (Step S251), the control unit 210 refers to the electric power mode 2132 of the volume mode information 213 to determine whether or not a volume for which data is to be input/output is in the sleep mode (Step S252). When a volume for which data is to be input/output is in the sleep mode ("T" as a result of Step S252), the control unit 210 determines whether or not the received input/output instruction has a set delay permission flag (Step S511). When a delay permission flag is not set in the received input/output instruction ("F" as a result of Step S511), the control unit 210 executes processing from. Step S253 and onward.

On the contrary, when the received input/output instruction has a set delay permission flag ("T" as a result of Step S511), the control unit 210 executes input/output instruction hold processing (Step S512), and finishes the processing. In the input/output instruction hold processing, whether or not to hold the received input/output instruction or process the held input/output instruction is determined. The input/output instruction hold processing is described in detail later with reference to FIG. 58.

Figure 58:
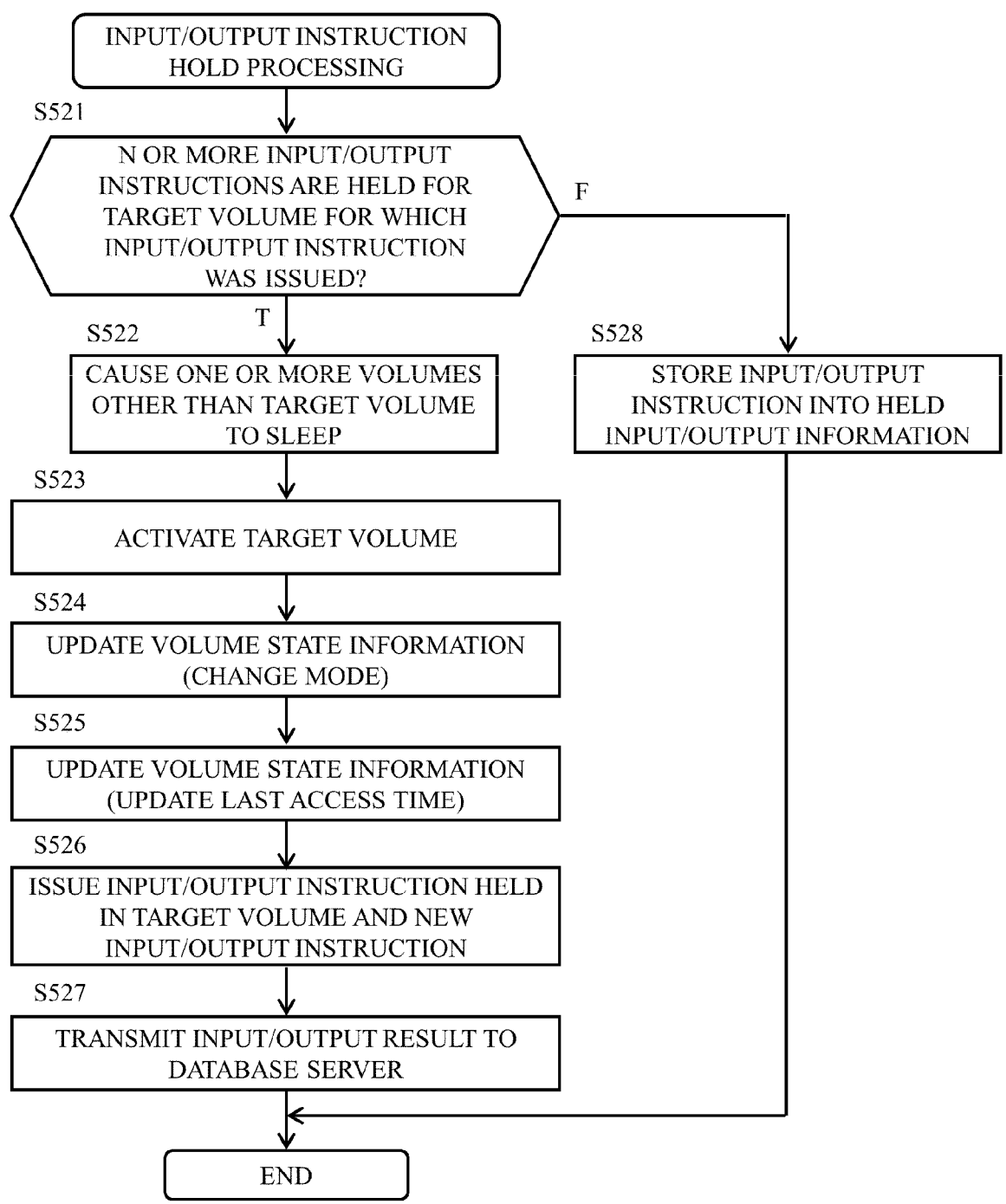
FIG. 58 is a flowchart for illustrating a procedure of input/output instruction hold processing according to the fourth embodiment of the present invention.

FIG. 58 is a flowchart for illustrating a procedure of the input/output instruction hold processing according to the fourth embodiment of the present invention. The input/output instruction hold processing is executed by the input/output processing module 211 included in the control unit 210 of the external storage apparatus 200.

The control unit 210 first determines whether or not a predetermined number (N) or more of input/output instructions are held for a target volume for which an input/output instruction was issued (Step S521). When a predetermined number or more of input/output instructions are not held for the target volume for which an input/output instruction was issued ("F" as a result of Step S521), the control unit 210 stores the input/output instruction into the held input/output information 216 (Step S528) to hold processing of the input/output instruction, and ends the processing.

When a predetermined number or more of input/output instructions are held for the target volume for which an input/output instruction was issued ("T" as a result of Step S521), the control unit 210 causes one or more volumes other than the target volume to sleep (Step S522). Further, the target volume is activated (Step S523). Then, the electric power mode 2132 of the volume mode information 213 is updated (Step S524), and the last access time 2133 is updated (Step S525).

Next, the control unit 210 issues an input/output instruction held in the target volume and a newly received input/output instruction (Step S526). After that, the control unit 210 transmits an input/output result obtained from those input/output instructions to the database server 100 (Step S527).

As described above, in the fourth embodiment, when a predetermined number or more of input/output instructions are held, even the target volume for which processing of an input/output instruction is to be delayed is activated in order to improve the throughput. At this time, the effects of power consumption reduction are maintained by causing one or more volumes in the active mode to sleep. When a volume has received a small number of input/output instructions so far, the volume may be selected and caused to sleep, or a volume having the oldest last access time 2133 may be selected and caused to sleep.

In the input/output instruction hold processing, when there are a predetermined number or more of input/output instructions for the target volume, control is performed such that holding is released irrespective of a delay instruction to process the input/output instructions. However, when input/output instructions are held for a long period of time, overall processing of a query may be delayed. Thus, when a volume has an input/output instruction whose processing has been held for a fix period of time or more, control is performed such that the volume is activated and the input/output instruction is processed (resumed).

Figure 59:
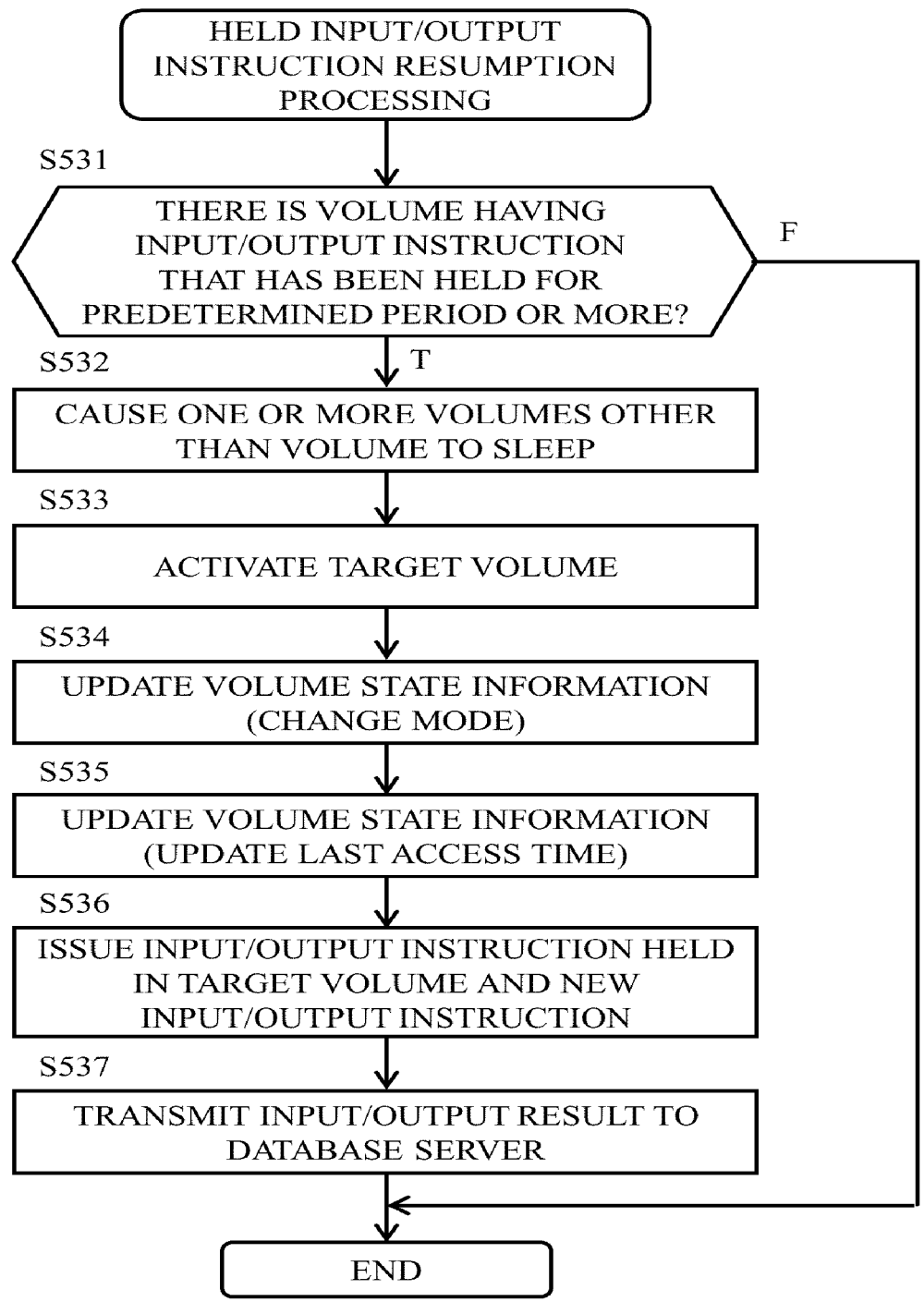
FIG. 59 is a flowchart for illustrating a procedure of held input/output instruction resumption processing according to the fourth embodiment of the present invention.

FIG. 59 is a flowchart for illustrating a procedure of held input/output instruction resumption processing according to the fourth embodiment of the present invention. The held input/output instruction resumption processing is executed by the input/output processing module 211 included in the control unit 210 of the external storage apparatus 200.

The control unit 210 first determines whether or not there is a volume having an input/output instruction that has been held for a predetermined period or more (Step S531). When there is no volume having an input/output instruction that has been held for a predetermined period or more ("F" as a result of Step S531), the control unit 210 ends the processing.

On the contrary, when there is a volume having an input/output instruction that has been held for a predetermined period or more ("T" as a result of Step S531), the control unit 210 causes one or more volumes other than the volume to sleep (Step S532). Further, the control unit 210 activates the volume (Step S533). Then, the control unit 210 updates the electric power mode 2132 of the volume mode information 213 (Step S534), and updates the last access time 2133 (Step S535).

Next, the control unit 210 issues an input/output instruction that has been held in the volume (Step S536). Lastly, the control unit 210 transmits to the database server 100 an input/output result obtained from the input/output instruction that has been held (Step S537).

Next, a description is given of the held input/output information 216 for storing the held input/output instruction. FIG. 60 is a table for showing an example of the held input/output information 216 according to the fourth embodiment of the present invention. As described above, the held input/output information 216 is a table for storing an input/output instruction whose execution is held. The held input/output information 216 contains a target volume 2161, an input/output type 2162, an address/size/data/etc. 2163, an issue source 2164, and an issue time 2165.

The target volume 2161 stores information for identifying a volume. The input/output type 2162 stores a type for distinguishing between input/output of data. The input/output type 2162 may store only one of input or output, or may store specifics such as read, update, addition, or deletion of data. When an input/output instruction that updates data to be referred to in the subsequent processing is held, the data may cause inconsistency. Thus, an input/output instruction may be processed preferentially when the input/output instruction is input processing, for example, update.

The address/size/data/etc. 2163 stores an address of data to be accessed, a size of the data, and other information. Further, when data is updated or added, the address/size/data/etc. 2163 stores update data. Further, for example, the address, size, and data may be stored in separate fields, respectively.

The issue source 2164 stores information for identifying the database server 100 that has issued an input/output instruction. The issue time 2165 stores a time at which the input/output instruction was issued.

This concludes the description of the configuration and control according to the fourth embodiment of the present invention. Next, a description is given of an application example of the fourth embodiment of the present invention with reference to FIG. 61 and FIG. 62. The configuration of the database in the application example of the fourth embodiment is same as the configuration (FIG. 49) of the database in the application example of the third embodiment. Further, the storage electric power characteristics information 215 of the external storage apparatus 200 is the same as the storage electric power characteristics information 215 (FIG. 50) in the application example of the third embodiment.

Further, a query for measuring the performance at the time of execution in the application example of the fourth embodiment is the same as the query 1 according to the first embodiment illustrated in FIG. 24(A). Further, similarly to the first embodiment, three types of query execution plans are created by using hash join, index join (in-order execution), and index join (out-of-order execution). A description is given of an example of applying the fourth embodiment to the query execution plan 3 using index join (out-of-order execution). The query execution plan 3 is the same as the query execution plan 3 according to the first embodiment illustrated in FIG. 27(A).

Figure 61:
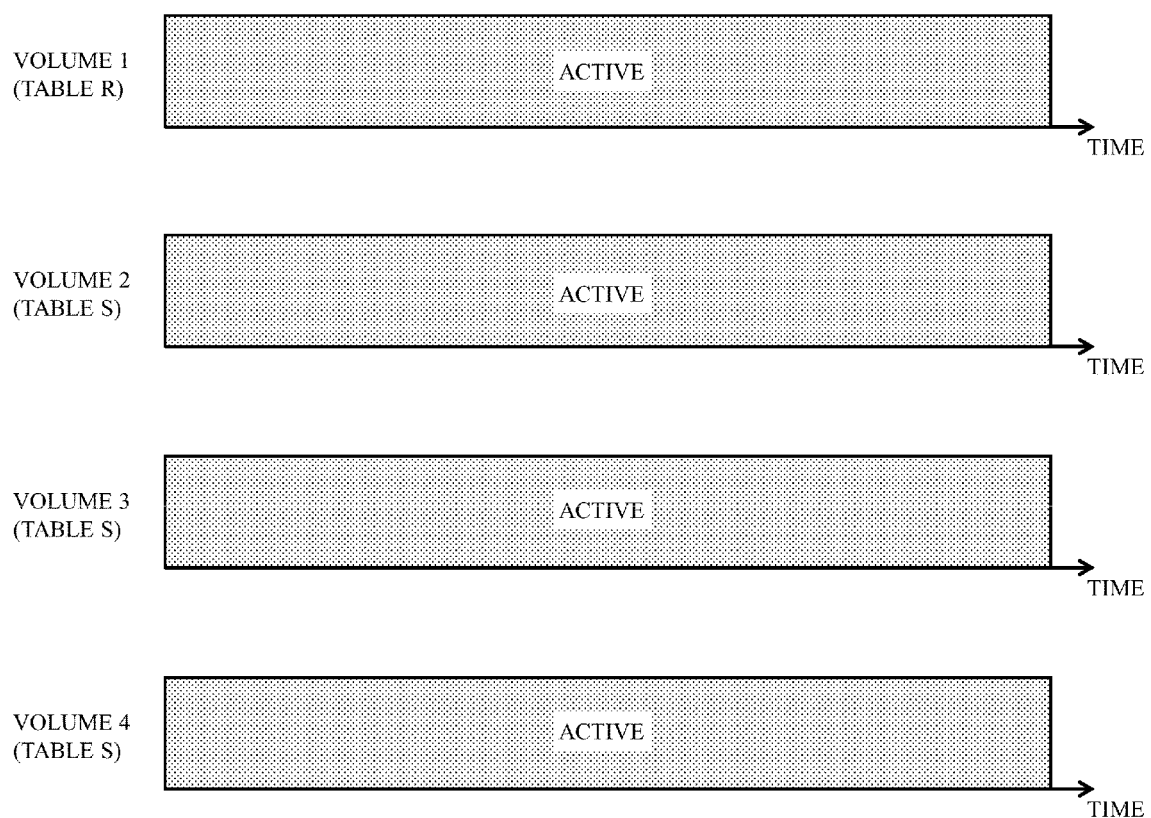
FIG. 61 is a diagram for illustrating a mode of each volume when an input/output instruction is issued without setting a delay permission flag according to the fourth embodiment of the present invention.
Figure 62:
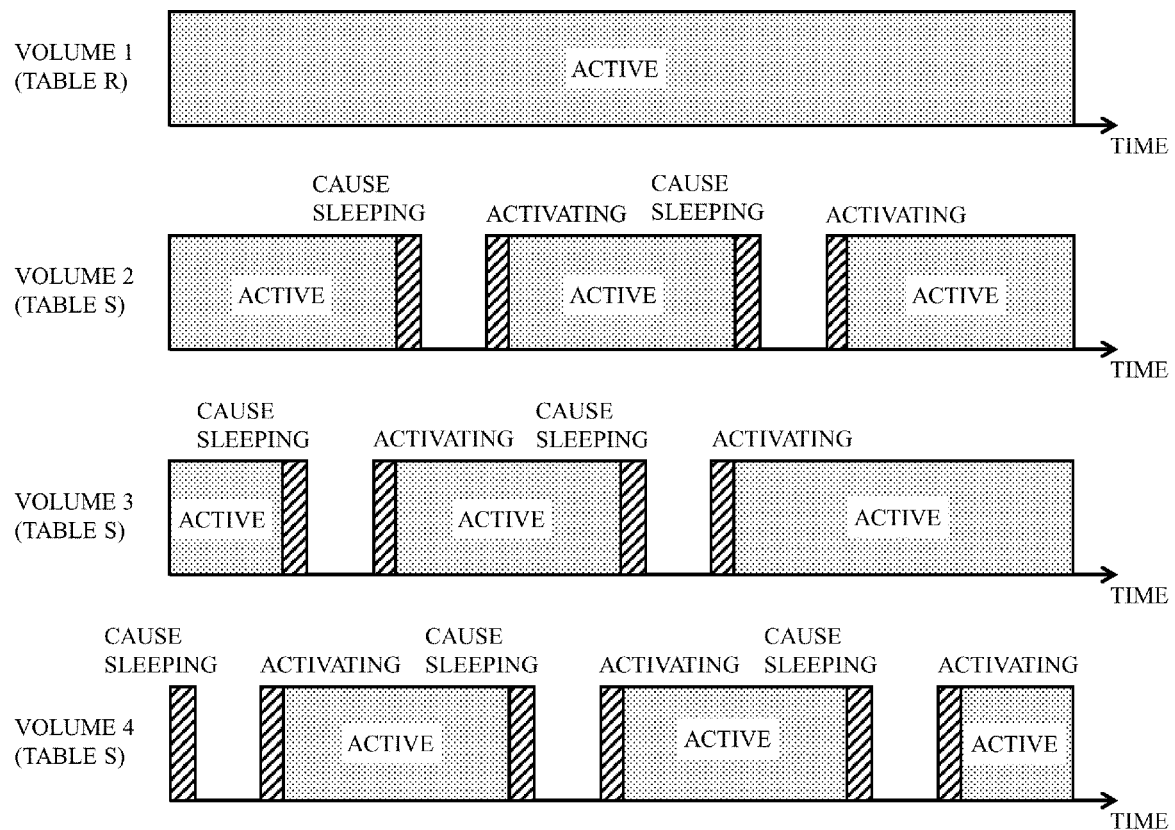
FIG. 62 is a diagram for illustrating a mode of each volume when an input/output instruction is issued by setting the delay permission flag according to the fourth embodiment of the present invention.

On the basis of the configuration described above, the fourth embodiment is applied to the case of delaying input/output of the volumes 2 to 4 (table S). The multiplicity x is set to 100. FIG. 61 is a diagram for illustrating the mode of each volume when an input/output instruction is issued without setting the delay permission flag according to the fourth embodiment of the present invention. FIG. 62 is a diagram for illustrating the mode of each volume when an input/output instruction is issued by setting the delay permission flag according to the fourth embodiment of the present invention.

As illustrated in FIG. 61, when input/output of data is not delayed, the table S is stored equally in the volumes 2 to 4 using a hash distribution method, and thus each volume is accessed equally. As a result, each volume continues to be in the active mode from start to end of execution of the query 1.

On the contrary, as illustrated in FIG. 62, when input/output of data is delayed, control is performed such that the volume 4 is caused to sleep first, and data stored in the volume 2 and the volume 3 are acquired preferentially. As time elapses, the number of input/output instructions for the volume 4 reaches a predetermined number ("T" as a result of Step S521 of FIG. 58), or a predetermined period of time elapses ("T" as a result of Step S531 of FIG. 59), so that the volume 3 is caused to sleep (Step S522 and Step S532) and the volume 4 is activated (Step S523 and Step S533). Similarly, each volume is caused to sleep in order, which enables reduction of power consumption.

As described above, according to the fourth embodiment of the present invention, execution of an input/output instruction for a volume storing data is delayed, to thereby enable reduction of power consumption of the entire computer system through utilization of the power saving function.

Further, according to the fourth embodiment of the present invention, the order of executing tasks is switched to execute processing, and thus it is possible to reduce power consumption without degrading the accuracy of the processing result. Further, a frequently accessed volume is activated early, and thus it is possible to prevent longer execution time.

Further, in the fourth embodiment of the present invention, when an input/output instruction for an infrequently accessed volume is delayed, the sleep mode is maintained for a longer period of time, and thus the access frequency of each volume may be recorded to delay an input/output instruction for an infrequently accessed volume preferentially.

Further, not only the access frequency of each volume, but also the access frequency of each page of a volume may be calculated to move an infrequently accessed page to a specific volume. In this manner, the layout of the database is changed based on the access frequency, to thereby further reduce power consumption. Further, the access frequency may be calculated for each database object, for example, a table, and the layout of the database may be changed. The change of the layout may be performed based on the operation of an administrator, or may be executed at a predetermined timing, for example, when there is no load on the database server 100.

The embodiments of the present invention are described above, but the above-mentioned embodiments only describe a part of examples to which the present invention is applied. The above description is not intended to limit the technical scope of the present invention to the specific configurations of the above-mentioned embodiments.

INDUSTRIAL APPLICABILITY

The present invention can be applied to a computer system for executing a database management system.

The invention claimed is:

1. A computer system, comprising:
   a database server configured to execute a database management system; and
   a storage apparatus, which is connected to the database server via a network, and is configured to store data managed by the database management system,
   the database server comprising:
      an interface connected to the network;
      an arithmetic device connected to the interface; and
      a main memory device connected to the arithmetic device,
      the main memory device being configured to store the database management system,
   the storage apparatus comprising:
      a storage unit configured to store data managed by the database management system; and
      a control unit configured to control read and write of the data stored in the storage unit,
      the control unit being configured to have a storage power saving function for switching between a sleep mode for reducing power consumption of the storage apparatus and an active mode for enabling read and write of the data,
      the storage unit being configured to have a volume to e created and provided to the database server as a storage area for reading and writing the data,
   the main memory device being configured to hold power consumption information on the volume created in the storage unit,
   the database management system being configured to be executed by the arithmetic device, to thereby:
      receive a query for reading or writing data stored in the storage apparatus;
      analyze the received query to create one or more execution plans;
      identify a volume for reading and writing data based on the created one or more execution plans;
      calculate power consumption for each of the created one or more execution plans based on power consumption information on the identified volume;
      select an execution plan for which the calculated power consumption satisfies a predetermined threshold value from the created one or more execution plans; and
      instruct the control unit to read or write data based on the selected execution plan.

2. A computer system, comprising:
   a database server configured to execute a database management system; and
   a storage apparatus, which is connected to the database server via a network, and is configured to store data managed by the database management system,
   the database server comprising:
      an interface connected to the network;
      a plurality of arithmetic devices connected to the interface; and
      a main memory device connected to the plurality of arithmetic devices,
      the main memory device being configured to store the database management system,
      the database management system being configured to have an arithmetic device power saving function for switching between a sleep mode for reducing power consumption of the plurality of arithmetic devices and an active mode for enabling processing of the data,
   the storage apparatus comprising:
      a storage unit configured to store data managed by the database management system; and
      a control unit configured to control read and write of the data stored in the storage unit, the storage unit being configured to have a volume to be created and provided to the database server as a storage area for reading and writing the data, the main memory device being configured to hold power consumption information on the volume created in the storage unit, the database management system being configured to be executed by the plurality of arithmetic devices, to thereby:
  receive a query for reading or writing data stored in the storage apparatus;
  analyze the received query to create one or more execution plans;
  identify a volume for reading and writing data based on the created one or more execution plans;
  calculate power consumption for each of the created one or more execution plans based on power consumption information on the identified volume;
  select an execution plan for which the calculated power consumption satisfies a predetermined threshold value from the created one or more execution plans;
  execute processing for instructing the control unit to read or write data based on the selected execution plan;
  select one arithmetic device from the plurality of arithmetic devices and allocate processing being executed by the selected one arithmetic device to another arithmetic device that is different from the selected one arithmetic device; and
  transfer, when processing is not executed by the selected one arithmetic device, a mode of the selected one arithmetic device from the active mode to the sleep mode.

3. A computer system, comprising:
a database server configured to execute a database management system; and
a storage apparatus, which is connected to the database server via a network, and is configured to store data managed by the database management system,
the database server comprising:
  an interface connected to the network;
  an arithmetic device connected to the interface; and
  a plurality of main memory devices connected to the arithmetic device,
  the plurality of main memory devices being configured to store the database management system,
the database management system being configured to have a main memory device power saving function for switching between a sleep mode for reducing power consumption of the plurality of main memory devices and an active mode for enabling storage of the data,
the storage apparatus comprising:
  a storage unit configured to store data managed by the database management system; and
  a control unit configured to control read and write of the data stored in the storage unit,
  the storage unit being configured to have a volume to be created and provided to the database server as a storage area for reading and writing the data,
the plurality of main memory devices being configured to hold power consumption information on the volume created in the storage unit,
the database management system being configured to be executed by the arithmetic device, to thereby:
  receive a query for reading or writing data stored in the storage apparatus;
  analyze the received query to create one or more execution plans;
  identify a volume for reading and writing data based on the created one or more execution plans;
  calculate power consumption for each of the created one or more execution plans based on power consumption information on the identified volume;
  select an execution plan for which the calculated power consumption satisfies a predetermined threshold value from the created one or more execution plans;
  execute processing for instructing the control unit to read or write data based on the selected execution plan;
  select one main memory device from the plurality of main memory devices and allocate data stored in the selected one main memory device to another main memory device that is different from the selected one main memory device; and
  transfer, when data is not stored in the selected one main memory device, a mode of the selected one main memory device from the active mode to the sleep mode.

4. A computer system, comprising:
a database server configured to execute a database management system; and
a storage apparatus, which is connected to the database server via a network, and is configured to store data managed by the database management system,
the database server comprising:
  an interface connected to the network;
  an arithmetic device connected to the interface; and
  a main memory device connected to the arithmetic device,
  the main memory device being configured to store the database management system,
the storage apparatus comprising:
  a storage unit configured to store data managed by the database management system; and
  a control unit configured to control read and write of the data stored in the storage unit,
  the control unit being configured to have a storage power saving function for switching between a sleep mode for reducing power consumption of the storage apparatus and an active mode for enabling read and write of the data,
  the storage unit being configured to have a plurality of volumes to be created and provided to the database server as a storage area for reading and writing the data,
the main memory device being configured to hold power consumption information on the plurality of volumes created in the storage unit,
the database management system being configured to be executed by the arithmetic device, to thereby:
  receive a query for reading or writing data stored in the storage apparatus;
  analyze the received query to create an execution plan;
  instruct the control unit to read or write data based on the created execution plan;
  read, when a query for reading data stored in the plurality of volumes in a distributed manner is received, data from the plurality of volumes storing the data to be read, without reading the data from a part of the plurality of volumes; and
  transfer a mode of the unread part of the plurality of volumes from the active mode to the sleep mode.

5. The computer system according to claim 1,
wherein the execution plan is formed of operations for reading or writing data stored in the storage apparatus, and
wherein the database management system is configured to be executed by the arithmetic device, to thereby:
execute the operations in parallel; and
generate a result of the received query based on an execution result of each of the operations.

6. The computer system according to claim 5, wherein the database management system is configured to be executed by the arithmetic device, to thereby optimize the execution plan by setting an upper limit of a multiplicity of the operations that are capable of being executed simultaneously.

7. The computer system according to claim 1,
wherein the storage apparatus is configured to provide the plurality of volumes to the database server, and
wherein the control unit is configured to:
receive an input/output instruction to access the data from the database server, and hold processing of the received input/output instruction when a volume storing data to be accessed is in the sleep mode;
transfer a mode of the volume in the sleep mode to the active mode when a number of input/output instructions for the volume is equal to or more than a predetermined number; and
execute the held processing of the input/output instruction.

8. The computer system according to claim 1,
wherein the storage apparatus is configured to provide the plurality of volumes to the database server, and
wherein the control unit is configured to:
receive an input/output instruction to access the data from the database server, and hold processing of the received input/output instruction when a volume storing data to be accessed is in the sleep mode;
transfer a mode of the volume in the sleep mode to the active mode when a predetermined period or more has passed since the mode of the volume was transferred to the sleep mode; and
execute the held processing of the input/output instruction.

9. The computer system according to claim 1,
wherein the control unit is configured to:
issue an input/output instruction to the volume;
measure power consumption of the volume, which is caused by execution of the issued input/output instruction; and
generate power consumption information on the volume based on the measured power consumption, and
wherein the database management system is configured to be executed by the arithmetic device, to thereby acquire the power consumption information on the volume from the storage apparatus.

10. The computer system according to claim 2, wherein the database management system is configured to be executed by the arithmetic device, to thereby:
issue an arithmetic instruction to the arithmetic device;
measure power consumption of the arithmetic device, which is caused by execution of the issued arithmetic instruction; and
generate power consumption information on the arithmetic device based on the measured power consumption.

11. The computer system according to claim 3, wherein the database management system is configured to be executed by the arithmetic device, to thereby:
change a mode of the main memory device;
measure power consumption of the main memory device, which is caused by change in mode of the main memory device; and
generate power consumption information on the main memory device based on the measured power consumption.

12. A power saving method for a computer system,
the computer system comprising:
a database server configured to execute a database management system; and
a storage apparatus, which is connected to the database server via a network, and is configured to store data managed by the database management system,
the database server comprising:
an interface connected to the network;
an arithmetic device connected to the interface; and
a main memory device connected to the arithmetic device,
the main memory device being configured to store the database management system,
the storage apparatus comprising:
a storage unit configured to store data managed by the database management system; and
a control unit configured to control read and write of the data stored in the storage unit,
the control unit being configured to have a power saving function for switching between a sleep mode for reducing power consumption of the storage apparatus and an active mode for enabling read and write of the data,
the storage unit being configured to have a volume to be created and provided to the database server as a storage area for reading and writing the data,
the main memory device being configured to hold power consumption information on the volume created in the storage unit,
the power saving method, which is executed by the arithmetic device, comprising:
receiving a query for reading or writing data stored in the storage apparatus;
analyzing the received query to create one or more execution plans;
identifying a volume for reading and writing data based on the created one or more execution plans;
calculating power consumption for each of the created one or more execution plans based on power consumption information on the identified volume;
selecting an execution plan for which the calculated power consumption satisfies a predetermined threshold value from the created one or more execution plans; and
instructing the control unit to read or write data based on the selected execution plan.

13. A computer, which is connected to a storage apparatus configured to store data, and is configured to execute a database management system configured to manage the data, the computer comprising:
an interface connected to the storage apparatus;
an arithmetic device connected to the interface; and
a main memory device connected to the arithmetic device,
the main memory device being configured to store the database management system,
the storage apparatus being configured to have a power saving function for switching between a sleep mode for reducing power consumption and an active mode for enabling read and write of the data, the storage apparatus being configured to provide a volume, which is a storage area for reading and writing the data, the main memory device being configured to hold power consumption information on the volume provided by the storage apparatus, the arithmetic device being configured to:
- receive a query for reading or writing data stored in the storage apparatus;
- analyze the received query to create one or more execution plans;
- identify a volume for reading and writing data based on the created one or more execution plans;
- calculate power consumption for each of the created one or more execution plans based on power consumption information on the identified volume;
- select an execution plan for which the calculated power consumption satisfies a predetermined threshold value from the created one or more execution plans; and
- instruct the storage apparatus to read or write data based on the selected execution plan.

* * * * *